United States Patent
Wang et al.

(10) Patent No.: US 12,323,518 B2
(45) Date of Patent: Jun. 3, 2025

(54) KEY UPDATE METHOD AND RELATED APPARATUS

(71) Applicant: HUAWEI TECHNOLOGIES CO., LTD., Guangdong (CN)

(72) Inventors: Yong Wang, Shenzhen (CN); Jing Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 17/895,707

(22) Filed: Aug. 25, 2022

(65) Prior Publication Data

US 2022/0417015 A1 Dec. 29, 2022

Related U.S. Application Data

(63) Continuation of application No. PCT/CN2020/077353, filed on Feb. 29, 2020.

(51) Int. Cl.
*H04L 9/00* (2022.01)
*H04L 9/08* (2006.01)
*H04L 9/32* (2006.01)

(52) U.S. Cl.
CPC .......... *H04L 9/0891* (2013.01); *H04L 9/0838* (2013.01); *H04L 9/085* (2013.01); *H04L 9/0861* (2013.01); *H04L 9/3242* (2013.01)

(58) Field of Classification Search
CPC ..... H04L 9/0891; H04L 9/0838; H04L 9/085; H04L 9/0861; H04L 9/3242;
(Continued)

(56) References Cited

U.S. PATENT DOCUMENTS

2006/0274899 A1 12/2006 Zhu et al.
2014/0040618 A1 2/2014 Liu et al.
(Continued)

FOREIGN PATENT DOCUMENTS

CN 1832397 A 9/2006
CN 101047978 A 10/2007
(Continued)

OTHER PUBLICATIONS

PCT International Search Report and Written Opinion issued in International Application No. PCT/CN2020/077353 on Nov. 27, 2020, 15 pages (with English translation).
(Continued)

*Primary Examiner* — Syed M Ahsan
(74) *Attorney, Agent, or Firm* — Fish & Richardson P.C.

(57) ABSTRACT

Embodiments of this application provide a key update method and a related apparatus. One example method includes: sending a first key update request to a second node, where the first key update request includes a first key negotiation parameter and first identity authentication information, and the first identity authentication information is generated by using a first shared key; receiving a first response message from the second node, where the first response message includes second identity authentication information; performing verification on the second identity authentication information by using the first shared key; and if the verification on the second identity authentication information succeeds, determining a first target key based on the first key negotiation parameter.

20 Claims, 14 Drawing Sheets

(58) Field of Classification Search
CPC . H04L 2209/84; H04L 9/0643; H04L 9/0841; H04L 9/088; H04L 9/3073; H04L 63/068; H04L 9/0866
See application file for complete search history.

(56) References Cited

U.S. PATENT DOCUMENTS

| | | | |
|---|---|---|---|
| 2014/0122888 A1 | 5/2014 | Yoon et al. | |
| 2014/0215215 A1 | 7/2014 | Tanaka | |
| 2016/0072807 A1* | 3/2016 | Park | H04L 63/061 713/171 |

FOREIGN PATENT DOCUMENTS

| | | |
|---|---|---|
| CN | 101213784 A | 7/2008 |
| CN | 101420694 A | 4/2009 |
| CN | 101425897 A | 5/2009 |
| CN | 106712932 A | 5/2017 |
| CN | 108572642 A | 9/2018 |
| JP | 2001306401 A | 11/2001 |
| JP | 2002152194 A | 5/2002 |
| JP | 2009141767 A | 6/2009 |
| JP | 2011160136 A | 8/2011 |
| JP | 2018098572 A | 6/2018 |
| JP | 2018205502 A | 12/2018 |
| JP | 2019140441 A | 8/2019 |
| KR | 20070059884 A | 6/2007 |
| KR | 20150013543 A | 2/2015 |
| KR | 20190102068 A | 9/2019 |

OTHER PUBLICATIONS

Davidov, "TLS Renegotiation: Explanation and Exploitation," Jun. 24, 2013, 26 pages.

Rescorla, "RFC 8446: The Transport Layer Security (TLS) Protocol Version 1.3," Aug. 1, 2018, retrieved from URL: <https://www.rfc-editor.org/rfc/rfc8446#section-7.2>, 160 pages.

Dierks et al., "RFC 5246—The Transport Layer Security (TLS) Protocol Version 1.2," Aug. 31, 2008, retrieved from URL: <https://www.rfc-editor.org/rfc/rfc5246>, 104 pages.

Extended European Search Report in European Appln No. 20920962.6, dated Jan. 5, 2023, 8 pages.

Office Action in Chinese Appln. No. 202080096273.4, dated Dec. 13, 2022, 7 pages.

Office Action in Japnese Appln. No. 2022-550128, mailed on Oct. 3, 2023, 4 pages (with English translation).

Notice of Allowance in Japanese Appln. No. 2024-034390, mailed on Feb. 4, 2025, 3 pages (with English translation).

Office Action in Korean Appln. No. 10-2022-7032169, mailed on Mar. 13, 2025, 15 pages (with English translation).

\* cited by examiner

KEY UPDATE METHOD AND RELATED APPARATUS

CROSS-REFERENCE TO RELATED APPLICATIONS

This application is a continuation of International Application No. PCT/CN2020/077353, filed on Feb. 29, 2020. The disclosure of which is hereby incorporated by reference in its entirety.

TECHNICAL FIELD

The present invention relates to the field of communications technologies, and in particular, to the field of short-range communications technologies, for example, cockpit domain communication. Specifically, the present invention relates to a key update method and a related apparatus.

BACKGROUND

Communications technologies have penetrated into people's lives. While enjoying communication convenience, people are also faced with threats of security vulnerability and privacy leakage. To ensure security of data transmission and storage in a communication process, a node usually encrypts transmitted data before storing or transmitting the data. After receiving the data, a node of a receiving party decrypts a ciphertext and restores a plaintext. In addition, the node may further perform integrity protection (or integrity protection for short) on the data. After receiving the data, the node of the receiving party performs integrity verification on a message. If the integrity verification succeeds, it indicates that the message is not modified in a transmission process. During secure data communication, two communication parties need to have keys such as an encryption/decryption key and an integrity protection key. Once the keys such as the encryption/decryption key and the integrity protection key expire or are cracked, information on which encryption or integrity protection is performed by using the keys is likely to be leaked, thereby affecting data transmission security.

A service life of a key is limited. To prevent the key from being disclosed or cracked, a key update mechanism is usually used. That is, when a validity period of the key is about to end, the old key is replaced with a new key. In a key update process, a message that is used for a key update and that is transmitted by the node is vulnerable to a man-in-the-middle attack, thereby affecting data security.

Therefore, how to improve data security in the key update process is a problem that a person skilled in the art is studying.

SUMMARY

Embodiments of this application disclose a key update method and a related apparatus, to improve data security in a key update process.

According to a first aspect, an embodiment of this application discloses a key update method, including the following steps:

A first key update request is sent to a second node, where the first key update request includes a first key negotiation parameter and first identity authentication information, and the first identity authentication information is generated by using a first shared key. The first shared key is a same secret value stored in nodes of two communication parties, and may be a master key, a session key, a pre-shared key (PSK), or the like. The session key may be used to perform encryption or integrity protection on data or a file transmitted by the node. In addition, the first identity authentication information may be generated by using a cryptographic algorithm based on the first shared key. The cryptographic algorithm may be a hash algorithm (also referred to as a hash algorithm), an authentication algorithm, or the like, for example, a hash-based message authentication code (HMAC) algorithm (including an HMAC secure hash algorithm (SHA) HMAC-SHA256, an HMAC-SHA3, an HMAC Chinese cryptography algorithm HMAC-SM3, and the like). Further, the cryptographic algorithm may further include a rapid-amplification of cDNA ends ((RACE) integrity primitives evaluation message digest (RIPEMD) algorithm.

A first response message is received from the second node, where the first response message includes second identity authentication information. A principle of generating the second identity authentication information is the same as a principle of the first identity authentication information, and details are not described herein again.

Verification is performed on the second identity authentication information by using the first shared key.

If the verification on the second identity authentication information succeeds, a first target key is determined based on the first key negotiation parameter.

In the foregoing method, before an original key expires, a first node and the second node generate identity authentication information based on the first shared key. After receiving a message from the other node, one node first determines an identity of the other node by using the identity authentication information, and updates the key based on a key negotiation parameter only after identity authentication succeeds, to obtain the first target key. In this case, even if an eavesdropper has cracked an original session key, the eavesdropper cannot forge identity information, thereby avoiding a man-in-the-middle attack and improving data security in a key update process.

In a possible implementation of the first aspect, the first key update request is used to indicate at least one of a first update time point and a validity period of the first target key.

In a conventional key update process, a key update time point is predefined in a protocol and cannot be flexibly selected. However, in the key update method in this application, the first node may customize an update time point of the first target key and/or the validity period of the first target key, and indicate the update time point and/or the validity period to the second node, so that the first target key can be enabled as required.

In still another possible implementation of the first aspect, the first key update request includes a first frame number, and the first frame number is indicated by using a plurality of bits, for example, F bits. The first key update request is used to indicate the first update time point by using the first frame number. Alternatively, the first key update request includes a media access control serial number (MAC SN), the MAC SN is indicated by using M bits, the M bits are some of the F bits, and M is less than F. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

In still another possible implementation of the first aspect, the first target key is applied within the validity period of the first target key starting from the first update time point.

In still another possible implementation of the first aspect, the first key negotiation parameter includes a first key negotiation algorithm parameter, and the first response message further includes a second key negotiation algorithm parameter; and the determining a first target key based on the first key negotiation parameter includes: generating the first target key based on the first key negotiation algorithm parameter and the second key negotiation algorithm parameter.

The first key negotiation algorithm parameter and the second key negotiation algorithm parameter are algorithm parameters generated in a key negotiation process. Key negotiation is a process in which two communication parties exchange some parameters to obtain a key through negotiation. An algorithm used for key negotiation is referred to as a key negotiation algorithm or a key exchange algorithm. In this embodiment of this application, the first node generates the first key negotiation algorithm parameter, and the second node generates the second key negotiation algorithm parameter. The first target key is determined by using the key negotiation algorithm parameters provided by the two parties. Taking a DH algorithm as an example, the two nodes respectively generate random numbers a and b by using a same big prime number p and a same generator number g. The first node sends a value A generated by the $a^{th}$ power of g mod P to the second node, the second node sends a value B generated by the $b^{th}$ power of g mod P to the first node, then the first node performs an $a^{th}$ power operation on the received value A, and the second node performs an $a^{th}$ power operation on the received value B. Because $K=A^b \bmod p=(g^a \bmod p)^b \bmod p=g^{ab} \bmod p=(g^b \bmod p)^a \bmod p=B^a \bmod p$, keys K generated by the first node and the second node are the same.

In still another possible implementation of the first aspect, the first key negotiation parameter includes a fresh parameter; and the determining a first target key based on the first key negotiation parameter includes: generating the first target key based on a second target key and the fresh parameter.

The second target key may be a secret value shared between the first node and the second node, or may be referred to as a shared key between the first node and the second node, and includes a master key, a session key, a pre-shared key (PSK), and the like. In addition, the first target key may be generated by using a key derivation algorithm (KDF) based on the second target key and the fresh parameter. For example, a new key DK derived by using a secret value Key may be expressed as: DK=KDF (Key, fresh), where fresh is a fresh parameter and is a parameter used for an update, and may include a counter value (counter), a serial number (number), a random value (rand), a frame number (frame number), and the like.

In still another possible implementation of the first aspect, the first target key is a master key.

The master key is a high-class secret value of a node and is mainly used to protect a key such as a session key. In an optional solution, the session key is obtained by using a key derivation function (KDF) based on the master key. Optionally, the master key may be used to encrypt the session key.

In still another possible implementation of the first aspect, the first key negotiation parameter includes a fresh parameter; and the determining a first target key based on the first key negotiation parameter includes: generating the first target key based on a second target key, the fresh parameter, and an algorithm identifier, where the algorithm identifier is used to mark an algorithm used for determining an encryption key or an integrity protection key.

In still another possible implementation of the first aspect, the first target key is an integrity protection key or an encryption key.

In still another possible implementation of the first aspect, at least one of the first key update request and the first response message is encrypted by using the encryption key determined based on the second target key, and/or integrity protection is performed on at least one of the first key update request and the first response message by using the integrity protection key determined based on the second target key.

It may be understood that a conventional key update method is to update a key when an old key (namely, the second target key) expires. Because the second target key has expired, encryption and integrity protection are not performed in a process of determining a new key. However, in this embodiment of this application, the first target key may be determined before the second target key expires. Therefore, the first key update request and the first response message may be encrypted by using a key determined based on the second target key, thereby improving data security.

In still another possible implementation of the first aspect, the sending a first key update request to a second node includes: sending the first key update request to the second node by using a first communication frame, where a second frame number of the first communication frame is less than a third frame number carried in a key update request used during a last key update, the third frame number is used to indicate a start time point of a last updated key, and the first frame number is greater than the second frame number and less than the third frame number. When security protection is performed on a communication frame in a communication process, a used encryption method may be to perform encryption based on a frame number and a last updated key. Therefore, the first target key is determined before a frame number repeats to a frame number of the last updated key, so that a data frame is encrypted by using the first target key. In this way, data frames with a same frame number can be encrypted twice by using different keys, thereby improving data security. In an alternative solution, the first key update request includes a MAC serial number (MAC SN) instead of the first frame number, the MAC SN is indicated by using M bits, the M bits are some of the F bits, and M is less than F. Alternatively, the third frame number carried in the key update request used during the last key update may also be replaced with a MAC SN, that is, a MAC SN indicated by some of a plurality of bits used to indicate the third frame number. In this alternative solution, a value relationship among the first frame number, the second frame number, and the third frame number remains unchanged. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

In still another possible implementation of the first aspect, the communication frame includes at least one of a signaling plane uplink frame, a signaling plane downlink frame, a user plane uplink frame, or a user plane downlink frame. Further, a frame number in this application is a frame number of the communication frame.

In still another possible implementation of the first aspect, the method further includes:

if the verification on the second identity information fails, severing a communication connection to the second node or sending update failure information to the second node.

It may be learned that if the verification on the second identity authentication information fails, it indicates that an identity of the second node is untrusted. Therefore, the first node may sever the communication connection to the second node or send the update failure information to the second node, so that an access request is re-initialized to a node that needs to perform a key update, thereby ensuring data security in a key update process.

In still another possible implementation of the first aspect, before the performing verification on the second identity authentication information by using the first shared key, the method further includes:

performing integrity verification on the first response message;

if the integrity verification succeeds, continuing to perform the step of performing verification on the second identity authentication information by using the first shared key; and if the integrity verification fails, severing a communication connection to the second node or sending update failure information to the second node.

In the foregoing method, before performing verification on identity information, the first node first performs integrity verification on the first response message, to determine that information in the first response message is not tampered with. If the integrity verification fails, it indicates that data in the first response information has been tampered with, and a key cannot be updated. Therefore, the first node severs the communication connection to the second node or sends the update failure information to the second node, so that the first node re-accesses a node that needs to perform a key update, thereby ensuring data security in a key update process.

According to a second aspect, an embodiment of this application discloses a key update method, including the following steps:

A first key update request is received from a first node, where the first key update request includes a first key negotiation parameter and first identity authentication information. The first identity authentication information may be generated by using a cryptographic algorithm based on a first shared key. The cryptographic algorithm may be a hash algorithm (also referred to as a hash algorithm), an authentication algorithm, or the like, for example, a hash-based message authentication code (HMAC) algorithm (including an HMAC secure hash algorithm HMAC-SHA256, an HMAC-SHA3, an HMA Chinese cryptography algorithm HMAC-SM3, and the like). Further, the cryptographic algorithm may further include a rapid-amplification of cDNA ends ((RACE) integrity primitives evaluation message digest (RIPEMD) algorithm.

Verification is performed on the first identity authentication information by using a first shared key. The first shared key is a same secret value stored in nodes of two communication parties, and may be a master key, a session key, a pre-shared key (PSK), or the like. The session key may be used to perform encryption or integrity protection on data or a file transmitted by the node. In addition, the first identity authentication information is generated by using the cryptographic algorithm based on the first shared key. Therefore, a second node may perform verification on the first identity authentication information by using the cryptographic algorithm based on the first shared key. If the verification on the first identity authentication information succeeds, a first target key is determined based on the first key negotiation parameter.

A first response message is sent to the first node, where the first response message includes second identity authentication information, and the second identity authentication information is generated by using the first shared key. A principle of generating the second identity authentication information is the same as a principle of the first identity authentication information, and details are not described herein again.

In the foregoing method, before an original session key expires, the first node and the second node generate identity authentication information based on the first shared key. After receiving a message from the other node, one node first determines an identity of the other node by using the identity authentication information, and updates the key based on a key negotiation parameter only after identity authentication succeeds, to obtain the first target key. In this case, even if an eavesdropper has cracked the original session key, the eavesdropper cannot forge identity information, thereby avoiding a man-in-the-middle attack and improving data security in a key update process.

In a possible implementation of the second aspect, the first key update request is used to indicate at least one of a first update time point and a validity period of the first target key.

In a conventional key update process, a key update time point is predefined in a protocol and cannot be flexibly selected. However, in the key update method in this application, the first node may customize an update time point of the first target key and/or the validity period of the first target key, and indicate the update time point and/or the validity period to the second node, so that the first target key can be enabled as required.

In still another possible implementation of the second aspect, the first key update request includes a first frame number, and the first key update request indicates the first update time point by using the first frame number. The first frame number is indicated by using a plurality of bits, for example, F bits. Alternatively, the first key update request includes a media access control serial number (MAC SN), the MAC SN is indicated by using M bits, the M bits are some of the F bits, and M is less than F. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

In still another possible implementation of the second aspect, the first target key is applied within the validity period of the first target key starting from the first update time point.

In still another possible implementation of the second aspect, the first key negotiation parameter includes a first key negotiation algorithm parameter, and the first response message further includes a second key negotiation algorithm parameter; and the determining a first target key based on the first key negotiation parameter includes: generating the first target key based on the first key negotiation algorithm parameter and the second key negotiation algorithm parameter.

The first key negotiation algorithm parameter and the second key negotiation algorithm parameter are algorithm parameters generated in a key negotiation process. Key negotiation is a process in which two communication parties exchange some parameters to obtain a key through negotiation. An algorithm used for key negotiation is referred to as a key negotiation algorithm or a key exchange algorithm. In this embodiment of this application, the first node generates the first key negotiation algorithm parameter, and the second node generates the second key negotiation algorithm parameter. The first target key is determined by using the key negotiation algorithm parameters provided by the two parties. Taking a DH algorithm as an example, the two nodes respectively generate random numbers a and b by using a same big prime number p and a same generator number g. The first node sends a value A generated by the $a^{th}$ power of g mod P to the second node, the second node sends a value B generated by the $b^{th}$ power of g mod P to the first node, then the first node performs an $a^{th}$ power operation on the received value A, and the second node performs an $a^{th}$ power operation on the received value B. Because K=$A^b$ mod p=$(g^a$ mod $p)^b$ mod p=$g^{ab}$ mod p=$(g^b$ mod $p)^a$ mod p=$B^a$ mod p, keys K generated by the first node and the second node are the same.

In still another possible implementation of the second aspect, the first key negotiation parameter includes a fresh parameter; and the determining a first target key based on the first key negotiation parameter includes:

generating the first target key based on a second target key and the fresh parameter.

The second target key may be a shared key between the first node and the second node, and includes a master key, a session key, a pre-shared key (PSK), and the like. In addition, the first target key may be generated by using a key derivation algorithm (KDF) based on the second target key and the fresh parameter. For example, a new key DK derived by using a secret value Key may be expressed as: DK=KDF (Key, fresh), where fresh is a fresh parameter and is a parameter used for an update, and may include a counter value (counter), a serial number (number), a random value (rand), a frame number (frame number), and the like.

In still another possible implementation of the second aspect, the first target key is a master key.

The master key is a high-class secret value of a node and is mainly used to protect a key such as a session key. In an optional solution, the session key is obtained by using a key derivation function (KDF) based on the master key. Optionally, the master key may be used to encrypt the session key.

In still another possible implementation of the second aspect, the first key negotiation parameter includes a fresh parameter; and the determining a first target key based on the first key negotiation parameter includes:

generating the first target key based on a second target key, the fresh parameter, and an algorithm identifier, where the algorithm identifier is used to mark an algorithm used for determining an encryption key or an integrity protection key.

In still another possible implementation of the second aspect, the first target key is an integrity protection key or an encryption key.

In still another possible implementation of the second aspect, at least one of the first key update request and the first response message is encrypted by using the encryption key determined based on the second target key, and/or integrity protection is performed on at least one of the first key update request and the first response message by using the integrity protection key determined based on the second target key.

It may be understood that a conventional key update method is to update a key when an old key (namely, the second target key) expires. Because the second target key has expired, encryption and integrity protection are not performed in a process of determining a new key. However, in this embodiment of this application, the first target key may be determined before the second target key expires. Therefore, the first key update request and the first response message may be encrypted by using a key determined based on the second target key, thereby improving data security.

In still another possible implementation of the second aspect, the method further includes:

if the verification on the first identity information fails, severing a connection to the first node or sending update failure indication information to the first node.

It may be learned that if the verification on the first identity authentication information fails, it indicates that an identity of the second node is untrusted. Therefore, the second node may sever the connection to the first node or send the update failure indication information to the first node, to stop the current key process, thereby ensuring data security of the second node in a key update process.

In still another possible implementation of the second aspect, before the performing verification on the first identity authentication information by using the first shared key, the method further includes:

performing integrity verification on the first key update request;

if the integrity verification succeeds, continuing to perform the step of performing verification on the second identity authentication information by using the first shared key; and if the integrity verification fails, severing a connection to the first node or sending update failure indication information to the first node.

In the foregoing method, before performing verification on identity information, the second node first performs integrity verification on the first key update request, to determine that information in the first key update request is not tampered with. If the integrity verification fails, it indicates that data in the first key update request has been tampered with, and a key cannot be updated. Therefore, the second node may sever the connection to the first node or send the update failure indication information to the first node, thereby ensuring data security in a key update process.

According to a third aspect, an embodiment of this application discloses an apparatus, including:

a sending unit, configured to send a first key update request to a second node, where the first key update request includes a first key negotiation parameter and first identity authentication information, and the first identity authentication information is generated by using a first shared key;

a receiving unit, configured to receive a first response message from the second node, where the first response message includes second identity authentication information;

a verification unit, configured to perform verification on the second identity authentication information by using the first shared key; and a determining unit, configured to: if the verification on the second identity authentication information succeeds, determine a first target key based on the first key negotiation parameter.

In a key update process, the foregoing node and the second node generate identity authentication information based on the first shared key. After receiving a message from the other node, one node first determines an identity of the other node by using the identity authentication information, and updates a key based on a key negotiation parameter only after identity authentication succeeds, to obtain the first target key. In this case, even if an eavesdropper has cracked an original session key, the eavesdropper cannot forge identity information, thereby avoiding a man-in-the-middle attack and improving data security in a key update process.

In a possible implementation of the third aspect, the first key update request is used to indicate at least one of a first update time point and a validity period of the first target key.

In a conventional key update process, a key update time point is predefined in a protocol and cannot be flexibly selected. However, the node provided in this application may customize an update time point of the first target key and/or the validity period of the first target key, and indicate the update time point and/or the validity period to the second node, so that the first target key can be enabled as required.

In still another possible implementation of the third aspect, the first key update request includes a first frame number, and the first key update request indicates the first update time point by using the first frame number. The first frame number is indicated by using a plurality of bits, for example, F bits. Alternatively, the first key update request includes a media access control serial number (MAC SN), the MAC SN is indicated by using M bits, the M bits are some of the F bits, and M is less than F. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

In still another possible implementation of the third aspect, the first target key is applied within the validity period of the first target key starting from the first update time point.

In still another possible implementation of the third aspect, the first key negotiation parameter includes a first key negotiation algorithm parameter, and the first response message further includes a second key negotiation algorithm parameter; and the determining unit is configured to generate the first target key based on the first key negotiation algorithm parameter and the second key negotiation algorithm parameter.

In still another possible implementation of the third aspect, the first key negotiation parameter includes a fresh parameter; and the determining unit is configured to generate the first target key based on a second target key and the fresh parameter.

The second target key may be a shared key between the first node and the second node, and includes a master key, a session key, a pre-shared key (PSK), and the like. In addition, the first target key may be generated by using a key derivation algorithm (KDF) based on the second target key and the fresh parameter. For example, a new key DK derived by using a secret value Key may be expressed as: DK=KDF (Key, fresh), where fresh is a fresh parameter and is a parameter used for an update, and may include a counter value (counter), a serial number (number), a random value (rand), a frame number (frame number), and the like.

In still another possible implementation of the third aspect, the first target key is a master key of the node.

In still another possible implementation of the third aspect, the first key negotiation parameter includes a fresh parameter; and the determining unit is configured to generate the first target key based on a second target key, the fresh parameter, and an algorithm identifier, where the algorithm identifier is used to mark an algorithm used for determining an encryption key or an integrity protection key.

In still another possible implementation of the third aspect, the first target key is an integrity protection key or an encryption key of the node.

In still another possible implementation of the third aspect, at least one of the first key update request and the first response message is encrypted by using the encryption key determined based on the second target key, and/or integrity protection is performed on at least one of the first key update request and the first response message by using the integrity protection key determined based on the second target key.

It may be understood that a conventional key update method is to update a key when an old key expires. Because the second target key has expired, encryption and integrity protection are not performed in a process of determining a new key. However, the node provided in this embodiment of this application may determine the first target key before the second target key expires. Therefore, the first key update request and the first response message may be encrypted by using a key determined based on the second target key, thereby improving data security.

In still another possible implementation of the third aspect, the sending unit is configured to send the first key update request to the second node by using a first communication frame, where a second frame number of the first communication frame is less than a third frame number carried in a key update request used during a last key update, the third frame number is used to indicate a start time point of a last updated key, and the first frame number is greater than the second frame number and less than the third frame number.

When security protection is performed on a communication frame in a communication process, a used encryption method may be to perform encryption based on a frame number and a last updated key. Therefore, the first target key is determined before a frame number repeats to a frame number of the last updated key, so that a data frame is encrypted by using the first target key. In this way, data frames with a same frame number can be encrypted twice by using different keys, thereby improving data security. In an alternative solution, the first key update request includes a MAC serial number (MAC SN) instead of the first frame number, the MAC SN is indicated by using M bits, the M bits are some of the F bits, and M is less than F. Alternatively, the third frame number carried in the key update request used during the last key update may also be replaced with a MAC SN, that is, a MAC SN indicated by some of a plurality of bits used to indicate the third frame number. In this alternative solution, a value relationship among the first frame number, the second frame number, and the third frame number remains unchanged. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

In still another possible implementation of the third aspect, the communication frame includes at least one of a signaling plane uplink frame, a signaling plane downlink frame, a user plane uplink frame, or a user plane downlink frame.

In still another possible implementation of the third aspect, if the verification on the second identity information fails, the sending unit and the receiving unit sever a communication connection to the second node or send update failure information to the second node.

It may be learned that if the verification on the second identity authentication information fails, it indicates that an identity of the second node is untrusted. Therefore, the foregoing node may sever the communication connection to the second node or send the update failure information to the second node, so that an access request is re-initialized to a node that needs to perform a key update, thereby ensuring data security in a key update process.

In still another possible implementation of the third aspect, the verification unit is further configured to: perform integrity verification on the first response message; and if the integrity verification succeeds, continue to perform the step of performing verification on the second identity authentication information by using the first shared key; and if the integrity verification fails, the sending unit and the receiving unit sever a communication connection to the second node or send update failure information to the second node or send update failure information to the second node by using the sending unit.

Before performing verification on identity information, the node may first perform integrity verification on the first response message, to determine that information in the first response message is not tampered with. If the integrity verification fails, it indicates that data in the first response information has been tampered with, and a key cannot be updated. Therefore, the node severs the communication connection to the second node or sends the update failure information to the second node, so that the node re-accesses a node that needs to perform a key update, thereby ensuring data security in a key update process.

According to a fourth aspect, an embodiment of this application discloses an apparatus, including:

a receiving unit, configured to receive a first key update request from a first node, where the first key update request includes a first key negotiation parameter and first identity authentication information;

a verification unit, configured to perform verification on the first identity authentication information by using a first shared key;

a determining unit, configured to: if the verification on the first identity authentication information succeeds, determine a first target key based on the first key negotiation parameter; and a sending unit, configured to send a first response message to the first node, where the first response message includes second identity authentication information, and the second identity authentication information is generated by using the first shared key.

Before an original session key expires, the foregoing node and the first node generate identity authentication information based on the first shared key. After receiving a message from the other node, one node first determines an identity of the other node by using the identity authentication information, and updates the key based on a key negotiation parameter only after identity authentication succeeds, to obtain the first target key. In this case, even if an eavesdropper has cracked the original session key, the eavesdropper cannot forge identity information, thereby avoiding a man-in-the-middle attack and improving data security in a key update process.

In a possible implementation of the fourth aspect, the first key update request is used to indicate at least one of a first update time point and a validity period of the first target key.

In a conventional key update process, a key update time point is predefined in a protocol and cannot be flexibly selected. However, in the key update method in this application, the first node may customize an update time point of the first target key and/or the validity period of the first target key, and indicate the update time point and/or the validity period to the node, so that the first target key can be enabled as required.

In a possible implementation of the fourth aspect, the first key update request includes a first frame number, and the first key update request indicates the first update time point by using the first frame number. The first frame number is indicated by using a plurality of bits, for example, F bits. Alternatively, the first key update request includes a media access control serial number (MAC SN), the MAC SN is indicated by using M bits, the M bits are some of the F bits, and M is less than F. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

In still another possible implementation of the fourth aspect, the first target key is applied within the validity period of the first target key starting from the first update time point.

In still another possible implementation of the fourth aspect, the first key negotiation parameter includes a first key negotiation algorithm parameter, and the first response message further includes a second key negotiation algorithm parameter; and the determining unit is configured to generate the first target key based on the first key negotiation algorithm parameter and the second key negotiation algorithm parameter.

In still another possible implementation of the fourth aspect, the first key negotiation parameter includes a fresh parameter; and the determining unit is configured to generate the first target key based on a second target key and the fresh parameter.

The second target key may be a shared key between the first node and the second node, and includes a master key, a session key, a pre-shared key (PSK), and the like. In addition, the first target key may be generated by using a key derivation algorithm (KDF) based on the second target key and the fresh parameter. For example, a new key DK derived by using a secret value Key may be expressed as: DK=KDF (Key, fresh), where fresh is a fresh parameter and is a parameter used for an update, and may include a counter value (counter), a serial number (number), a random value (rand), a frame number (frame number), and the like.

In still another possible implementation of the fourth aspect, the first target key is a master key of the node.

In still another possible implementation of the fourth aspect, the first key negotiation parameter includes a fresh parameter; and the determining unit is configured to generate the first target key based on a second target key, the fresh parameter, and an algorithm identifier, where the algorithm identifier is used to identify an algorithm used for determining an encryption key or an integrity protection key.

In still another possible implementation of the fourth aspect, the first target key is an integrity protection key or an encryption key of the second node. In still another possible implementation of the fourth aspect, at least one of the first key update request and the first response message is encrypted by using the encryption key determined based on the second target key, and/or integrity protection is performed on at least one of the first key update request and the first response message by using the integrity protection key determined based on the second target key.

It may be understood that a conventional key update method is to update a key when an old key expires. Because the second target key has expired, encryption and integrity protection are not performed in a process of determining a new key. However, in this embodiment of this application, the first target key may be determined before the key expires. Therefore, the first key update request and the first response message may be encrypted by using a key determined based on the second target key, thereby improving data security.

In still another possible implementation of the fourth aspect, if the verification on the first identity information fails, the sending unit and the receiving unit sever a connection to the first node or send update failure indication information to the first node by using the sending unit.

It may be learned that if the verification on the first identity authentication information fails, it indicates that an identity of the second node is untrusted. Therefore, the node may sever the connection to the first node or send the update failure indication information to the first node, to stop the current key process, thereby ensuring data security of the node in a key update process.

In still another possible implementation of the fourth aspect, the verification unit is further configured to: perform integrity verification on the first key update request; and if the integrity verification succeeds, continue to perform the step of performing verification on the second identity authentication information by using the first shared key; and if the integrity verification fails, the node severs a connection to the first node or sends update failure indication information to the first node by using the sending unit.

Before performing verification on identity information, the foregoing node first performs integrity verification on the first key update request, to determine that information in the first key update request is not tampered with. If the integrity verification fails, it indicates that data in the first key update request has been tampered with, and a key cannot be updated. Therefore, the foregoing node may sever the connection to the first node or send the update failure indication information to the first node, thereby ensuring data security in a key update process.

According to a fifth aspect, an embodiment of this application discloses an apparatus. The apparatus includes a memory, a processor, and a communications interface, the memory stores a calculator program, and the processor invokes the computer program stored in the memory, to perform the following operations:

sending a first key update request to a second node through the communications interface, where the first key update request includes a first key negotiation parameter and first identity authentication information, and the first identity authentication information is generated by using a first shared key;

receiving a first response message from the second node through the communications interface, where the first response message includes second identity authentication information;

performing verification on the second identity authentication information by using the first shared key; and if the verification on the second identity authentication information succeeds, determining a first target key based on the first key negotiation parameter.

In a key update process, the foregoing node and the second node generate identity authentication information based on the first shared key. After receiving a message from the other node, one node first determines an identity of the other node by using the identity authentication information, and updates the key based on a key negotiation parameter only after identity authentication succeeds, to obtain the first target key. In this case, even if an eavesdropper has cracked an original session key, the eavesdropper cannot forge identity information, thereby avoiding a man-in-the-middle attack and improving data security in a key update process.

In a possible implementation of the fifth aspect, the first key update request is used to indicate at least one of a first update time point and a validity period of the first target key.

In a conventional key update process, a key update time point is predefined in a protocol and cannot be flexibly selected. However, the node provided in this application may customize an update time point of the first target key and/or the validity period of the first target key, and indicate the update time point and/or the validity period to the second node, so that the first target key can be enabled as required.

In still another possible implementation of the fifth aspect, the first key update request includes a first frame number, and the first key update request indicates the first update time point by using the first frame number. The first frame number is indicated by using a plurality of bits, for example, F bits. Alternatively, the first key update request includes a media access control serial number (MAC SN), the MAC SN is indicated by using M bits, the M bits are some of the F bits, and M is less than F. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

In still another possible implementation of the fifth aspect, the first target key is applied within the validity period of the first target key starting from the first update time point.

In still another possible implementation of the fifth aspect, the first key negotiation parameter includes a first key negotiation algorithm parameter, and the first response message further includes a second key negotiation algorithm parameter; and in the operation of determining a first target key based on the first key negotiation parameter, the processor is specifically configured to:

generate the first target key based on the first key negotiation algorithm parameter and the second key negotiation algorithm parameter.

In still another possible implementation of the fifth aspect, the first key negotiation parameter includes a fresh parameter; and in the operation of determining a first target key based on the first key negotiation parameter, the processor is specifically configured to:

generate the first target key based on a second target key and the fresh parameter.

The second target key may be a shared key between the first node and the second node, and includes a master key, a session key, a pre-shared key (PSK), and the like. In addition, the first target key may be generated by using a key derivation algorithm (KDF) based on the second target key and the fresh parameter. For example, a new key DK derived by using a secret value Key may be expressed as: DK=KDF (Key, fresh), where fresh is a fresh parameter and is a parameter used for an update, and may include a counter value (counter), a serial number (number), a random value (rand), a frame number (frame number), and the like.

In still another possible implementation of the fifth aspect, the first key negotiation parameter includes a fresh parameter; and in the operation of determining a first target key based on the first key negotiation parameter, the processor is specifically configured to:

In still another possible implementation of the fifth aspect, the first target key is a master key of the node.

generate the first target key based on a second target key, the fresh parameter, and an algorithm identifier, where the algorithm identifier is used to mark an algorithm used for determining an encryption key or an integrity protection key.

In still another possible implementation of the fifth aspect, the first target key is an integrity protection key or an encryption key of the node.

In still another possible implementation of the fifth aspect, at least one of the first key update request and the first response message is encrypted by using the encryption key determined based on the second target key, and/or integrity protection is performed on at least one of the first key update request and the first response message by using the integrity protection key determined based on the second target key.

It may be understood that a conventional key update method is to update a key when an old key expires. Because the second target key has expired, encryption and integrity protection are not performed in a process of determining a new key. However, in this embodiment of this application, the first target key may be determined before the key expires. Therefore, the first key update request and the first response message may be encrypted by using a key determined based on the second target key, thereby improving data security.

In still another possible implementation of the fifth aspect, the communications interface sends the first key update request to the second node by using a first communication frame, where a second frame number of the first communication frame is less than a third frame number carried in a key update request used during a last key update, the third frame number is used to indicate a start time point of a last updated key, and the first frame number is greater than the second frame number and less than the third frame number.

When security protection is performed on a communication frame in a communication process, a used encryption method may be to perform encryption based on a frame number and a last updated key. Therefore, the first target key is determined before a frame number repeats to a frame number of the last updated key, so that a data frame is encrypted by using the first target key. In this way, data frames with a same frame number can be encrypted twice by using different keys, thereby improving data security. In an alternative solution, the first key update request includes a MAC serial number (MAC SN) instead of the first frame number, the MAC SN is indicated by using M bits, the M bits are some of the F bits, and M is less than F. Alternatively, the third frame number carried in the key update request used during the last key update may also be replaced with a MAC SN, that is, a MAC SN indicated by some of a plurality of bits used to indicate the third frame number. In this alternative solution, a value relationship among the first frame number, the second frame number, and the third frame number remains unchanged. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

In still another possible implementation of the fifth aspect, the communication frame includes at least one of a signaling plane uplink frame, a signaling plane downlink frame, a user plane uplink frame, or a user plane downlink frame.

In still another possible implementation of the fifth aspect, the processor is further configured to: if the verification on the second identity information fails, indicate the communications interface to sever a communication connection to the second node or send update failure information to the second node through the communications interface.

It may be learned that if the verification on the second identity authentication information fails, it indicates that an identity of the second node is untrusted. Therefore, the foregoing node may sever the communication connection to the second node or send the update failure information to the second node, so that an access request is re-initialized to a node that needs to perform a key update, thereby ensuring data security in a key update process.

In still another possible implementation of the fifth aspect, after receiving the first response message from the second node, the processor is further configured to: perform integrity verification on the first response message; and if the integrity verification succeeds, continue to perform the step of performing verification on the second identity authentication information by using the first shared key; and the processor is further configured to: if the integrity verification fails, indicate the communications interface to sever a communication connection to the second node or send update failure information to the second node through the communications interface.

It may be learned that integrity verification may be performed to determine whether information is tampered with. Therefore, before performing verification on identity information, the foregoing node first performs integrity verification on the first response message, to determine that information in the first response message is not tampered with. If the integrity verification fails, it indicates that data in the first response information has been tampered with, and a key cannot be updated. Therefore, the node severs the communication connection to the second node or sends the update failure information to the second node, so that the node re-accesses a node that needs to perform a key update, thereby ensuring data security in a key update process.

According to a sixth aspect, an embodiment of this application discloses an apparatus. The node includes a memory, a processor, and a communications interface, the memory stores a calculator program, and the processor invokes the computer program stored in the memory, to perform the following operations:

sending a first key update request to a second node through the communications interface, where the first key update request includes a first key negotiation parameter and first identity authentication information, and the first identity authentication information is generated by using a first shared key;

receiving a first response message from the second node through the communications interface, where the first response message includes second identity authentication information;

performing verification on the second identity authentication information by using the first shared key; and if the verification on the second identity authentication information succeeds, determining a first target key based on the first key negotiation parameter.

Before an original session key expires, the foregoing node and the first node generate identity authentication information based on the first shared key. After receiving a message from the other node, one node first determines an identity of the other node by using the identity authentication information, and updates the key based on a key negotiation parameter only after identity authentication succeeds, to obtain the first target key. In this case, even if an eavesdropper has cracked the original session key, the eavesdropper cannot forge identity information, thereby avoiding a man-in-the-middle attack and improving data security in a key update process.

In a possible implementation of the sixth aspect, the first key update request is used to indicate at least one of a first update time point and a validity period of the first target key.

In a conventional key update process, a key update time point is predefined in a protocol and cannot be flexibly selected. However, in this application, the first node may customize an update time point of the first target key and/or the validity period of the first target key, and indicate the update time point and/or the validity period to the node, so that the first target key can be enabled as required.

In still another possible implementation of the sixth aspect, the first key update request includes a first frame number, and the first key update request indicates the first update time point by using the first frame number. The first frame number is indicated by using a plurality of bits, for example, F bits. Alternatively, the first key update request includes a media access control serial number (MAC SN), the MAC SN is indicated by using M bits, the M bits are some of the F bits, and M is less than F. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

In still another possible implementation of the sixth aspect, the first target key is applied within the validity period of the first target key starting from the first update time point.

In still another possible implementation of the sixth aspect, the first key negotiation parameter includes a first key negotiation algorithm parameter, and the first response message further includes a second key negotiation algorithm parameter; and in the operation of determining a first target key based on the first key negotiation parameter, the processor is specifically configured to:

generate the first target key based on the first key negotiation algorithm parameter and the second key negotiation algorithm parameter.

In still another possible implementation of the sixth aspect, the first key negotiation parameter includes a fresh parameter; and in the operation of determining a first target key based on the first key negotiation parameter, the processor is specifically configured to:

generate the first target key based on a second target key and the fresh parameter.

The second target key may be a shared key between the first node and the second node, and includes a master key, a session key, a pre-shared key (PSK), and the like. In addition, the first target key may be generated by using a key derivation algorithm (KDF) based on the second target key and the fresh parameter. For example, a new key DK derived by using a secret value Key may be expressed as: DK=KDF (Key, fresh), where fresh is a fresh parameter and is a parameter used for an update, and may include a counter value (counter), a serial number (number), a random value (rand), a frame number (frame number), and the like.

In still another possible implementation of the sixth aspect, the first target key is a master key of the node.

In still another possible implementation of the sixth aspect, the first key negotiation parameter includes a fresh parameter; and in the operation of determining a first target key based on the first key negotiation parameter, the processor is specifically configured to:

generate the first target key based on a second target key, the fresh parameter, and an algorithm identifier, where the algorithm identifier is used to mark an algorithm used for determining an encryption key or an integrity protection key.

In still another possible implementation of the sixth aspect, the first target key is an integrity protection key or an encryption key of the node.

In still another possible implementation of the sixth aspect, at least one of the first key update request and the first response message is encrypted by using the encryption key determined based on the second target key, and/or integrity protection is performed on at least one of the first key update request and the first response message by using the integrity protection key determined based on the second target key.

It may be understood that a conventional key update method is to update a key when an old key expires. Because the second target key has expired, encryption and integrity protection are not performed in a process of determining a new key. However, in this embodiment of this application, the first target key may be determined before the key expires. Therefore, the first key update request and the first response message may be encrypted by using a key determined based on the second target key, thereby improving data security.

In still another possible implementation of the sixth aspect, the processor is further configured to: if the verification on the first identity information fails, indicate the communications interface to sever a communication connection to the first node or send update failure indication information to the first node through the communications interface.

It may be learned that if the verification on the first identity authentication information fails, the node may sever the connection to the first node or send the update failure indication information to the first node, to stop the current key process, thereby ensuring data security of the node in a key update process.

In still another possible implementation of the sixth aspect, after receiving the first key update request from the first node, the processor is further configured to: perform integrity verification on the first key update request; and if the integrity verification succeeds, continue to perform the step of performing verification on the first identity authentication information by using the first shared key; and the processor is further configured to: if the integrity verification fails, indicate the communications interface to sever a connection to the first node or send update failure indication information to the first node through the communications interface.

Before performing verification on identity information, the foregoing node first performs integrity verification on the first key update request, to determine that information in the first key update request is not tampered with. If the integrity verification fails, it indicates that data in the first key update request has been tampered with, and a key cannot be updated. Therefore, the foregoing node may sever the connection to the first node or send the update failure indication information to the first node, thereby ensuring data security in a key update process.

According to a seventh aspect, an embodiment of this application discloses a computer readable storage medium. The computer readable storage medium stores a computer program. When the computer program is run on one or more processors, the method in any one of the first aspect and the possible implementations of the first aspect or in any one of the second aspect and the possible implementations of the second aspect is performed.

According to an eighth aspect, an embodiment of this application discloses a chip system. The chip system includes at least one processor, a memory, and an interface circuit. The interface circuit is configured to provide an information input/output for the at least one processor, the at least one memory stores a computer program, and when the computer program is run one or more processors, the method in any one of the first aspect and the possible implementations of the first aspect or in any one of the second aspect and the possible implementations of the second aspect is performed.

According to a ninth aspect, an embodiment of this application discloses a vehicle. The vehicle includes a first node (for example, an automobile cockpit domain controller (CDC)). Further, the vehicle further includes a second node (for example, at least one of modules such as a camera, a screen, a microphone, a sounder, a radar, an electronic key, and a keyless entry or startup system controller). The first node is the node in any one of the third aspect and the possible implementations of the third aspect or in any one of the fifth aspect and the possible implementations of the fifth aspect, and the second node is the node in any one of the fourth aspect and the possible implementations of the fourth aspect or in any one of the sixth aspect and the possible implementations of the sixth aspect.

BRIEF DESCRIPTION OF DRAWINGS

The following describes accompanying drawings used in embodiments of this application.

DESCRIPTION OF EMBODIMENTS

Figure 1:
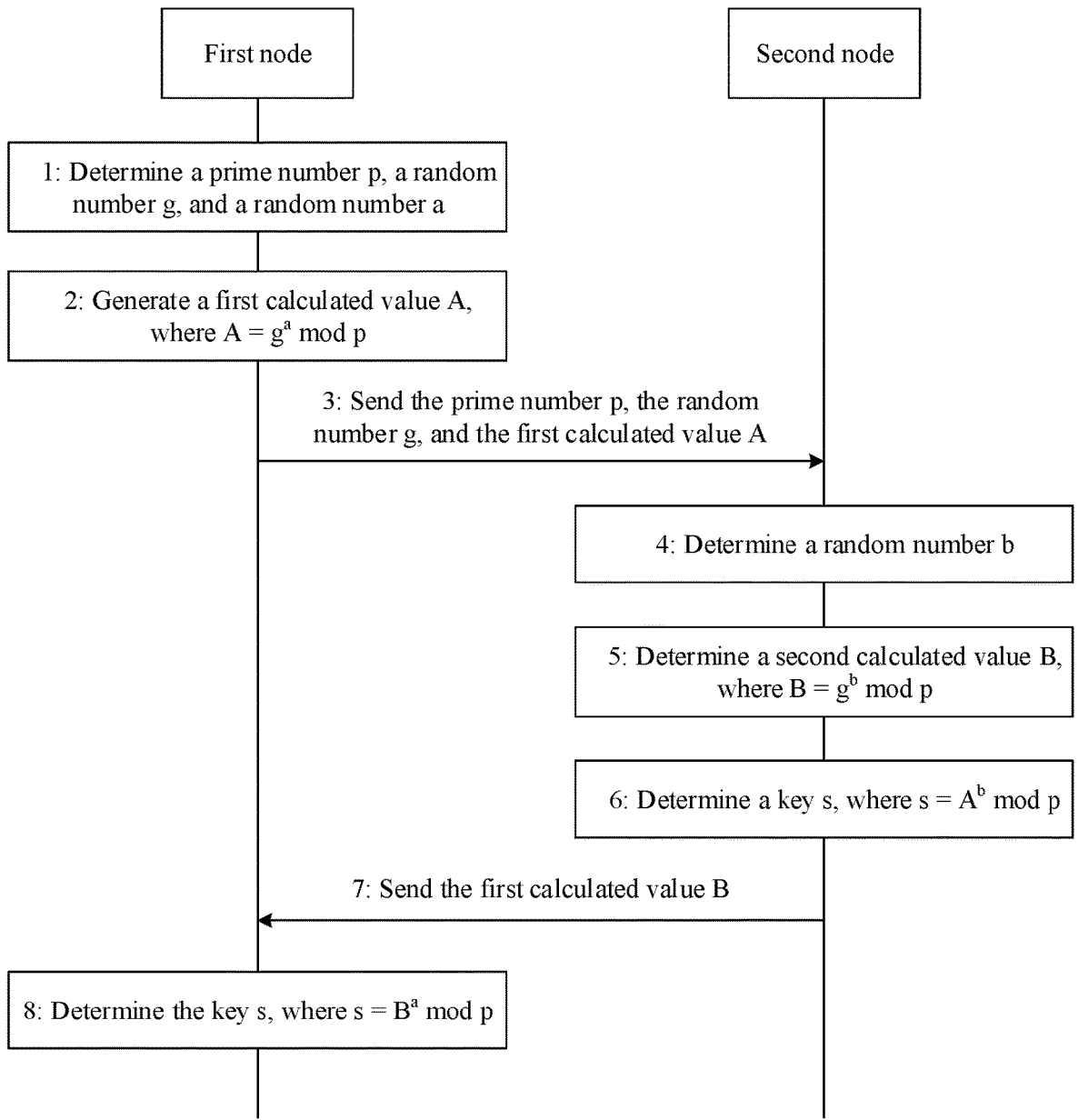
FIG. 1 is a schematic principle diagram of a DH algorithm according to an embodiment of this application.

The following describes the embodiments of this application with reference to the accompanying drawings in the embodiments of this application. It should be noted that, in this application, the words "example", "for example", or the like are used to represent giving an example, an illustration, or a description. Any embodiment or design solution described as an "example" or "for example" in this application should not be explained as having more advantages than another embodiment or design solution. Exactly, use of the word "example", "for example", or the like is intended to present a relative concept in a specific manner.

The following first briefly describes related technologies and technical terms in this application for ease of understanding.

1. Node

The node is an electronic device with a data receiving/sending capability. For example, the node may be an automobile cockpit (Cockpit Domain) device, or a module (one or more of modules such as a cockpit domain controller (CDC), a camera, a screen, a microphone, a sounder, an electronic key, and a keyless entry or startup system controller) in an automobile cockpit device. In a specific implementation process, the node may be a data transfer device, for example, a router, a repeater, a bridge, or a switch, or may be a terminal device, for example, various types such as user equipment (UE), a mobile phone, a tablet computer (pad), a desktop computer, a headset, and a sounder; and may further include a machine intelligence device such as a self-driving device, a transportation safety device, a virtual reality (VR) terminal device, an augmented reality (AR) terminal device, a machine type communication (MTC) device, an industrial control device, a remote medical device, a smart grid device, and a smart city device, and may further include a wearable device (for example, a smart watch, a smart band, or a pedometer), and the like. In some technical scenarios, a name of a device with a similar data receiving/sending capability may not be referred to as a node. However, for ease of description, electronic devices with data receiving/sending capabilities are collectively referred to as nodes in the embodiments of this application.

2. Key

In a communication process, data is transmitted between communication nodes. If data needs to be kept confidential, the data needs to be encrypted by using a key. Because secret levels and secret classes of content that need to be kept confidential in a node are sometimes different, different types of keys need to be used for encryption. Common key types include a session key, a master key, a shared key, and the like.

(1). Session Key

Session keys include an encryption key, an integrity protection key, a file key, and the like. The encryption key may be used to protect data transmitted by a node, and may also be referred to as a data encryption key. The integrity protection key may be used to perform integrity protection on transmitted data. The file key may be used to protect a transmitted file. Optionally, the session key may be preconfigured in nodes of two communication parties, or may be obtained through negotiation between two communication parties, or may be derived by using an original key, or may be allocated by a key distribution center (KDC). Optionally, the session key may be a key of a symmetric encryption algorithm, or may be a key of an asymmetric encryption algorithm.

(2). Master Key

The master key is a high-class secret value of a node and may be used to derive a session key, a submaster key, and the like. The submaster key is a key whose class is between the master key and the session key, and is sometimes referred to as an intermediate key.

In some possible solutions, the master key may be strictly protected through physical or electronic isolation.

(3). Shared Key (SK)

The shared key is a same secret value stored in nodes of two communication parties. In some optional solutions, a node may use a master key, a session key, or a pre-shared key (PSK) as a shared key. There may be one or more shared keys in the node.

For example, a node uses a session key as a shared key. For example, if a node A and a node B communicate with each other by using a symmetric encryption algorithm (that is, a same key is used for encryption and decryption), the node A encrypts a plaintext message by using an encryption key Km and sends the plaintext message to the node B, and the node B decrypts the plaintext message by using a decryption key Km. In this case, the encryption key Km may be used as a shared key between the two nodes.

For another example, a node may use a pre-shared key as a shared key, and the pre-shared key is a secret value that identifies a connection between two nodes. The pre-shared key may be preconfigured in nodes of two communication parties. For example, a cockpit domain controller (CDC) and an in-vehicle radar device of a vehicle are two nodes that may communicate with each other, a secret value has been preconfigured for the CDC and the in-vehicle radar during deployment, and only the CDC of the vehicle may be connected to the roof radar or transmit data to the roof radar. The pre-shared key may be alternatively obtained by two communication parties through communication. For example, before the CDC is connected to a mobile phone through Bluetooth, the pre-shared key may be generated by confirming pairing. In addition, the pre-shared key may be separately sent by a trusted device (for example, a KDC) to a first node and a second node.

3. Key Negotiation

Key negotiation is a process in which two communication parties exchange some parameters to obtain a key through negotiation. An algorithm used for key negotiation is referred to as a key negotiation algorithm or a key exchange algorithm. Common key negotiation algorithms include a Diffie-Hellman (DH) algorithm, an elliptic curve cryptography ((Elliptic Curve Cryptosystems (ECC) Diffie-Hellman (ECDH) algorithm, an Oakley algorithm, a Chinese cryptography algorithm (for example, an SM1, an SM2, an SM3, and an SM4), and the like.

Taking the DH algorithm as an example, two nodes respectively generate random numbers a and b by using a same prime number p and a same random number g. The first node sends a value generated by the $a^{th}$ power of g mod P to the second node, the second node sends a value generated by the $b^{th}$ power of g mod P to the first node, then the first node performs an $a^{th}$ power operation on a received result, and the second node performs an $a^{th}$ power operation on a received result, where mod represents a modulo operation. Finally, a password is formed, and a key exchange is completed.

FIG. 1 is a schematic principle diagram of a DH algorithm according to an embodiment of this application. Steps of exchanging a key in the DH algorithm are as follows:

Step 1: A first node determines a prime number p, a random number g, and a random number a.

Step 2: The first node generates a first calculated value A, where A satisfies the following equation: $A=g^a \bmod p$.

Step 3: The first node sends the prime number p, the random number g, and the first calculated value A to a second node.

Step 4: The second node determines a random number b.

Step 5: The second node obtains a second calculated value B through calculation, where B satisfies, for example, the following equation: $B=g^b \bmod p$.

Step 6: The second node calculates a key $s=A^b \bmod p$ through negotiation.

Step 7: The second node sends the first calculated value B to the first node.

Step 8: The first node calculates $s=B^a \bmod p$.

Because $K=A^b \bmod p=(g^a \bmod p)^b \bmod p=g^{ab} \bmod p=(g^b \bmod p)^a \bmod p=B^a \bmod p$, keys s calculated by the first node and the second node are the same. In addition, because the key s is not transmitted on a network, and values of the prime number p, the random number g, the random number a, and the random number b selected in the algorithm are actually very large, it is difficult to derive the key s based on the prime number p, the random number g, the first calculated value A, and the second calculated value B transmitted on the network. Therefore, a key obtained by using the DH algorithm is secure.

4. Key Derivation

Key derivation is to derive one or more keys from one secret value. An algorithm used to derive a key is referred to as a key derivation algorithm (key derivation function, KDF). For example, a new key DK derived by using a secret value Key may be expressed as:

DK=KDF (Key, fresh), where fresh is a fresh parameter and is a parameter used an update, and may include at least one of a counter value (counter), a serial number (number), a random value (rand), a frame number (frame number), and the like. Fresh parameters at different moments are usually different. The frame number is a number of a frame, and the frame is a specific information structure including several bits or fields. For example, in a time division multiple access (TDMA) communications technology, time is segmented into periodic frames, and a frame number of each frame periodically changes from 0 to 2715647.

Common key derivation algorithms include a password-based key derivation function (PBKDF), a scrypt algorithm, and the like. A PBKDF algorithm further includes a first-generation (PBKDF1) and a second-generation (PBKDF2). Optionally, in a key derivation process of some KDF algorithms, a hash algorithm is used to perform a hash change on an input secret value. Therefore, an algorithm identifier may be further received as an input in the KDF function, to indicate a hash algorithm to be used.

Figure 2:
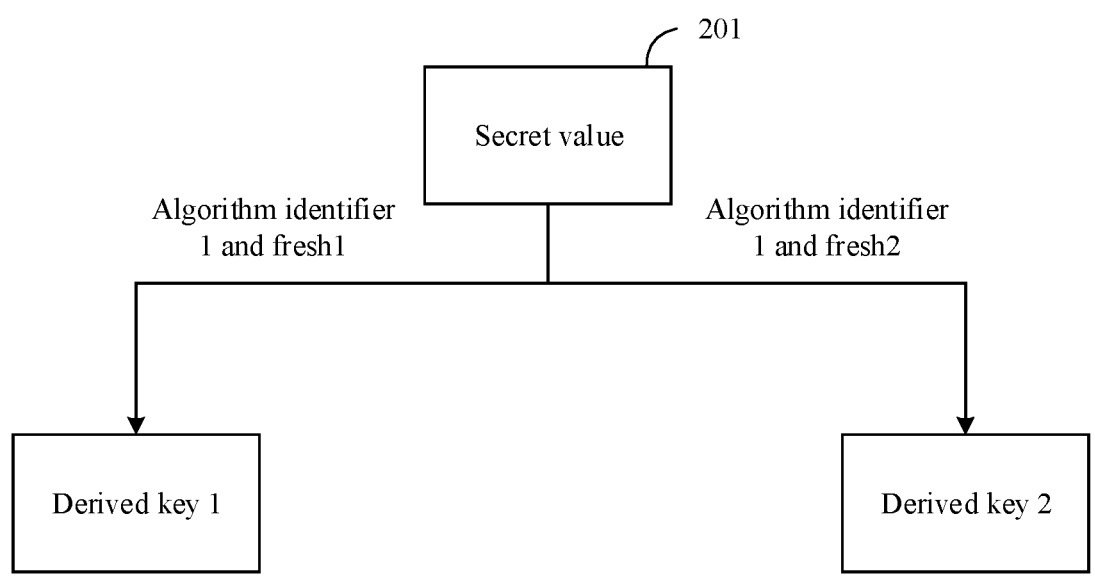
FIG. 2 is a schematic diagram of a key derivation algorithm according to an embodiment of this application.

Taking the PBKDF2 as an example, a new key DK derived by using a secret value Key in the PBKDF2 algorithm may be expressed as DK=PBKDF2 (PRF, Key, salt, c, dk_len), where the parameter PRF indicates an identifier of a hash algorithm to be used, salt is a randomly generated salt and may be considered as a fresh parameter, c is a quantity of iteration times, and dk_len is a length of the generated DK, and may also be referred to as a block size and may be by default. FIG. 2 is a schematic diagram of a key derivation algorithm according to an embodiment of this application. A derived key 1 may be obtained by using a secret value 201, an algorithm identifier 1, and a fresh parameter fresh1, and a derived key 2 may be obtained by using the secret value 201, the algorithm identifier 1, and a fresh parameter fresh2, where a quantity of iteration times and a block size are preset.

5. Cryptographic Algorithm

The cryptographic algorithm may be a mathematical function for encryption and/or decryption, and may also be referred to as a cryptographic function. A common cryptographic algorithm includes a hash algorithm, an authentication algorithm, or the like. The hash algorithm is also referred to as a hash function or a hash algorithm. The hash algorithm may be used to convert information of any length into an identifier, and it is difficult to find an inverse rule. Common hash algorithms include a hash-based message authentication code (HMAC), an HMAC Chinese cryptography algorithm (HMAC-SM) (for example, an HMAC-SM3), an HMAC-secure hash algorithm (HMAC-SHA) such as an HMAC-SHA256 or an HMAC-SHA3, and the like, and may further include a message digest (MD) algorithm such as an MD2, an MD4, or an MD5. Further, the cryptographic algorithm may further include a rapid-amplification of cDNA ends (RACE) integrity primitives evaluation message digest (RACE Integrity Primitives Evaluation Message Digest, RIPEMD) algorithm.

The following describes a system architecture and a service scenario in the embodiments of this application. It should be noted that, the system architecture and the service scenario described in this application are intended to describe the technical solutions in this application more clearly, and do not constitute a limitation on the technical solutions provided in this application. A person of ordinary skill in the art may know that: With the evolution of the system architecture and the emergence of new service scenarios, the technical solutions provided in this application are also applicable to similar technical problems.

Figure 3:
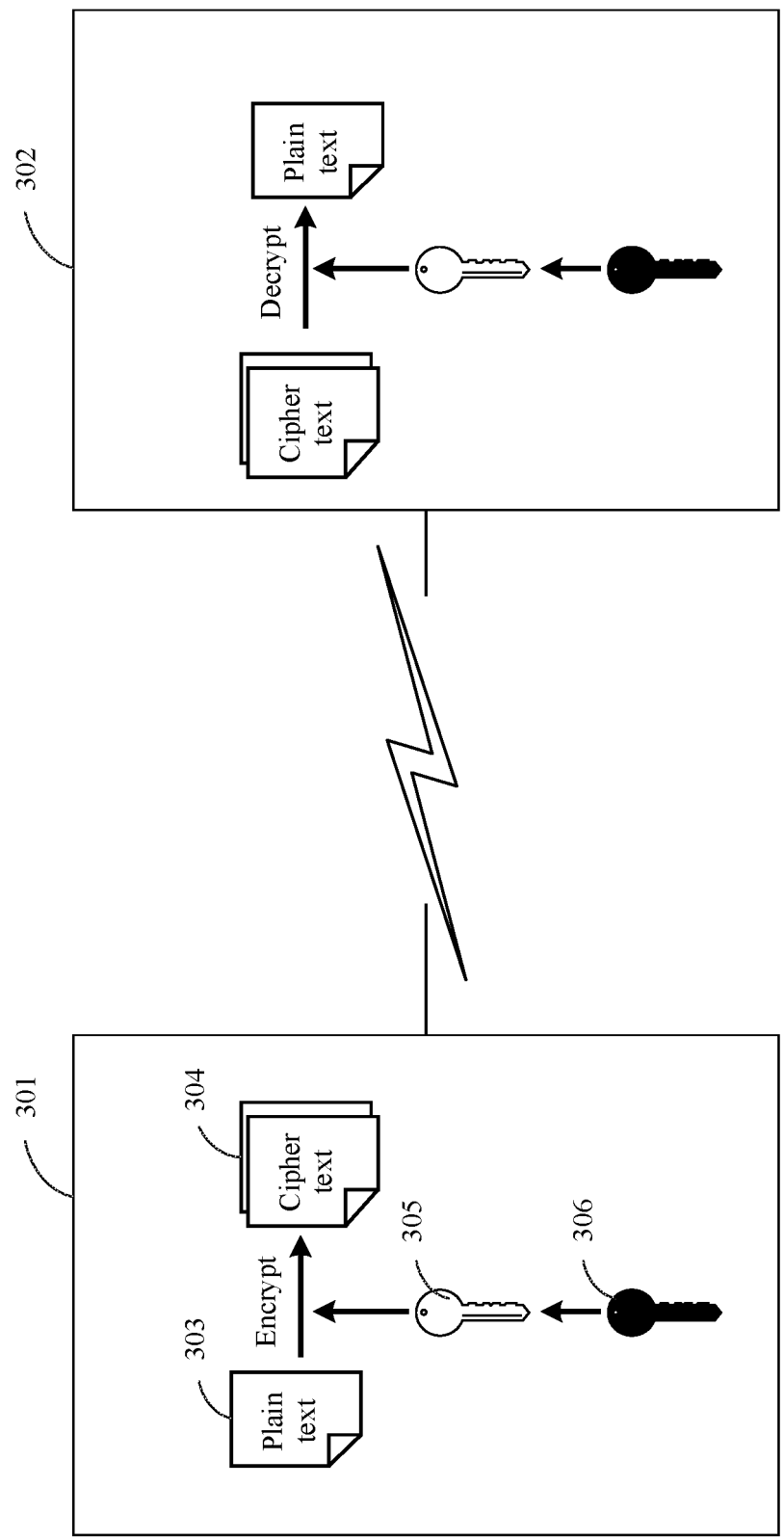
FIG. 3 is a schematic architectural diagram of a communications system according to an embodiment of this application.

FIG. 3 is a schematic architectural diagram of a communications system according to an embodiment of this application. The communications system includes a first node 301 and a second node 302. The first node 301 may communicate with the second node 302 over a data link. To prevent an eavesdropper (or an attacker) from obtaining content of information, information during communication may be encrypted by using an encryption key. For example, the first node 301 encrypts, by using an encryption key 305, a plaintext message 303 that needs to be sent, to obtain a ciphertext message 304. The first node 301 sends the ciphertext message 304 to the second node 302. Correspondingly, after receiving the ciphertext message 304, the second node 302 may decrypt the ciphertext message 304 by using a key to obtain the plaintext message 303, thereby completing data transmission. In addition to the encryption key and a decryption key, the first node 301 and the second node 302 may further include keys such as an integrity protection key, a file key, and a master key.

Figure 4:
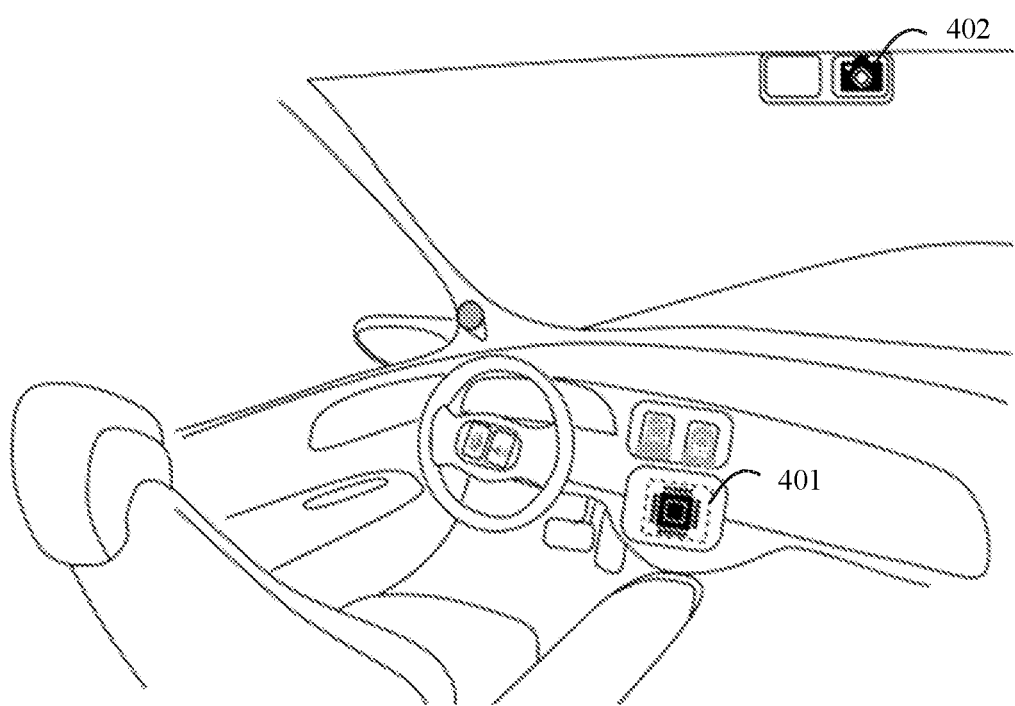
FIG. 4 is a schematic diagram of a use scenario of a key update method according to an embodiment of this application.

It should be noted that the first node 301 and the second node 302 may be different devices. For example, FIG. 4 is a schematic diagram of a use scenario of a key update method according to an embodiment of this application. A CDC 401 and a camera 402 are two nodes in a smart cockpit device. The CDC 401 may be considered as the first node 301, and the camera 402 may be considered as the second node 302. The camera 402 encrypts video data by using a key and sends the encrypted video data to the CDC 401 through Bluetooth, and the CDC 401 receives the encrypted video data through Bluetooth, and decrypts the encrypted video data to obtain photographed video data. The first node 301 and the second node 302 may be alternatively nodes of a same type. For example, if the first node 301 is a mobile phone A, and the second node 302 is a mobile phone B, the mobile phone A may encrypt local voice data and send the encrypted voice data to the end B through a network call.

Optionally, a data link for transmitting data between the first node 301 and the second node 302 may include various types of connection media, for example, a wired link, a wireless link (for example, Wi-Fi or Bluetooth), or an optical fiber link.

Optionally, the first node 301 may be a communication initiator, and may be referred to as a master node. Correspondingly, the second node 302 is a communication receiving party, and may be referred to as a secondary node.

To ensure that encrypted content in a node is not disclosed, a service life of a key is usually limited. Therefore, a key update mechanism needs to be introduced. For example, taking the CDC 401 and the camera 402 that are connected through Bluetooth as an example, if an EO encryption manner is used, the CDC 401 and the camera 402 need to update a key once within $2^{28}$ Bluetooth ticks (about 23.3 hours); and if an advanced encryption standard (AES) encryption algorithm is used, the CDC 401 and the camera 402 need to update a key once within $2^{38}$ ticks (about 2.72 years). For another example, in a node including a master key and a session key, when the session key is generated by using the master key and a counter value, the master key needs to be updated before the counter value is reversed (or a new round of counting restarts). In a key update process, a message that is used for a key update and that is transmitted between nodes is vulnerable to a man-in-the-middle attack, thereby affecting data security. To resolve this problem, the embodiments of this application provide the following method.

Figure 5:
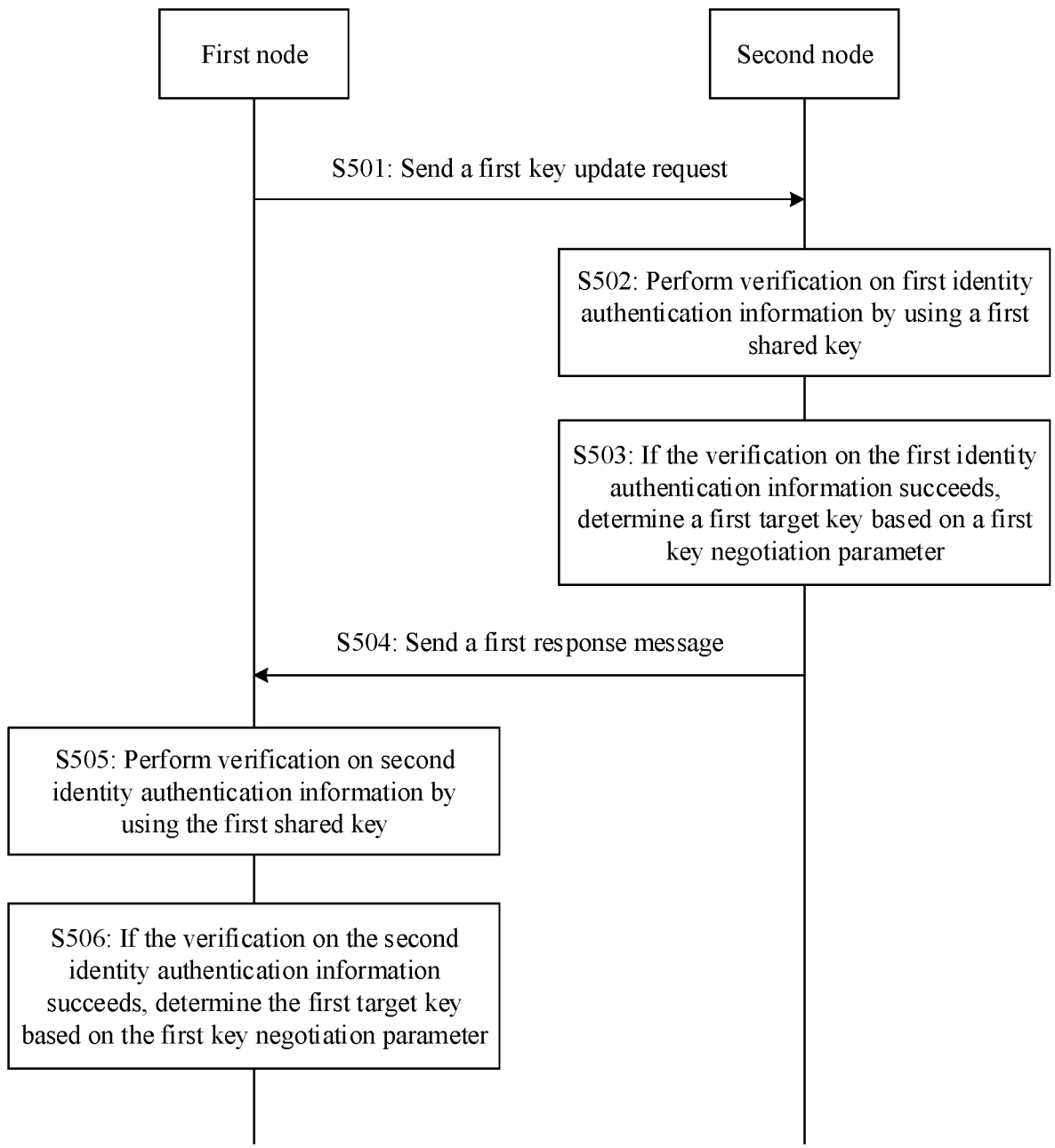
FIG. 5 is a schematic flowchart of a key update method according to an embodiment of this application.

FIG. 5 is a schematic flowchart of a key update method according to an embodiment of this application. The key update method may be implemented based on the architecture shown in FIG. 3. The method includes but is not limited to the following steps.

Step S501: A first node sends a first key update request to a second node.

Specifically, the first key update request includes a first key negotiation parameter and first identity authentication information. The first key negotiation parameter is a key parameter used to generate a first target key. Several optional cases are described as follows:

Case 1: The first key negotiation parameter may include a parameter KEm of a key negotiation algorithm. For ease of description, the parameter KEm of the key negotiation algorithm may be referred to as a first key negotiation algorithm parameter.

In an example in which the key negotiation algorithm is a DH algorithm, parameters of the DH algorithm that are determined in the first node include a prime number p, a random number g, a random number a, and a calculated value A. The calculated value A satisfies the following equation: $A=g^a \bmod p$, and the prime number p and the random number g are further used by the second node to generate another parameter of the DH algorithm. Optionally, because the prime number p, the random number g, and the calculated value A need to be sent to the second node, the prime number p, the random number g, and the calculated value A may be considered as a public key of the first node. Correspondingly, because the random number a is not sent to the second node, the random number a may be considered as a private key of the first node. Optionally, the first node uses the calculated value A as the first key negotiation algorithm parameter KEm, and sends the prime number p and the random number g to the second node before sending the first key update request, or may use the prime number p, the random number g, and the calculated value A as the first key negotiation algorithm parameter KEm, and send the first key negotiation algorithm parameter KEm to the second node by using the first key update request.

Case 2: The first key negotiation parameter may include a fresh parameter.

In this embodiment of this application, the first identity authentication information in the first key update request may be generated by using a shared key between the first node and the second node. For ease of description, the shared key for generating the first key update request is referred to as a first shared key, and the first shared key may be a key such as a master key or a pre-shared key (PSK).

In an optional solution, the first identity authentication information may be generated by using a cryptographic algorithm. In an example in which the cryptographic algorithm is an HMAC, the HMAC is used to receive an input of one or more character parameters, and output an identifier, and the identifier may be used as the first identity authentication information. The following uses an example in which a hash function is an HMAC for description.

Example 1: The first identity authentication information AUTHm generated by the first node may be an HMAC (PSK), or in other words, AUTHm=HMAC (PSK).

Example 2: If the first key negotiation parameter is denoted as S1, the first identity authentication information AUTHm generated by the first node may be an HMAC (PSK, S1), or in other words, AUTHm=HMAC (PSK, S1). S1 may be the first key negotiation algorithm parameter KEm in the foregoing case 1, or may be the fresh parameter (for example, at least one of a counter value, a serial number, a random value, and a frame number) in the foregoing case 2.

Example 3: If the first key update request further includes a random number value (number used once, NONCE), the first identity authentication information AUTHm generated by the first node may be an HMAC (PSK, S1, NONCEm), where the NONCEm is a random number value generated by the first node, or in other words, AUTHm=HMAC (PSK, S1, NONCEm).

In this embodiment of this application, the first key update request may further indicate at least one piece of information about a validity period (expiration) of the first target key and a first update time point. The first update time point is used to indicate a time at which the first target key is enabled, and may also be referred to as an enable time or a start time point.

For example, the first key update request includes first indication information indicating the validity period of the first target key. The first indication information may be a specific datetime. For example, if the first indication information is 00:52:50 on Feb. 6, 2020, it may indicate that a valid datetime of the first target key ends at 00:52:50 on Feb. 6, 2020, or an invalid datetime starts after 00:52:50 on Feb. 6, 2020. The first indication information may be alternatively a character string indicating a valid time or an invalid time, for example, a timestamp "1590921570", indicating 00:52:50 on Feb. 6, 2020. The first indication information may be alternatively a timer or the like. For example, if the validity period of the first target key is 1000 seconds, it indicates that the first target key is valid before the $1000^{th}$ second after being generated or enabled. The second indication information may further include a frame number and the like.

For another example, the first key update request includes second indication information indicating the first update time point. The second indication information may be one or more of a frame number, a specific datetime, a character string, a timer, or the like. The frame number is a number or an index of a communication frame, and the communication frame is a message structure when the first node communicates with the second node. The communication frame includes at least one of a signaling plane uplink frame, a signaling plane downlink frame, a user plane uplink frame, or a user plane downlink frame. The frame number of the communication frame usually circulates within a preset frame number value range. For example, in a time division multiple access (TDMA) communications technology, time is segmented into periodic frames, and a frame number of each frame periodically changes from 0 to 2715647. The first node may indicate the first update time point by using a frame number carried in an update request. For ease of description, a frame number carried in the first key update request is referred to as a first frame number. For example, if the first frame number is 2345, it indicates that the first target key is applied after a communication frame starting from the frame number 2345. Optionally, the first frame number may be a plurality of frame numbers. For example, if the first frame number may include a frame number A of a user plane downlink frame and a frame number B of a user plane uplink frame, it may indicate that the first target key is applied to user plane downlink frames starting and following the frame number A and the first target key is applied to user plane uplink frames starting and following the frame number B.

Optionally, if the first key update request indicates the first update time point by using the first frame number, the first frame number may be indicated by using a plurality of bits, for example, F bits. Alternatively, the first key update request includes a media access control serial number (MAC SN), the MAC SN is indicated by using M bits, the M bits are some of the F bits, and M is less than F. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency. For ease of description, the first frame number is used as an example for description in this specification, and is not intended to limit the present invention.

If the first key update request further includes the validity period and/or the first update time point, the following examples may also exist for the first identity authentication information:

Example 4: If the first key update request includes information expiration indicating the validity period of the first target key, the identity authentication information AUTHm generated by the first node may be an HMAC (PSK, S1, expiration), or in other words, AUTHm=HMAC (PSK, S1, expiration).

Example 5: If the first key update request includes information timer indicating the first update time point, the identity authentication information AUTHm generated by the first node may be an HMAC (PSK, S1, timer), or in other words, AUTHm=HMAC (PSK, S1, timer). The enable time timer indicates a time at which a new key is started.

Example 6: If the first key update request includes a random number value NONCEm, information expiration indicating the validity period of the first target key, and information timer indicating the first update time point, the identity authentication information AUTHm generated by the first node may be an HMAC (PSK, S1, NONCEm, expiration, timer), or in other words, AUTHm=HMAC (PSK, S1, NONCEm, expiration, timer).

Certainly, when the first identity authentication information is generated, other information (for example, a number of the first node, an address of the first node, or an identifier of a connection between the first node and the second node) may be included in addition to the first shared key. It should be noted that if the first key update request includes parameters such as the random number value NONCEm, the information expiration indicating the validity period of the first target key, and the information timer indicating the first update time point, the first node may alternatively not use some or all of the parameters in the first generation identity authentication information AUTHm.

Optionally, the first node may send the first key update request to the second node by using a first communication frame, where a second frame number of the first communication frame is less than a third frame number carried in a key update request used during a last key update, and the third frame number is used to indicate a start time point of a last updated key. The first frame number carried in the first key update request is greater than the second frame number and less than the third frame number. For example, if the third frame number is 2365, it indicates that the last updated key is applied after a communication frame whose frame number starts from 2365, and the first node needs to determine the first target key before the frame number reaches 2365 again. Therefore, the first node may send the first key update request in the first communication frame whose frame number is 2345, and the first frame number 2355 is used to indicate a start time point of the first target key in the first key update request. When security protection is performed on a communication frame in a communication process, a used encryption method may be to perform encryption based on a frame number and a last updated key. Therefore, the first target key is determined before a frame number repeats to a frame number of the last updated key, so that a data frame is encrypted by using the first target key. In this way, data frames with a same frame number can be encrypted twice by using different keys, thereby improving data security.

In an alternative solution, the first key update request includes a MAC serial number (MAC SN) instead of the first frame number, the MAC SN is indicated by using M bits, the M bits are some of the F bits, and M is less than F. Alternatively, the third frame number carried in the key update request used during the last key update may also be replaced with a MAC SN, that is, a MAC SN indicated by some of a plurality of bits used to indicate the third frame number. In this alternative solution, a value relationship among the first frame number, the second frame number, and the third frame number remains unchanged. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

Optionally, the first target key and the last updated key are keys of a same type. For example, when the first target key requested to be updated in the first key update request is an encryption key, the third frame number is a frame number carried in a key update request used for updating the encryption key last time.

Optionally, the first node may record a frame number of a communication frame, and send the first key update request when the frame number of the communication frame and the third frame number are less than or equal to a first threshold. For example, the first node presets the first threshold to 20. If the third frame number is 2365, the first node may send the first key update request when recording a communication frame whose frame number is 2345. Further, the first node may record frame numbers of one or more communication frames, for example, record frame numbers of at least two of a signaling plane uplink frame, a signaling plane downlink frame, a user plane uplink frame, or a user plane downlink frame. If a difference between a frame number of one communication frame and the third frame number reaches the first threshold, the first key update request is sent.

Optionally, if information indicating a key start time point is not carried in a process of the last key update or the first node has not previously performed a key update, the first node may preconfigure a target frame number. If the first node detects that a difference between a current communication frame number and the target frame number is less than or equal to the first threshold, the first node sends the first key update request. It should be noted that, in addition to obtaining the third frame number carried in the last key update, the first node may record a frame number in a key update request sent during the last key update, a frame number when a response message is received last time, or a frame number of a communication frame used when the last updated key is used for communication for the first time, to detect whether a current key needs to be updated.

Step S502: The second node performs verification on the first identity authentication information based on the first shared key.

Specifically, the first identity authentication information is generated by the first node based on the first shared key between the first node and the second node. Therefore, the second node may verify, based on the first shared key, whether the first identity authentication information is correct.

In an optional solution, a protocol stipulates that the first node uses a specific parameter to generate the first identity authentication information, and therefore the second node also needs to use the same parameter to generate identity authentication information used for verification. If the identity authentication information used for verification is the same as the first identity authentication information, it is considered that the verification succeeds. For example, the first identity authentication information is generated by using an HMAC. Therefore, the second node may generate, by using the HMAC, the identity authentication information used for verification, also referred to as a check value check1, and then verify, by using the identity authentication information used for verification, whether the first identity authentication information is correct. An example is used for description below.

For example, if the first identity authentication information AUTHm is an HMAC (PSK), the second node obtains a check value check1=HMAC (PSK) by using the HMAC based on a pre-shared key (PSK) between the second node and the first node. If the check value check1 is the same as the AUTHm, the verification succeeds.

For another example, if the first identity authentication information AUTHm is an HMAC (PSK, S1), the second node obtains a check value check1=HMAC (PSK, S1) by using the HMAC based on a pre-shared key (PSK) between the second node and the first node and the first key negotiation parameter S1. If the check value check1 is the same as the AUTHm, the verification succeeds. For the first key negotiation parameter S1, refer to the corresponding descriptions in step S501.

Optionally, if the verification on the first identity information fails, it indicates that an identity of the first node is untrusted. Therefore, the second node may not perform a subsequent key update step. In this case, the second node may sever a communication connection to the first node, or the second node sends update failure indication information to the first node, or the second node discards the first key update request and does not respond, to ensure data security of the second node.

Optionally, the second node may perform verification on message integrity of the first key update request, to prevent information in the first key update request from being tampered with by another device. The first key update request may include an integrity protection verification identifier. The second node performs verification on the message integrity of the first key update request by using the integrity protection verification identifier. If the verification succeeds, the second node continues to perform the step of performing verification on the first identity authentication information. If the verification fails, the second node may sever a communication connection to the first node or send update failure indication information to the first node, or the second node discards the first key update request and does not respond, to ensure data security of the second node.

Step S503: If the verification on the first identity authentication information succeeds, the second node determines the first target key based on the first key negotiation parameter.

Specifically, the second node determines the first target key based on the first key negotiation parameter in the first key update request by using at least the following four optional methods:

Method 1: The first key negotiation parameter satisfies the foregoing case 1, that is, the first key negotiation parameter includes the first key negotiation algorithm parameter KEm, and the second node may determine a second key negotiation algorithm parameter KEs of the key negotiation algorithm. The second node may generate the first target key based on the first key negotiation algorithm parameter KEm and the second key negotiation algorithm parameter KEs.

In an example in which the key negotiation algorithm is a DH algorithm, parameters of the DH algorithm that are received by the second node from the first node may include a prime number p, a random number g, and a first calculated value A, and parameters that are of the DH algorithm and that may be determined by the second node include a random number b and a calculated value B, namely, the second key negotiation algorithm parameter KEs, where B satisfies the following equation: $B=g^b$ mod p. The second node may determine the first target key K1 based on the random number b, the calculated value A, and the prime number p, where K1 satisfies the following equation: $K1=A^b$ mod p.

Optionally, in the parameters of the DH algorithm that are determined by the second node, the random number b is used by the second node to generate the first target key, and therefore the random number b may be considered as a private key of the second node; and the calculated value B is sent to the first node, and therefore the calculated value B may be considered as a public key of the second node.

Method 2: The first key negotiation parameter satisfies the foregoing case 2, that is, the first key negotiation parameter includes the fresh parameter, and the second node may generate the first target key based on a second target key and the fresh parameter. The second target key may be a shared key between the first node and the second node.

Optionally, the second node may generate the first target key by using a KDF.

For example, the second node determines, by using the KDF algorithm based on the second target key K2 and the fresh parameter fresh, that the first target key K1 is: K1=KDF (K2, fresh).

Method 3: The first key negotiation parameter satisfies the foregoing case 2, that is, the first key negotiation parameter includes the fresh parameter. If an algorithm identifier tag is obtained from the second node, the second node may determine, by using the KDF algorithm based on the second target key K2, the fresh parameter fresh, and the algorithm identifier tag, that the first target key K1 is: K1=KDF (K2, fresh, tag).

The algorithm identifier may be used to indicate an algorithm used to generate the first target key. For example, a character string "encryption" is used to indicate an algorithm used to generate an encryption key. For another example, a character string "integrity" is used to indicate an algorithm used to generate an integrity protection key. The algorithm identifier may be alternatively used to indicate an identifier of a hash algorithm to be used. For example, a character string "SHA256" is used to indicate that an algorithm used for determining the first target key is an SHA256 algorithm. The algorithm identifier may be alternatively represented by using a numerical value. For example, 01 represents an AES encryption algorithm, and 10 represents an AES algorithm (AES-cypher-based message authentication code, AES-CMAC) integrity algorithm based on message authentication.

The algorithm identifier may be preset between the first node and the second node, or may be sent to the second node after being determined by the first node.

Method 4: The first key negotiation parameter satisfies the foregoing case 2, that is, the first key negotiation parameter includes the fresh parameter. If an algorithm identifier tag and an algorithm type type are obtained from the second node, the second node may determine, based on the second target key K2, the fresh parameter fresh, the algorithm identifier tag, and the key type type, that the first target key K1 is: K1=KDF (K2, fresh, tag, type), where type represents the key type. For example, a character string "encryption" is used to indicate to generate an encryption key. For another example, a character string "integrity" is used to indicate to generate an integrity protection key. The algorithm identifier is used to indicate an algorithm used to generate the first target key.

The key type may be indicated in the first key update request, or may be pre-negotiated on by the first node and the second node before the first target key is generated.

Optionally, in a process of determining the first target key in any one or more of the method 2, the method 3, and the method 4, the second node may first determine an intermediate key based on the first target key K2 and the fresh parameter fresh, and then determine the first target key K1 by using at least one of the algorithm identifier tag and the key type type based on the intermediate key. For example, the second node obtains an intermediate key Kmid:

Kmid=KDF1 (K2, fresh) by using a key derivation function KDF1, and then determines the first target key K1: K1=KDF2 (Kmid, tag, type) by using a key derivation function KDF2 based on the intermediate key Kmid. The KDF1 and the KDF2 may be a same key derivation function, or may be different key derivation functions. In this case, the first node only needs to generate a new fresh parameter when determining the intermediate key Kmid, and does not need to generate a new fresh parameter each time the first target is determined, thereby reducing a quantity of times of generating a fresh parameter and facilitating management of a generated fresh parameter. It should be noted that to describe this solution more clearly herein, how to obtain the first target key is explained by using two steps. In actual processing, the first target key may be alternatively obtained by using one step. The intermediate key Kmid is only an intermediate result. In other words, a manner of determining the first target satisfies K1=KDF2 (KDF1 (K2, fresh), tag, type).

Optionally, when the first key update request carries information indicating the first update time point, the first target key generated in the second node is applied after a time starting from the first update time point. Optionally, when the first update time point is indicated by using the first frame number, the first target key is applied after a communication frame starting from the first update time point.

Optionally, the second node may obtain the third frame number (or a MAC serial number corresponding to the third frame number) carried in the key update request used during the last key update. If the second node detects that a frame number of a communication frame is reversed (or a new round of counting restarts) once, a frame number of a current communication frame is greater than or equal to the third frame number (or the MAC serial number corresponding to the third frame number), and no key update request has been received or no new key has been applied at this point, the second node may sever the connection to the first node, and may further delete a security context, to re-initiate the connection to the other party, thereby ensuring security in a communication process. The security context includes at least one piece of security information such as a shared key, a key validity period, and a key update time point.

Optionally, the second node may further obtain the frame number of the communication frame used when the last updated key is used for communication for the first time. If the second node detects that the frame number of the communication frame is reversed once, a frame number of a current communication frame is greater than or equal to the frame number of the communication frame used when the last updated key is used for communication for the first time, and no key update request has been received or no new key has been applied at this point, the second node may sever the connection to the first node, and may further delete a security context, thereby ensuring security in a communication process.

Step S504: The second node sends a first response message to the first node.

Specifically, the first response message includes second identity authentication information used to perform authentication on an identity of the second node. If the second node generates the first target key by using the method 1, the first response message further includes the second key negotiation algorithm parameter KEs. Optionally, the first response message further includes the random number value NONCEs generated by the second node.

In this embodiment of this application, the second identity authentication information may be generated by the second node based on the first shared key between the first node and the second node.

In an optional solution, the second identity authentication information may be generated by using a cryptographic algorithm. In an example in which the cryptographic algorithm is an HMAC, the HMAC is used to receive an input of one or more character parameters, and output an identifier, and the identifier may be used as identity authentication information. The following uses an example in which the cryptographic algorithm is an HMAC for description.

Example 1: The second identity authentication information AUTHs generated by the second node may be an HMAC (PSK), or in other words, AUTHs=HMAC (PSK).

Example 2: When the first response message further includes a second key negotiation parameter KEs, the second identity authentication information AUTHs generated by the second node may be an HMAC (PSK, KEs), or in other words, AUTHs=HMAC (PSK, KEs).

Example 3: When the first response message further includes the random number value NONCEs generated by the second node, the identity authentication information AUTHs generated by the second node may be an HMAC (PSK, KEs, NONCEs), or in other words, AUTHs=HMAC (PSK, K1, NONCEs).

Certainly, in parameters used to generate the second identity authentication information, other information (for example, a number of the second node, an address of the second node, or an identifier of a connection between the second node and the first node) may be included in addition to the first shared key. If the first response message includes parameters such as the second key negotiation parameter KEs and/or the random number value NONCEs, the second node may not use these parameters to generate the identity authentication information AUTHs.

Optionally, the first response message is a response message sent after the second node can authenticate the first identity authentication information based on the first key negotiation parameter and the first shared key.

Step S505: The first node performs verification on the second identity authentication information by using the first shared key.

Specifically, the second identity information is generated by the second node based on the first shared key between the first node and the second node. Therefore, the first node may verify, based on the first shared key, whether the second identity authentication information is correct.

In an optional solution, a protocol stipulates that the second node uses a specific parameter to generate the second identity authentication information, and therefore the first node also needs to use the same parameter to generate identity authentication information used for verification. If the identity authentication information used for verification is the same as the second identity authentication information, it is considered that the verification succeeds.

For example, the second identity authentication information may be generated by using an HMAC. Therefore, the first node may generate, by using the HMAC, the identity authentication information used for verification, also referred to as a check value check2, and then verify, by using the identity authentication information used for verification, whether the second identity authentication information is correct. An example is used for description below.

For example, if the second identity authentication information AUTHs is an HMAC (PSK), the first node obtains a check value check2=HMAC (PSK) by using the HMAC based on a pre-shared key (PSK) between the first node and the second node. If the check value check2 is the same as the AUTHs, the verification succeeds.

For another example, if the first identity authentication information AUTHs is an HMAC (PSK, KEs), the first node obtains a check value check2=HMAC (PSK, KEs) by using the HMAC based on a pre-shared key (PSK) between the first node and the second node and the second key negotiation parameter KEs in the first response message. If the check value check2 is the same as the AUTHs, the verification succeeds.

Optionally, if the verification on the second identity authentication information fails, it indicates that the identity of the second node is untrusted. Therefore, the first node may sever a connection to the second node, or send update failure indication information to the second node, or discard the first response message and does not respond, to ensure data security in a data update process and facilitate a connection to a node that needs to perform a key update.

Optionally, the first node may perform verification on message integrity of the first response message, to prevent information in the first response message from being tampered with by another device. The second node may add an integrity protection verification identifier to the first response message. The first node performs verification on the message integrity of the first response message by using the integrity protection verification identifier. If the verification succeeds, the first node continues to perform the step of performing verification on the second identity authentication information. If the verification fails, the first node may sever a connection to the second node, or send update failure indication information to the second node, or discard the first response message and does not respond, to ensure data security in a data update process.

Step S506: If the verification on the second identity authentication information succeeds, the first node determines the first target key based on the first key negotiation parameter.

Specifically, the first node determines the first target key based on the first key negotiation parameter by using at least the following several optional methods:

Method 1: The first key negotiation parameter satisfies the foregoing case 1, that is, the first key negotiation parameter includes the parameter of the key negotiation algorithm, and the first response message includes the second key negotiation parameter KEs. The first node may generate the first target key based on the first key negotiation algorithm parameter KEm and the second key negotiation algorithm parameter KEs.

In an example in which the key negotiation algorithm is a DH algorithm, parameters of the DH algorithm that are generated in the first node include a prime number p, a random number g, a random number a, and a first calculated value A. Parameters of the DH algorithm that are received by the first node from the second node include a first calculated value B. The first node may determine the first target key K1 based on the random number a, the calculated value B, and the prime number p, where K1 satisfies the following equation: K1=$B^a$ mod p. Because K1=$A^b$ mod p=$(g^a$ mod p$)^b$ mod p=$g^{ab}$ mod p=$(g^b$ mod p$)^a$=$B^a$ mod p, first target keys K1 determined by the first node and the second node are the same.

Method 2: The first key negotiation parameter satisfies the foregoing case 2, that is, the first key negotiation parameter includes the fresh parameter, and the first node generates the first target key based on a second target key and the fresh parameter.

Optionally, the first node may generate the first target key by using a KDF.

For example, the first node determines, by using the KDF based on the second target key K2 and the fresh parameter fresh, that the first target key K1 is: K1=KDF (K2, fresh).

Method 3: The first key negotiation parameter satisfies the foregoing case 2, that is, the first key negotiation parameter includes the fresh parameter. If an algorithm identifier tag is obtained from the first node, the first node may determine, by using the KDF algorithm based on the second target key K2, the fresh parameter fresh, and the algorithm identifier tag, that the first target key K1 is: K1=KDF (K2, fresh, tag).

The algorithm identifier may be used to indicate an algorithm used to generate the first target key. For example, a character string "encryption" is used to indicate an algorithm used to generate an encryption key. For another example, a character string "integrity" is used to indicate an algorithm used to generate an integrity protection key. The algorithm identifier may be alternatively used to indicate an identifier of a hash algorithm to be used. For example, a character string "SHA256" is used to indicate that an algorithm used for determining the first target key is an SHA256 algorithm. The algorithm identifier may be alternatively represented by using a numerical value. For example, 01 represents an AES encryption algorithm, and 10 represents an AES algorithm (AES-cypher-based message authentication code, AES-CMAC) integrity algorithm based on message authentication.

The algorithm identifier may be preset between the first node and the second node, or may be determined by the first node.

Method 4: The first key negotiation parameter satisfies the foregoing case 2, that is, the first key negotiation parameter includes the fresh parameter. If an algorithm identifier tag and an algorithm type type are obtained from the first node, the first node may determine, based on the second target key K2, the fresh parameter fresh, the algorithm identifier tag, and the key type type, that the first target key K1 is: K1=KDF (K2, fresh, tag, type), where type represents the key type. For example, a character string "encryption" is used to indicate to generate an encryption key. For another example, a character string "integrity" is used to indicate to generate an integrity protection key. The algorithm identifier is used to indicate an algorithm used to generate the first target key.

The key type may be indicated in the first key update request, or may be pre-negotiated on by the first node and the second node before the first target key is generated.

Optionally, in a process of determining the first target key in any one or more of the method 2, the method 3, and the method 4, the first node may first determine an intermediate key based on the first target key K2 and the fresh parameter fresh, and then determine the first target key K1 by using at least one of the algorithm identifier tag and the key type type based on the intermediate key. For example, the first node obtains an intermediate key Kmid:

Kmid=KDF1 (K2, fresh) by using a key derivation function KDF1, and then determines the first target key K1=KDF2 (Kmid, tag, type) by using a key derivation function KDF2 based on the intermediate key Kmid. The KDF1 and the KDF2 may be a same key derivation function, or may be different key derivation functions. To describe this solution more clearly herein, how to obtain the first target key is explained by using two steps. In actual processing, the first target key may be alternatively obtained by using one step. The intermediate key Kmid is only an intermediate result. In other words, a manner of determining the first target satisfies K1=KDF2 (KDF1 (K2, fresh), tag, type).

Optionally, the first target key may be applied to a shared key between the first node and the second node, and includes a master key, a session key, and the like.

Optionally, if the first key update request indicates the first update time point, the first target key may be applied within a time starting from the first update time point. For example, if the first target key is a master key, and information that is included in the first key update request and that indicates the first secret key is a timestamp "1590921570", it indicates that a time at which the first target key is enabled is 00:52:50 on Feb. 6, 2020, and therefore the first node and the second node use the first target key as the master key after a time starting from 00:52:50 on Feb. 6, 2020.

Optionally, if the first key update request indicates the validity period of the first target key, the first target key may be applied within the validity period of the first target key. For example, if the first target key is a master key, and information that is included in the first key update request and that indicates the first secret key is a timestamp "1590952447", it indicates that the validity period of the first target key is within 09:28:26 on Feb. 6, 2020, and therefore the first node and the second node may use the first target key as the master key at 09:28:26 on Feb. 6, 2020.

Optionally, the second node may further detect the validity period of the first target key, to determine a new target key before the validity period of the first target key.

It may be understood that when the first key update request indicates the first update time point and the validity period of the first target key, the first target key is applied within the validity period of the first target key starting from the first update time point.

Optionally, the second target key may be an encryption key. In this case, the first key update request may be encrypted by using the second target key. Correspondingly, after receiving the first key update request, the second node may use the second target key for decryption. Similarly, the first response request may be encrypted by using the second target key. Correspondingly, after receiving the first response message, the first node may use the second target key for decryption.

Optionally, the second target key may be an integrity protection key. In this case, integrity protection may be performed on the first key update request by using the second target key. Correspondingly, after receiving the first key update request from the first node, the second node may check data integrity by using the second target key. Similarly, integrity protection may be performed on the first response request by using the second target key. Correspondingly, after receiving the first response message, the first node may check data integrity by using the second target key. In a conventional key update process, a key update time point is configured. Therefore, when a new key is updated, because an old key has expired, an encryption process needs to be suspended during a key update, and the encryption process is resumed after the key update is completed. However, the suspension of the encryption process and the resuming of the encryption process affect key update efficiency, and the suspension of the encryption process affects security. However, in the key update method in this application, the key is updated before the old key expires. The encryption process does not need to be suspended because the old key has not expired, thereby improving key update efficiency and improving data security.

Optionally, the second target key may be a master key. In this case, the second target key may be used to determine an encryption key or an integrity protection key. Therefore, encryption and/or integrity protection may be performed on the first key update request by using the encryption key determined based on the second target key and/or by using the integrity protection key determined based on the second target key. Correspondingly, after receiving the first key update request, the second node may decrypt the first key update request by using the encryption key determined based on the second target key, and/or the integrity protection key determined based on the second target key may be used to check data integrity by using the integrity protection key determined based on the second target key. Similarly, encryption and/or integrity protection may be performed on the first response request by using the encryption key determined based on the second target key and/or by using the integrity protection key determined based on the second target key. Correspondingly, after receiving the first response message, the first node may decrypt the first response message by using the encryption key determined based on the second target key, and/or the integrity protection key determined based on the second target key may be used to check data integrity by using the integrity protection key determined based on the second target key.

Optionally, when the first target key is determined by using the method 2 and the method 3, if the first target key is a session key, encryption or integrity protection may be performed on the first response message by using the first target key.

Optionally, when the first node updates the session key by using the master key and the counter value, the first node detects whether the counter value is reversed (or a new round of counting restarts), and sends the first key update request to the second node before the counter value is reversed, where the determined first target key is the master key. Optionally, if the first node does not send the first key update request before the counter value is reversed, the first node may sever the communication connection to the second node, to re-access the second node, thereby ensuring security of a process of communication with the second node.

Optionally, the first node may obtain a third frame number (or a MAC serial number corresponding to the third frame number) carried in a key update request used during a last key update. If the first node detects that a frame number of a communication frame is reversed once, a frame number of a current communication frame is greater than or equal to the third frame number (or the MAC serial number corresponding to the third frame number), and no key update request has been sent or no new key has been applied at this point, the first node may sever the connection to the second node, and may further delete a security context, to re-initiate the connection to the other party, thereby ensuring security in a communication process.

In the method described in FIG. 5, in a key update process, the first node and the second node generate identity authentication information based on the first shared key.

After receiving a message from the other node, one node first determines an identity of the other node by using the identity authentication information, and updates a key based on the first key negotiation parameter only after identity authentication succeeds, to obtain the first target key. In this case, even if an eavesdropper has cracked an original session key, the eavesdropper cannot forge identity information, thereby avoiding a man-in-the-middle attack and improving data security in a key update process.

The foregoing method embodiment shown in FIG. 5 includes many possible implementation solutions. The following separately describes some implementation solutions with reference to FIG. 6A, FIG. 6B, FIG. 7A, FIG. 7B, FIG. 8A, and FIG. 8B. It should be noted that, for related concepts or operations or logical relationships that are not described in FIG. 6A, FIG. 6B, FIG. 7A, FIG. 7B, FIG. 8A, and FIG. 8B, refer to the corresponding descriptions in the embodiment shown in FIG. 5. Therefore, details are not described again.

Figure 6A:
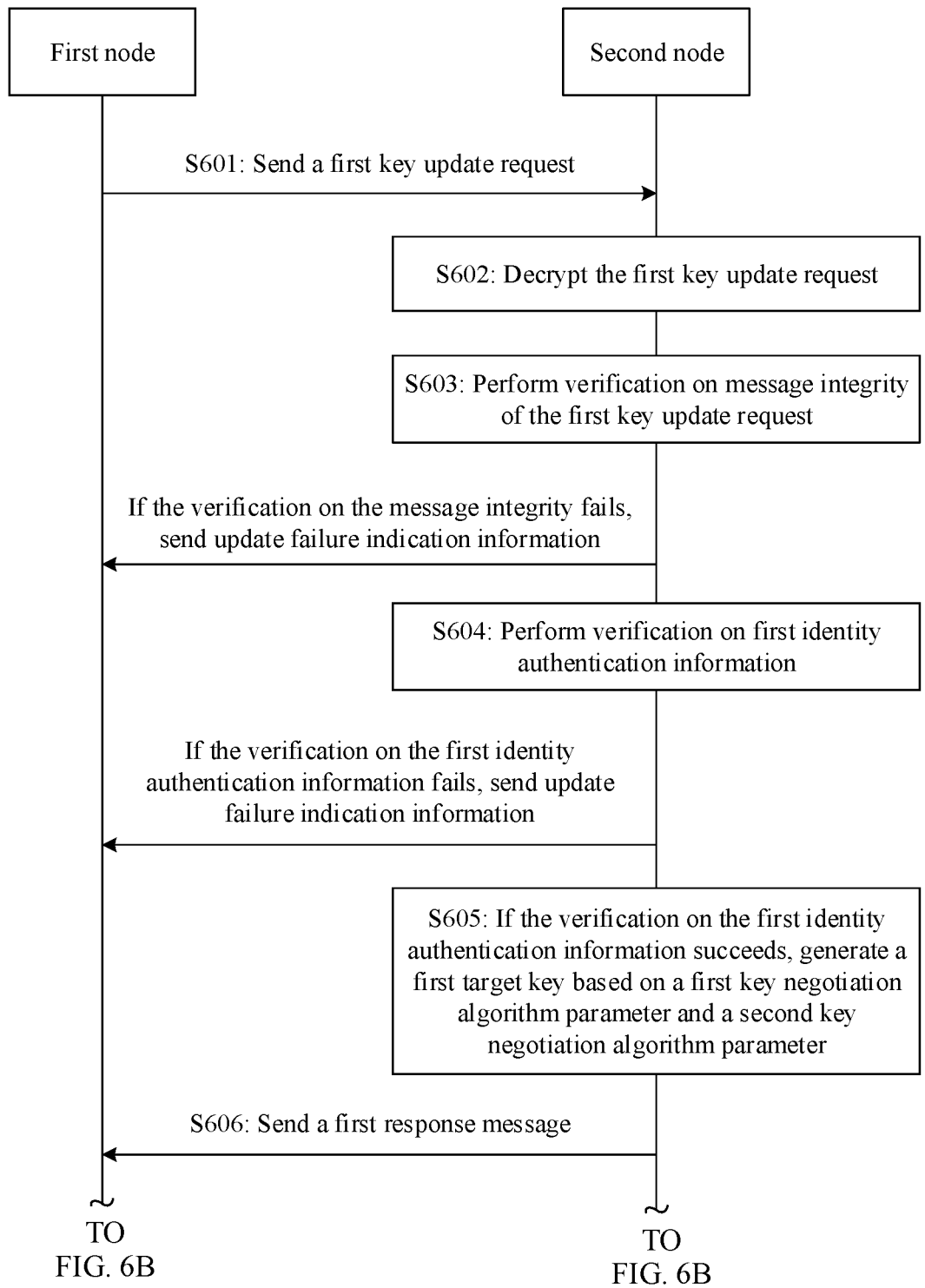
FIG. 6A and FIG. 6B are a schematic flowchart of still another key update method according to an embodiment of this application.
Figure 6B:
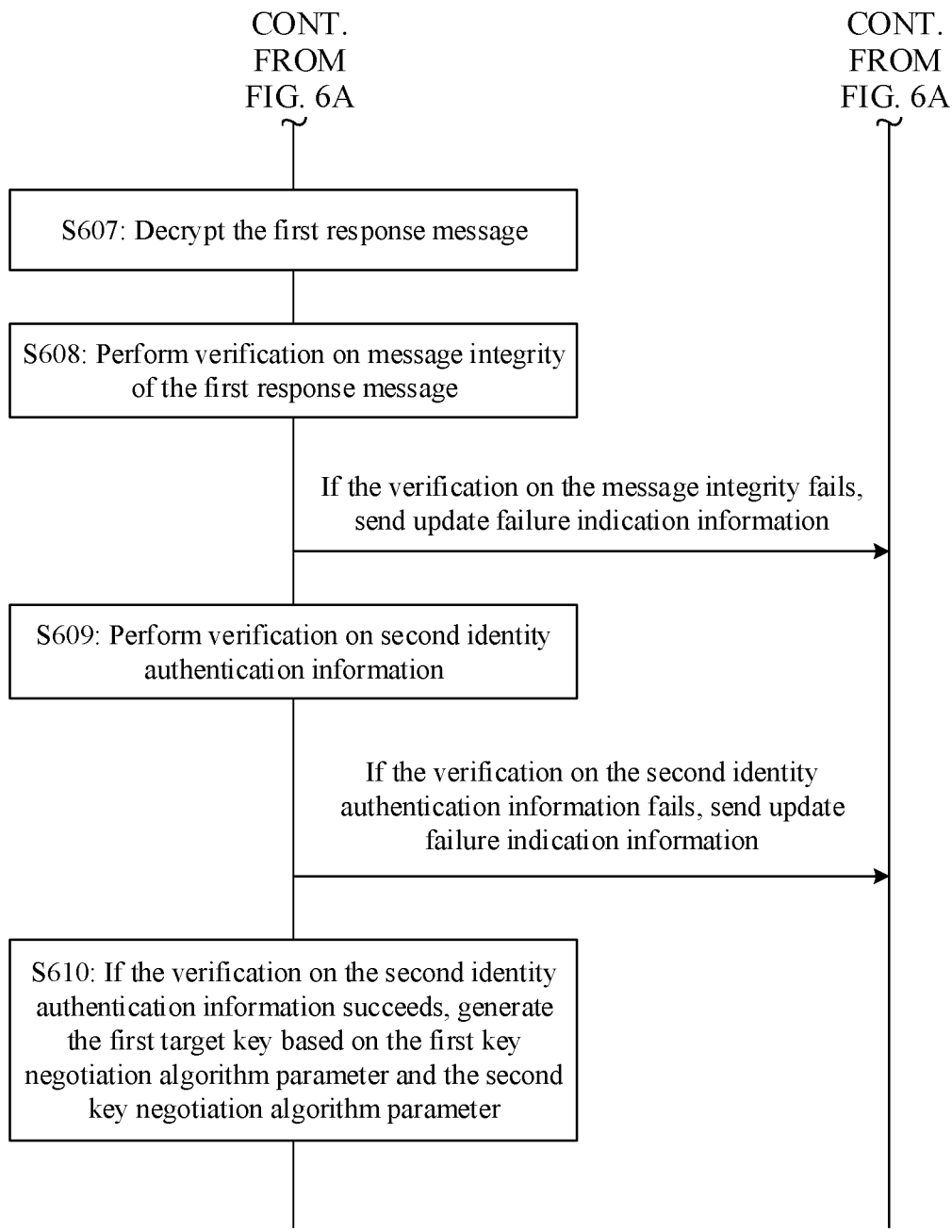

FIG. 6A and FIG. 6B show still another key update method according to an embodiment of this application. The method includes at least the following steps.

Step S601: A first node sends a first key update request to a second node.

In this embodiment of this application, encryption and/or integrity protection may be performed on the first key update request by using an encryption key determined based on a second target key and/or by using an integrity key determined based on the second target key. The second target key is a shared key between the first node and the second node.

In this embodiment of this application, the first key update request includes a first key negotiation parameter and first identity authentication information. The first key negotiation parameter may be a first key negotiation algorithm parameter KEm. Optionally, the first key update request may further include at least one of a random number value NONCEm, information timer indicating a first update time point, and information expiration indicating a validity period of a first target key.

In this embodiment of this application, the first identity authentication information in the first key update request may be generated by using a first shared key between the first node and the second node, and the first shared key may include a master key, a pre-shared key (PSK), and the like.

Optionally, a function for generating the first identity authentication information may be a cryptographic algorithm. In an example in which the cryptographic algorithm is an HMAC and the first shared key is a pre-shared key (PSK), the generated first identity authentication information AUTHm may be represented as AUTHm=HMAC (PSK, KEm, NONCEm, expiration, timer), and sequences of the parameters may be different. Certainly, when the first key update request includes parameters such as the first key negotiation algorithm parameter KEm, the random number value NONCEm, the information expiration indicating the validity period of the first target key, or the information timer indicating the first update time point, the first node may not use some or all of the parameters to generate the first identity authentication information AUTHm.

Optionally, the first node may send the first key update request to the second node by using a first communication frame, where a second frame number of the first communication frame is less than a third frame number carried in a key update request used during a last key update, and the third frame number is used to indicate a start time point of a last updated key. The first frame number carried in the first key update request is greater than the second frame number and less than the third frame number. For example, if the third frame number is 2365, it indicates that the last updated key is applied after a communication frame whose frame number starts from 2365, and the first node needs to determine the first target key before the frame number reaches 2365 again. Therefore, the first node may send the first key update request in the first communication frame whose frame number is 2345, and the first frame number 2355 is used to indicate a start time point of the first target key in the first key update request. When security protection is performed on a communication frame in a communication process, a used encryption method may be to perform encryption based on a frame number and a last updated key. Therefore, the first target key is determined before a frame number repeats to a frame number of the last updated key, so that a data frame is encrypted by using the first target key. In this way, data frames with a same frame number can be encrypted twice by using different keys, thereby improving data security.

Optionally, if information indicating a key start time point is not carried in a process of the last key update or the first node has not previously performed a key update, the first node may preconfigure a target frame number. If the first node detects that a difference between a current communication frame number and the target frame number is less than or equal to the first threshold, the first node sends the first key update request.

Step S602: The second node decrypts the first key update request.

Specifically, the second node may decrypt the first key update request by using the encryption key determined based on the second target key.

Step S603: The second node performs verification on message integrity of the first key update request.

Optionally, if the verification fails, the second node may sever a communication connection to the first node, or the second node sends update failure indication information to the first node, or the second node may discard the first key update request.

Optionally, in the embodiment shown in FIG. 6A and FIG. 6B, the second node may not perform step S603. In this case, after performing step S602, the second node may continue to perform step S604 and a subsequent step of step S604.

Step S604: The second node performs verification on the first identity authentication information.

Specifically, the first identity authentication information is generated by the first node based on the first shared key between the first node and the second node. Therefore, the second node may verify, based on the first shared key, whether the first identity authentication information is correct.

In an optional solution, a protocol stipulates that the first node uses a specific parameter to generate the first identity authentication information, and therefore the second node also needs to use the same parameter to generate identity authentication information used for verification. If the identity authentication information used for verification is the same as the first identity authentication information, it is considered that the verification succeeds. For example, the first identity authentication information is generated by using an HMAC. Therefore, the second node may generate, by using the HMAC, the identity authentication information used for verification, also referred to as a check value check1, and then verify, by using the identity authentication information used for verification, whether the first identity authentication information is correct. An example is used for description below.

For example, if the first identity authentication information AUTHm is an HMAC (PSK), the second node obtains a check value check1=HMAC (PSK) by using the HMAC based on a pre-shared key (PSK) between the second node and the first node. If the check value check1 is the same as the AUTHm, the verification succeeds.

For another example, if the first identity authentication information AUTHm is an HMAC (PSK, KEm), the second node obtains a check value check1=HMAC (PSK, KEm) by using the HMAC based on a pre-shared key (PSK) between the second node and the first node and the first key negotiation parameter KEm. If the check value check1 is the same as the AUTHm, the verification succeeds.

Optionally, if the verification on the first identity information fails, the second node may sever a communication connection to the first node, or the second node sends update failure indication information to the first node, or the second node discards the first key update request.

Optionally, the second node may first perform the operation of S604 and then perform the operation of S603.

Step S605: If the verification on the first identity authentication information succeeds, the second node generates the first target key based on the first key negotiation algorithm parameter and a second key negotiation algorithm parameter.

Specifically, the second node may determine a second key negotiation algorithm parameter KEs of a key negotiation algorithm. The second node generates the first target key based on the first key negotiation algorithm parameter KEm and the second key negotiation algorithm parameter KEs.

In an example in which the key negotiation algorithm is a DH algorithm, parameters of the DH algorithm that are received by the second node from the first node include a prime number p, a random number g, and a first calculated value A, and parameters that are of the DH algorithm and that may be determined by the second node include a random number b and a calculated value B, namely, the second key negotiation algorithm parameter KEs, where B satisfies the following equation: $B=g^b \mod p$. The second node may determine the first target key K1 based on the random number b, the calculated value A, and the prime number p, where K1 satisfies the following equation: $K1=A^b \mod p$.

Step S606: The second node sends a first response message to the first node.

In this embodiment of this application, encryption and/or integrity protection may be performed on the first response message by using the encryption key determined based on the second target key and/or by using the integrity key determined based on the second target key. The second target key is a shared key between the second node and the first node.

The first response message includes second identity authentication information and the second key negotiation algorithm parameter KEs, and the second identity authentication information is used to verify an identity of the second node, and may be generated by using the first shared key between the first node and the second node. Optionally, the first response message may further include a random number value NONCEs.

In this embodiment of this application, the second identity authentication information may be generated by using a cryptographic algorithm. In an example in which the cryptographic algorithm is an HMAC, the generated second identity authentication information AUTHs may be represented as AUTHs=HMAC (PSK, KEs, NONCEs), and sequences of the parameters may be different. Certainly, when the first key update request includes parameters such as the second key negotiation algorithm parameter KEs and the random number value NONCEs, the second node may not use some or all of the parameters to generate the second identity authentication information AUTHs.

Optionally, the second node may first perform the operation of S606 and then perform the operation of S605.

Step S607: The first node decrypts the first response message.

Specifically, the first node may decrypt the first response message by using the encryption key determined based on the second target key.

Optionally, the first node may first perform the operation of S607 and then perform the operation of S606.

Step S608: The first node performs verification on message integrity of the first response message.

Optionally, if the verification on the message integrity fails, the first node may sever a connection to the second node, or send update failure indication information to the second node, or discard the first response message.

Optionally, in the embodiment shown in FIG. 6A and FIG. 6B, the first node may not perform step S608. In this case, after performing step S607, the first node may continue to perform step S609 and a subsequent step of step S609.

Step S609: The first node performs verification on the second identity authentication information.

Specifically, the second identity information is generated by the second node based on the first shared key between the first node and the second node. Therefore, the first node may verify, based on the first shared key, whether the second identity authentication information is correct.

In an optional solution, a protocol stipulates that the second node uses a specific parameter to generate the second identity authentication information, and therefore the first node also needs to use the same parameter to generate identity authentication information used for verification. If the identity authentication information used for verification is the same as the second identity authentication information, it is considered that the verification succeeds.

For example, the second identity authentication information may be generated by using an HMAC. Therefore, the first node may generate, by using the HMAC, the identity authentication information used for verification, also referred to as a check value check2, and then verify, by using the identity authentication information used for verification, whether the second identity authentication information is correct. An example is used for description below.

For example, if the second identity authentication information AUTHs is an HMAC (PSK), the first node obtains a check value check2=HMAC (PSK) by using the HMAC based on a pre-shared key (PSK) between the first node and the second node. If the check value check2 is the same as the AUTHs, the verification succeeds.

For another example, if the first identity authentication information AUTHs is an HMAC (PSK, KEs), the first node obtains a check value check2=HMAC (PSK, KEs) by using the HMAC based on a pre-shared key (PSK) between the first node and the second node and the second key negotiation parameter KEs in the first response message. If the check value check2 is the same as the AUTHs, the verification succeeds.

Optionally, if the verification on the second identity authentication information fails, the first node may sever a connection to the second node, or send update failure indication information to the second node, or discard the first response message.

Optionally, the first node may first perform the operation of S609 and then perform the operation of S608.

Step S610: If the verification on the second identity authentication information succeeds, the first node generates the first target key based on the first key negotiation algorithm parameter and the second key negotiation algorithm parameter.

Specifically, because the first response message includes the second key negotiation algorithm parameter KEs, the first node generates the first target key based on the first key negotiation algorithm parameter KEm and the second key negotiation algorithm parameter KEs.

In an example in which the key negotiation algorithm is a DH algorithm, parameters of the DH algorithm that are generated in the first node include a prime number p, a random number g, a random number a, and a first calculated value A. Parameters of the DH algorithm that are received by the first node from the second node include a first calculated value B. The first node may determine the first target key K1 based on the random number a, the calculated value B, and the prime number p, where K1 satisfies the following equation: $K1=B^a \mod p$. Because $K1=A^b \mod p=(g^a \mod p)^b \mod p=g^{ab} \mod p=(g^b \mod p)^a \mod p=B^a \mod p$, first target keys K1 determined by the first node and the second node are the same.

Optionally, the first target key may be applied to a shared key between the first node and the second node, or may be applied to a master key or a session key.

In the method described in FIG. 6A and FIG. 6B, in a key update process, the first node and the second node generate identity authentication information based on the first shared key. After receiving a message from the other node, one node first determines an identity of the other node by using the identity authentication information, and updates a key based on the first key negotiation parameter only after identity authentication succeeds, to obtain the first target key. In this case, even if an eavesdropper has cracked an original session key, the eavesdropper cannot forge identity information, thereby avoiding a man-in-the-middle attack and improving data security in a key update process.

Figure 7A:
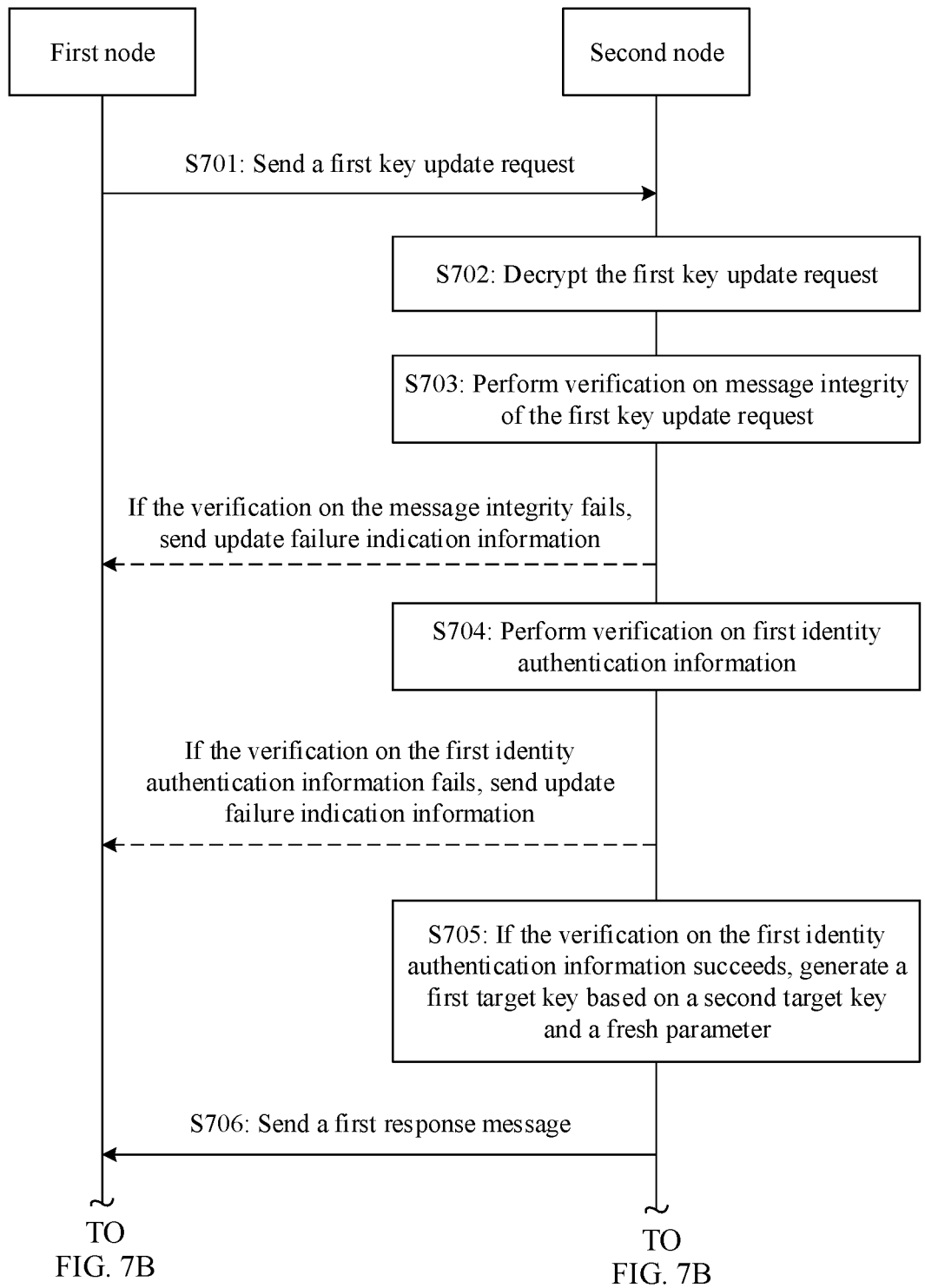
FIG. 7A and FIG. 7B are a schematic flowchart of still another key update method according to an embodiment of this application.
Figure 7B:
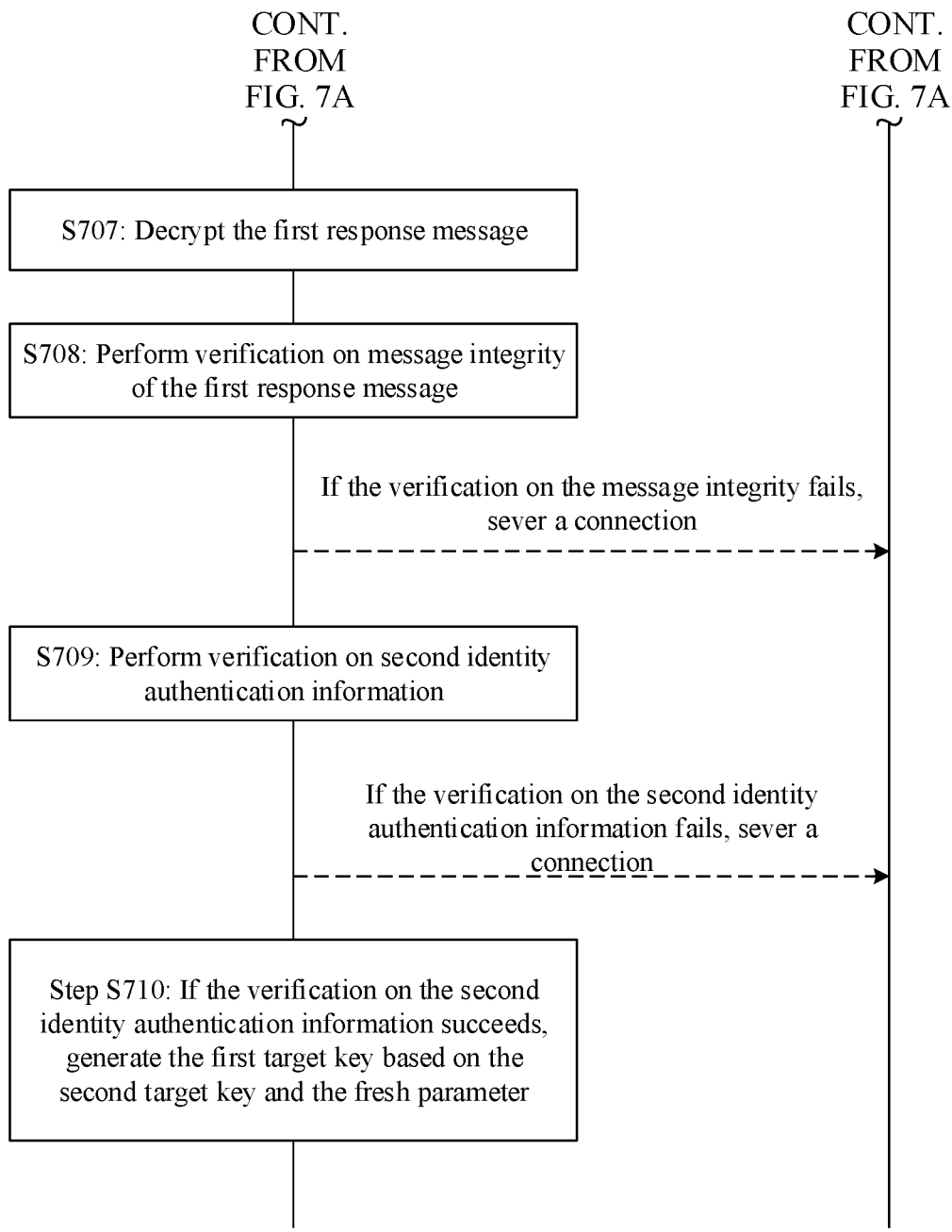

FIG. 7A and FIG. 7B show still another key update method according to an embodiment of this application. The method includes at least the following steps.

Step S701: A first node sends a first key update request to a second node.

In this embodiment of this application, encryption and/or integrity protection may be performed on the first key update request by using an encryption key determined based on a second target key and/or by using an integrity key determined based on the second target key. The second target key is a shared key between the second node and the first node.

In this embodiment of this application, the first key update request includes a first key negotiation parameter and first identity authentication information. The first key negotiation parameter may be a fresh parameter fresh. Optionally, the first key request may further include at least one of a random number value NONCEm, information timer indicating a first update time point, and information expiration indicating a validity period of a first target key.

In this embodiment of this application, the first identity authentication information in the first key update request may be generated by using a first shared key between the first node and the second node, and the first shared key may include a master key, a pre-shared key (PSK), and the like.

Optionally, a function for generating the first identity authentication information may be a cryptographic algorithm. In an example in which the cryptographic algorithm is an HMAC and the first shared key is a pre-shared key (PSK), the generated first identity authentication information AUTHm may be represented as AUTHm=HMAC (PSK, fresh, NONCEm, expiration, timer), and sequences of the parameters may be different. Certainly, when the first key update request includes information such as the fresh parameter fresh, the random number value NONCEm, the information expiration indicating the validity period of the first target key, or the information timer indicating the first update time point, the first node may not use some or all of the parameters to generate the first identity authentication information AUTHm.

Optionally, the first node may send the first key update request to the second node by using a first communication frame, where a second frame number of the first communication frame is less than a third frame number carried in a key update request used during a last key update, and the third frame number is used to indicate a start time point of a last updated key. The first frame number carried in the first key update request is greater than the second frame number and less than the third frame number. For example, if the third frame number is 2365, it indicates that the last updated key is applied after a communication frame whose frame number starts from 2365, and the first node needs to determine the first target key before the frame number reaches 2365 again. Therefore, the first node may send the first key update request in the first communication frame whose frame number is 2345, and the first frame number 2355 is used to indicate a start time point of the first target key in the first key update request. When security protection is performed on a communication frame in a communication process, a used encryption method may be to perform encryption based on a frame number and a last updated key. Therefore, the first target key is determined before a frame number repeats to a frame number of the last updated key, so that a data frame is encrypted by using the first target key. In this way, data frames with a same frame number can be encrypted twice by using different keys, thereby improving data security.

Optionally, if information indicating a key start time point is not carried in a process of the last key update or the first node has not previously performed a key update, the first node may preconfigure a target frame number. If the first node detects that a difference between a current communication frame number and the target frame number is less than or equal to the first threshold, the first node sends the first key update request.

Step S702: The second node decrypts the first key update request.

Specifically, the second node may decrypt the first key update request by using the encryption key determined based on the second target key.

Step S703: The second node performs verification on message integrity of the first key update request.

Optionally, if the verification on the message integrity fails, the second node may sever a communication connection to the first node, or the second node sends update failure indication information to the first node, or the second node may discard the first key update request.

Optionally, in the embodiment shown in FIG. 7A and FIG. 7B, the second node may not perform step S703. In this case, after performing step S702, the second node may continue to perform step S704 and a subsequent step of step S704.

Step S704: The second node performs verification on the first identity authentication information.

Specifically, the first identity authentication information is generated by the first node based on the first shared key between the first node and the second node. Therefore, the second node may verify, based on the first shared key, whether the first identity authentication information is correct.

In an optional solution, a protocol stipulates that the first node uses a specific parameter to generate the first identity authentication information, and therefore the second node also needs to use the same parameter to generate identity authentication information used for verification. If the identity authentication information used for verification is the same as the first identity authentication information, it is considered that the verification succeeds. For example, the first identity authentication information is generated by using an HMAC. Therefore, the second node may generate, by using the HMAC, the identity authentication information used for verification, also referred to as a check value check1, and then verify, by using the identity authentication information used for verification, whether the first identity authentication information is correct. An example is used for description below.

For example, if the first identity authentication information AUTHm is an HMAC (PSK), the second node obtains a check value check1=HMAC (PSK) by using the HMAC based on a pre-shared key (PSK) between the second node and the first node. If the check value check1 is the same as the AUTHm, the verification succeeds.

For another example, if the first key negotiation parameter includes the fresh parameter fresh, and the first identity authentication information AUTHm is an HMAC (PSK, fresh), the second node obtains a check value check1=HMAC (PSK, fresh) by using the HMAC based on the pre-shared key (PSK) between the second node and the first node and the fresh parameter fresh. If the check value check1 is the same as the AUTHm, the verification succeeds.

Optionally, if the verification on the first identity information fails, the second node may sever a communication connection to the first node, or the second node sends update failure indication information to the first node, or the second node discards the first key update request.

Optionally, in a specific implementation process, the second node may first perform the operation of S704 and then perform the operation of S703.

Step S705: If the verification on the first identity authentication information succeeds, the second node generates the first target key based on the second target key and the fresh parameter.

Optionally, if the verification on the first identity information fails, the second node may sever a communication connection to the first node, or the second node sends update failure indication information to the first node, or the second node discards the first key update request.

Specifically, the second node may generate the first target key based on the second target key and the fresh parameter. For example, the second node may determine, based on the second target key K2 and the fresh parameter fresh, that the first target key K1 is: K1=KDF (K2, fresh).

Step S706: The second node sends a first response message to the first node.

In this embodiment of this application, encryption and/or integrity protection may be performed on the first key update request by using an encryption key determined based on a second target key and/or by using an integrity key determined based on the second target key. The second target key is a shared key between the second node and the first node.

The first response message includes second identity authentication information, and the second identity authentication information is used to verify an identity of the second node, and may be generated by using the first shared key between the first node and the second node. Optionally, the first response message may further include a random number value NONCEs.

In this embodiment of this application, an algorithm for generating the second identity authentication information may be a cryptographic algorithm. In an example in which the cryptographic algorithm is an HMAC, the generated second identity authentication information AUTHs may be represented as AUTHs=HMAC (PSK, NONCEs), and sequences of the parameters may be different. Certainly, when the first response message includes parameters such as the random number value NONCEs, the second node may not use these parameters to generate the second identity authentication information AUTHs.

Optionally, in a specific implementation process, the second node may first perform the operation of S706 and then perform the operation of S705.

Step S707: The first node decrypts the first response message.

Specifically, the first node may decrypt the first response message by using the encryption key determined based on the second target key.

Step S708: The first node performs verification on message integrity of the first response message.

Optionally, if the verification on the message integrity fails, the first node may sever a connection to the second node, or send update failure indication information to the second node, or discard the first response message.

Optionally, in the embodiment shown in FIG. 7A and FIG. 7B, the first node may not perform step S708. In this case, after performing step S707, the first node may continue to perform step S709 and a subsequent step of step S709.

Step S709: The first node performs verification on the second identity authentication information.

Specifically, the second identity information is generated by the second node based on the first shared key between the first node and the second node. Therefore, the first node may verify, based on the first shared key, whether the second identity authentication information is correct.

In an optional solution, a protocol stipulates that the second node uses a specific parameter to generate the second identity authentication information, and therefore the first node also needs to use the same parameter to generate identity authentication information used for verification. If the identity authentication information used for verification is the same as the second identity authentication information, it is considered that the verification succeeds.

For example, the second identity authentication information may be generated by using an HMAC. Therefore, the first node may generate, by using the HMAC, the identity authentication information used for verification, also referred to as a check value check2, and then verify, by using the identity authentication information used for verification, whether the second identity authentication information is correct. An example is used for description below.

For example, if the second identity authentication information AUTHs is an HMAC (PSK), the first node obtains a check value check2=HMAC (PSK) by using the HMAC based on a pre-shared key (PSK) between the first node and the second node. If the check value check2 is the same as the AUTHs, the verification succeeds.

For another example, if the first identity authentication information AUTHs is an HMAC (PSK, NONCEs), the first node obtains a check value check2=HMAC (PSK, NONCEs) by using the HMAC based on a pre-shared key (PSK) between the first node and the second node and the random number value NONCEs in the first response message. If the check value check2 is the same as the AUTHs, the verification succeeds.

Optionally, if the verification on the second identity authentication information fails, the first node may sever a communication connection to the second node, or send update failure indication information to the second node, or discard the first response message.

Optionally, in a specific implementation process, the first node may first perform the operation of S709 and then perform the operation of S708.

Step S710: If the verification on the second identity authentication information succeeds, the first node generates the first target key based on the second target key and the fresh parameter.

Specifically, the first node may generate the first target key by using a key derivation function based on the second target key and the fresh parameter. For example, the second node may determine, based on the second target key K2 and the fresh parameter fresh, that the first target key K1 is: K1=KDF (K2, fresh).

Optionally, the first target key may be applied to a shared key between the first node and the second node, and includes a master key, a session key, and the like.

In the method described in FIG. 7A and FIG. 7B, in a key update process, the first node and the second node generate identity authentication information based on the first shared key. After receiving a message from the other node, one node first determines an identity of the other node by using the identity authentication information, and updates a key based on the second target key and the fresh parameter only after identity authentication succeeds, to obtain the first target key. In this case, even if an eavesdropper has cracked an original session key, the eavesdropper cannot forge identity information, thereby avoiding a man-in-the-middle attack and improving data security in a key update process.

Figure 8A:
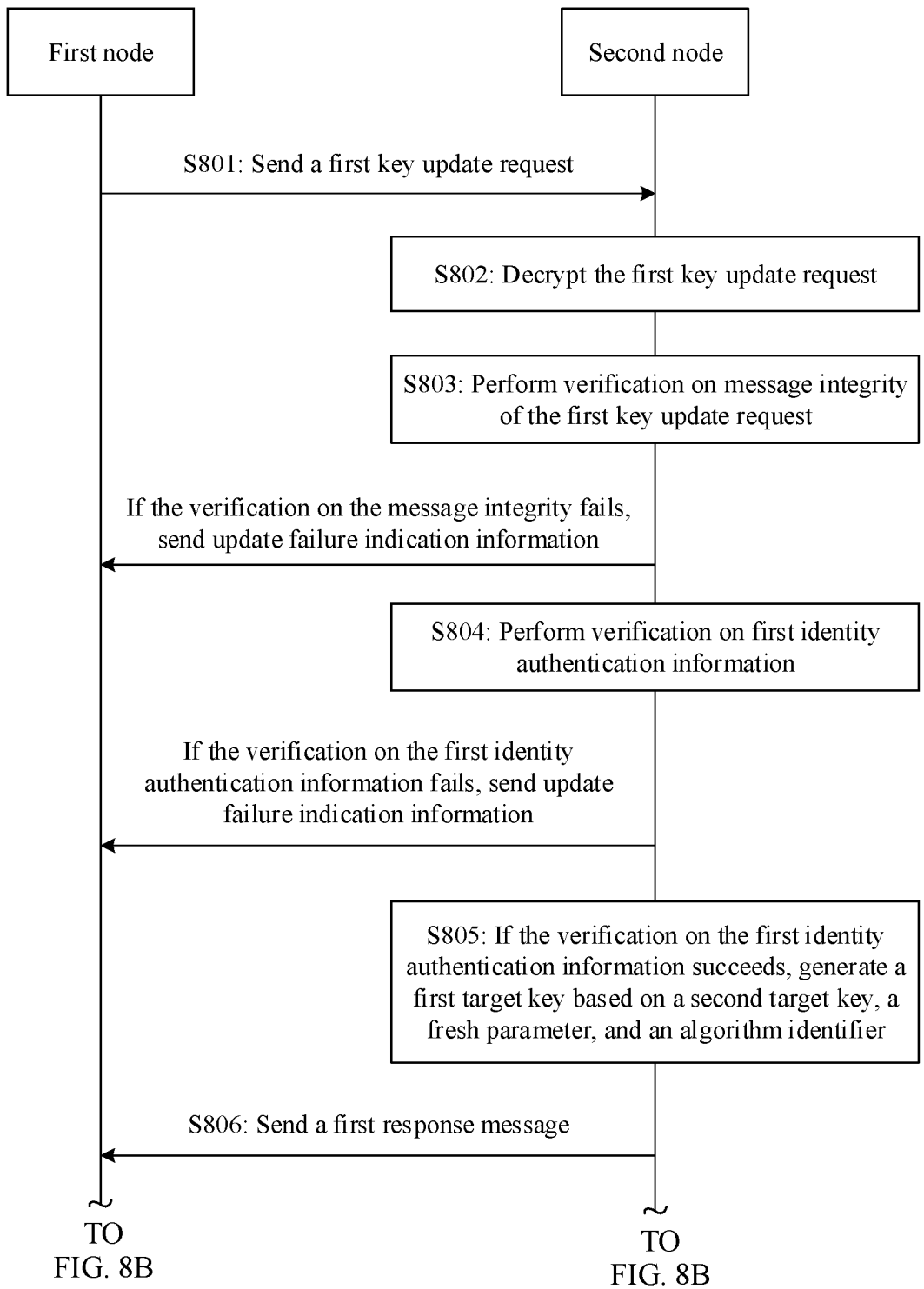
FIG. 8A and FIG. 8B are a schematic flowchart of still another key update method according to an embodiment of this application.
Figure 8B:
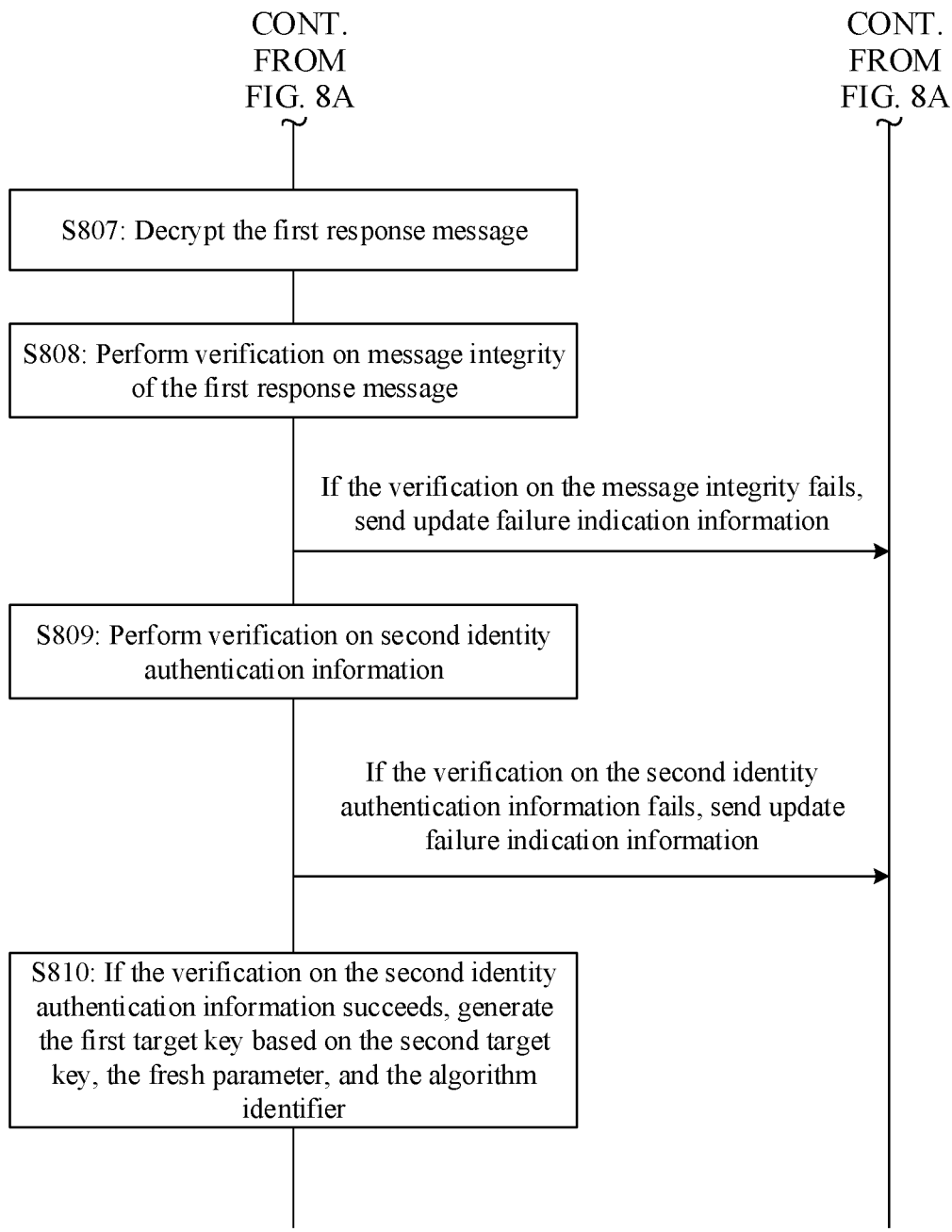

FIG. 8A and FIG. 8B show still another key update method according to an embodiment of this application. The method includes but is not limited to the following steps.

Step S801: A first node sends a first key update request to a second node.

In this embodiment of this application, encryption and/or integrity protection may be performed on the first key update request by using an encryption key determined based on a second target key and/or by using an integrity key determined based on the second target key. The second target key is a shared key between the second node and the first node.

In this embodiment of this application, the first key update request includes a first key negotiation parameter, a fresh parameter fresh, and first identity authentication information. The first key negotiation parameter may be a fresh parameter fresh. Optionally, the first key request may further include at least one of a random number value NONCEm, information timer indicating a first update time point, and information expiration indicating a validity period of a first target key.

In this embodiment of this application, the first identity authentication information in the first key update request may be generated by using a first shared key between the first node and the second node, and the first shared key may include a master key, a pre-shared key (PSK), and the like.

Optionally, an algorithm for generating the first identity authentication information may be a cryptographic algorithm. In an example in which the cryptographic algorithm is an HMAC, the generated first identity authentication information AUTHm may be represented as AUTHm=HMAC (PSK, fresh, NONCEm, expiration, timer), and sequences of the parameters may be different. Certainly, when the first key update request includes information such as the fresh parameter fresh, the random number value NONCEm, the information expiration indicating the validity period of the first target key, or the information timer indicating the first update time point, the first node may not use some or all of the parameters to generate the first identity authentication information AUTHm.

Optionally, the first node may send the first key update request to the second node by using a first communication frame, where a second frame number of the first communication frame is less than a third frame number carried in a key update request used during a last key update, and the third frame number is used to indicate a start time point of a last updated key. The first frame number carried in the first key update request is greater than the second frame number and less than the third frame number. For example, if the third frame number is 2365, it indicates that the last updated key is applied after a communication frame whose frame number starts from 2365, and the first node needs to determine the first target key before the frame number reaches 2365 again. Therefore, the first node may send the first key update request in the first communication frame whose frame number is 2345, and the first frame number 2355 is used to indicate a start time point of the first target key in the first key update request. When security protection is performed on a communication frame in a communication process, a used encryption method may be to perform encryption based on a frame number and a last updated key. Therefore, the first target key is determined before a frame number repeats to a frame number of the last updated key, so that a data frame is encrypted by using the first target key. In this way, data frames with a same frame number can be encrypted twice by using different keys, thereby improving data security.

Optionally, if information indicating a key start time point is not carried in a process of the last key update or the first node has not previously performed a key update, the first node may preconfigure a target frame number. If the first node detects that a difference between a current communication frame number and the target frame number is less than or equal to the first threshold, the first node sends the first key update request.

Step S802: The second node decrypts the first key update request.

Specifically, the second node may decrypt the first key update request by using the encryption key determined based on the second target key.

Step S803: The second node performs verification on message integrity of the first key update request.

Optionally, if the verification on the message integrity fails, the second node may sever a communication connection to the first node, or the second node sends update failure indication information to the first node, or the second node discards the first key update request and does not respond.

Optionally, in the embodiment shown in FIG. 8A and FIG. 8B, the second node may not perform step S803. In this case, after performing step S802, the second node may continue to perform step S804 and a subsequent step of step S804.

Step S804: The second node performs verification on the first identity authentication information.

Optionally, if the verification on the first identity information fails, the second node may sever a communication connection to the first node, or the second node sends update failure indication information to the first node, or the second node discards the first key update request.

Optionally, in a specific implementation process, the second node may first perform the operation of S804 and then perform the operation of S803.

Step S805: If the verification on the first identity authentication information succeeds, the second node generates the first target key based on the second target key, the fresh parameter, and an algorithm identifier.

Specifically, the algorithm identifier may be used to indicate an algorithm for generating a key. The algorithm identifier may be used to indicate an identifier of an algorithm for generating a key such as a master key, an encryption key, or an integrity protection key. For example, a character string "encryption" is used to indicate to generate an encryption key. For another example, a character string "integrity" is used to indicate to generate an integrity protection key. The algorithm identifier may be alternatively used to indicate an identifier of a hash algorithm to be used or the like. For example, a character string "SHA256" is used to indicate that an algorithm used for determining the first target key is an SHA256 algorithm. The algorithm identifier may be preset between the first node and the second node, or may be sent to the second node after being determined by the first node.

The second node may determine the first target key K1 based on the second target key K2, the fresh parameter fresh, and the algorithm identifier tag.

For example, the second node determines, by using a key derivation function KDF based on the second target key K2, the fresh parameter fresh, and the algorithm identifier tag, that the first target key K1 is: K1=KDF (K2, fresh, tag).

Optionally, the second node may further determine, by using a key derivation function KDF based on the second target key K2, the fresh parameter fresh, the algorithm identifier tag, and a key type type, that the first target key K1 is: K1=KDF (K2, fresh, tag, type), where type represents the key type. For example, a character string "encryption" is used to indicate to generate an encryption key. For another example, a character string "integrity" is used to indicate to generate an integrity protection key.

Optionally, the second node may first determine an intermediate key based on the first target key K2 and the fresh parameter fresh, and then determine the first target key K1 by using at least one of the algorithm identifier tag and the key type type based on the intermediate key. For example, the second node obtains an intermediate key Kmid: Kmid=KDF1 (K2, fresh) by using a key derivation function KDF1, and then determines the first target key K1=KDF2 (Kmid, tag, type) by using a key derivation function KDF2 based on the intermediate key Kmid. It should be noted that to describe this solution more clearly herein, how to obtain the first target key is explained by using two steps. In actual processing, the first target key may be alternatively obtained by using one step. The intermediate key Kmid is only an intermediate result. In other words, a manner of determining the first target satisfies K1=KDF2 (KDF1 (K2, fresh), tag, type).

Step S806: The second node sends a first response message to the first node.

In this embodiment of this application, encryption and/or integrity protection may be performed on the first response message by using the encryption key determined based on the second target key and/or by using the integrity key determined based on the second target key. The second target key is a shared key between the second node and the first node.

The first response message includes second identity authentication information, and the second identity authentication information is used to authenticate an identity of the second node. Optionally, the second identity authentication information may be generated by using the first shared key between the first node and the second node. Optionally, the first response message further includes a random number value NONCEs.

In this embodiment of this application, an algorithm for generating the second identity authentication information may be a cryptographic algorithm. In an example in which the cryptographic algorithm is an HMAC, the generated second identity authentication information AUTHs may be represented as AUTHs=HMAC (PSK, NONCEs), and sequences of the parameters may be different. Certainly, when the first response message includes parameters such as the random number value NONCEs, the second node may not use these parameters to generate the second identity authentication information AUTHs.

Optionally, in a specific implementation process, the second node may first perform the operation of S806 and then perform the operation of S805.

Step S807: The first node decrypts the first response message.

Specifically, the first node may decrypt the first response message by using the encryption key determined based on the second target key.

Step S808: The first node performs verification on message integrity of the first response message.

Specifically, the first identity authentication information is generated by the first node based on the first shared key between the first node and the second node. Therefore, the second node may verify, based on the first shared key, whether the first identity authentication information is correct.

Optionally, in the embodiment shown in FIG. 8A and FIG. 8B, the first node may not perform step S808. In this case, after performing step S807, the first node may continue to perform step S809 and a subsequent step of step S809.

Step S809: The first node performs verification on the second identity authentication information.

Specifically, the second identity information is generated by the second node based on the first shared key between the first node and the second node. Therefore, the first node may verify, based on the first shared key, whether the second identity authentication information is correct.

In an optional solution, a protocol stipulates that the first node uses a specific parameter to generate the first identity authentication information, and therefore the second node also needs to use the same parameter to generate identity authentication information used for verification. If the identity authentication information used for verification is the same as the first identity authentication information, it is considered that the verification succeeds. For example, the first identity authentication information is generated by using an HMAC. Therefore, the second node may generate, by using the HMAC, the identity authentication information used for verification, also referred to as a check value check1, and then verify, by using the identity authentication information used for verification, whether the first identity authentication information is correct. An example is used for description below.

For example, if the first identity authentication information AUTHm is an HMAC (PSK), the second node obtains a check value check1=HMAC (PSK) by using the HMAC based on a pre-shared key (PSK) between the second node and the first node. If the check value check1 is the same as the AUTHm, the verification succeeds.

For another example, if the first key negotiation parameter includes the fresh parameter fresh, and the first identity authentication information AUTHm is an HMAC (PSK, fresh), the second node obtains a check value check1=HMAC (PSK, fresh) by using the HMAC based on the pre-shared key (PSK) between the second node and the first node and the fresh parameter fresh. If the check value check1 is the same as the AUTHm, the verification succeeds.

Optionally, if the verification on the message integrity fails, it indicates that the identity of the second node is untrusted. Therefore, the first node may sever a connection to the second node, or send update failure indication information to the second node, or discard the first response message.

Step S809: The first node performs verification on the second identity authentication information by using the first shared key.

Specifically, the second identity information is generated by the second node based on the first shared key between the first node and the second node. Therefore, the first node may verify, based on the first shared key, whether the second identity authentication information is correct.

In an optional solution, a protocol stipulates that the second node uses a specific parameter to generate the second identity authentication information, and therefore the first node also needs to use the same parameter to generate identity authentication information used for verification. If the identity authentication information used for verification is the same as the second identity authentication information, it is considered that the verification succeeds.

For example, the second identity authentication information may be generated by using an HMAC. Therefore, the first node may generate, by using the HMAC, the identity authentication information used for verification, also referred to as a check value check2, and then verify, by using the identity authentication information used for verification, whether the second identity authentication information is correct. An example is used for description below.

For example, if the second identity authentication information AUTHs is an HMAC (PSK), the first node obtains a check value check2=HMAC (PSK) by using the HMAC based on a pre-shared key (PSK) between the first node and the second node. If the check value check2 is the same as the AUTHs, the verification succeeds.

For another example, if the first identity authentication information AUTHs is an HMAC (PSK, NONCEs), the first node obtains a check value check2=HMAC (PSK, NONCEs) by using the HMAC based on a pre-shared key (PSK) between the first node and the second node and the random number value NONCEs in the first response message. If the check value check2 is the same as the AUTHs, the verification succeeds.

Optionally, if the verification on the second identity authentication information fails, the first node may sever a connection to the second node, or send update failure indication information to the second node, or discard the first response message.

Optionally, in a specific implementation process, the first node may first perform the operation of S809 and then perform the operation of S808.

Step S810: If the verification on the second identity authentication information succeeds, the first node generates the first target key based on the second target key and the fresh parameter.

Specifically, the algorithm identifier may be used to indicate an algorithm for generating a key. The algorithm identifier may be used to indicate an identifier of an algorithm for generating a key such as a master key, an encryption key, or an integrity protection key. For example, a character string "encryption" is used to indicate to generate an encryption key. For another example, a character string "integrity" is used to indicate to generate an integrity protection key. The algorithm identifier may be alternatively used to indicate an identifier of a hash algorithm to be used or the like. For example, a character string "SHA256" is used to indicate that an algorithm used for determining the first target key is an SHA256 algorithm. The algorithm identifier may be preset between the first node and the second node, or may be determined by the first node.

The first node may determine, by using a KDF algorithm based on the second target key K2, the fresh parameter fresh, and the algorithm identifier tag, that the first target key K1 is: K1=KDF (K2, fresh, tag).

Optionally, the first node may first determine an intermediate key based on the first target key K2 and the fresh parameter fresh, and then determine the first target key K1 by using at least one of the algorithm identifier tag and the key type type based on the intermediate key. For example, the first node obtains an intermediate key Kmid: Kmid=KDF1 (K2, fresh) by using a key derivation function KDF1, and then determines the first target key K1=KDF2 (Kmid, tag, type) by using a key derivation function KDF2 based on the intermediate key Kmid. The KDF1 and the KDF2 may be a same key derivation function, or may be different key derivation functions. It should be noted that to describe this solution more clearly herein, how to obtain the first target key is explained by using two steps. In actual processing, the first target key may be alternatively obtained by using one step. The intermediate key Kmid is only an intermediate result. In other words, a manner of determining the first target satisfies K1=KDF2 (KDF1 (K2, fresh), tag, type).

Optionally, the first target key may be applied to a shared key between the first node and the second node, and includes a master key, a session key, and the like. In the method described in FIG. 8A and FIG. 8B, in a key update process, the first node and the second node generate identity authentication information based on the first shared key. After receiving a message from the other node, one node first determines an identity of the other node by using the identity authentication information, and updates a key based on the second target key, the fresh parameter, and the algorithm identifier only after identity authentication succeeds, to obtain the first target key. In this case, even if an eavesdropper has cracked an original session key, the eavesdropper cannot forge identity information, thereby avoiding a man-in-the-middle attack and improving data security in a key update process.

Optionally, in the embodiment shown in FIG. 6A and FIG. 6B, FIG. 7A and FIG. 7B, or FIG. 8A and FIG. 8B, the first key update request sent by the first node may not carry the first identity authentication information. Correspondingly, the second node may not perform a process of performing verification on the first identity information. Similarly, the first response message may not carry the second identity authentication information. Correspondingly, the second node may not perform a process of performing verification on the second identity authentication information. In this case, the first key update request is encrypted by using the second target key (or a session key derived from the second target key), to authenticate identities of two parties.

In a possible solution, the first node and the second node include a master key and a session key. If the session key is a key determined based on the master key, when the master key expires, the master key may be updated by using the key update method shown in FIG. 6A and FIG. 6B or FIG. 7A and FIG. 7B. Because the master key is updated, the session key determined based on the master key also needs to be updated. Therefore, the first node and the second node may update the session key by using the key update method shown in FIG. 8A and FIG. 8B.

The methods in the embodiments of this application are described in detail above. Apparatuses in the embodiments of this application are provided below.

Figure 9:
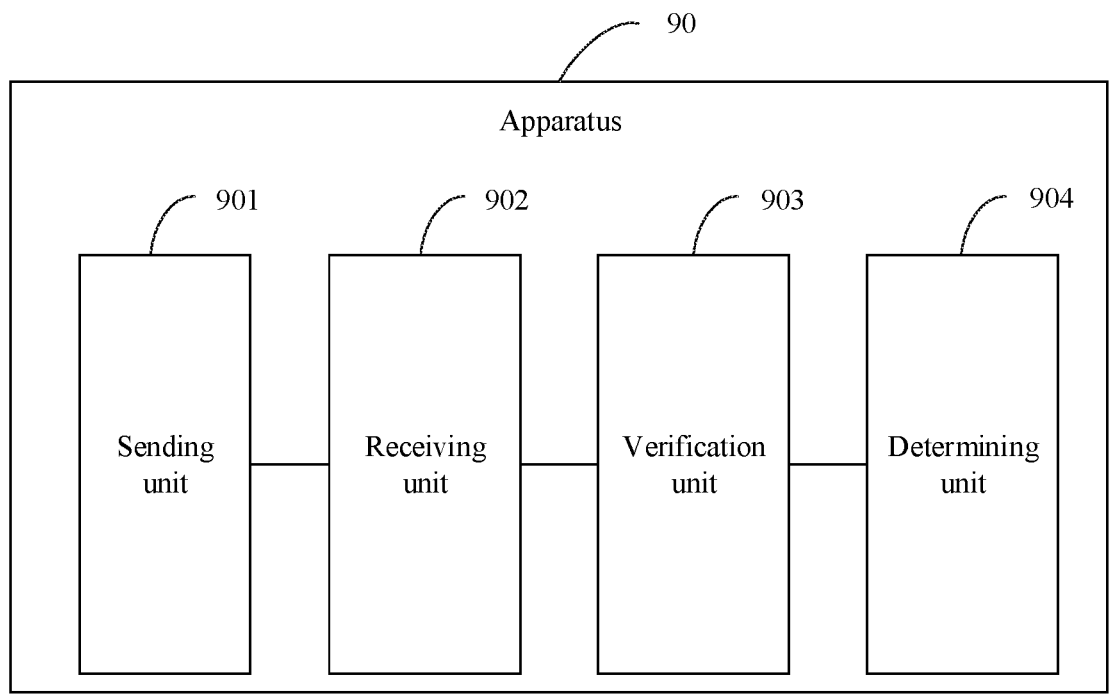
FIG. 9 is a schematic structural diagram of a node according to an embodiment of this application.

FIG. 9 is a schematic structural diagram of an apparatus 90 according to an embodiment of this application. The apparatus 90 may be an electronic device with a data receiving/sending capability, or may be a component, such as a chip or an integrated circuit, in an electronic device with a data receiving/sending capability. The apparatus 90 may include a sending unit 901, a receiving unit 902, a verification unit 903, and a determining unit 904. The units are described as follows:

The sending unit 901 is configured to send a first key update request to a second node, where the first key update request includes a first key negotiation parameter and first identity authentication information, and the first identity authentication information is generated by using a first shared key.

The receiving unit 902 is configured to receive a first response message from the second node, where the first response message includes second identity authentication information.

The verification unit 903 is configured to perform verification on the second identity authentication information by using the first shared key.

The determining unit 904 is configured to: if the verification on the second identity authentication information succeeds, determine a first target key based on the first key negotiation parameter.

In a key update process, the foregoing apparatus 90 and the second node generate identity authentication information based on the first shared key. After receiving a message from the other node, one node first determines an identity of the other node by using the identity authentication information, and updates a key based on a key negotiation parameter only after identity authentication succeeds, to obtain the first target key. In this case, even if an eavesdropper has cracked an original session key, the eavesdropper cannot forge identity information, thereby avoiding a man-in-the-middle attack and improving data security in a key update process.

It should be noted herein that division of the foregoing plurality of units is merely logical division based on functions, and is not intended to limit a specific structure of the apparatus 90. In specific implementation, some function modules may be subdivided into more fine function modules, and some function modules may be combined into one function module. However, regardless of whether the function modules are subdivided or combined, general procedures performed by the apparatus 90 in a key update process are the same. For example, the foregoing plurality of units may be simplified as a communications unit and a processing unit. The communications unit is configured to implement functions of one or more of the sending unit 901 and the receiving unit 902, and the processing unit is configured to implement functions of one or more of the verification unit 903 and the determining unit 904. Usually, each unit corresponds to respective program code (or a program instruction). When the program code corresponding to the unit is run on a processor, the unit executes a corresponding procedure to implement a corresponding function.

In a possible implementation, the first key update request is used to indicate at least one of a first update time point and a validity period of the first target key.

In a conventional key update process, a key update time point is predefined in a protocol and cannot be flexibly selected. However, the apparatus 90 provided in this application may customize an update time point of the first target key and/or the validity period of the first target key, and indicate the update time and/or the validity period to the second node, so that the first target key can be enabled as required.

In still another possible implementation, the first key update request includes a first frame number, and the first key update request indicates the first update time point by using the first frame number. The first frame number is indicated by using a plurality of bits, for example, F bits. Alternatively, the first key update request includes a media access control serial number (MAC SN), the MAC SN is indicated by using M bits, the M bits are some of the F bits, and M is less than F. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

For example, the first frame number carried in the first key update request is 2345, and the first frame number may indicate that the first target key is applied after a communication frame starting from the frame number 2345.

In still another possible implementation, the first target key is applied within the validity period of the first target key starting from the first update time point.

In a conventional key update process, a key update time point is configured. Therefore, a new key is updated when an old key expires. Because the old key has expired, an encryption process needs to be suspended during a key update, and the encryption process is resumed after the key update is completed. However, the suspension of the encryption process and the resuming of the encryption process affect key update efficiency, and the suspension of the encryption process affects security. However, in the apparatus 90 in this application, during the key update, the encryption process does not need to be suspended because the old key has not expired, thereby improving key update efficiency and improving data security.

In still another possible implementation, the first key negotiation parameter includes a first key negotiation algorithm parameter, and the first response message further includes a second key negotiation algorithm parameter; and the determining unit 904 is configured to generate the first target key based on the first key negotiation algorithm parameter and the second key negotiation algorithm parameter.

In still another possible implementation, the first key negotiation parameter includes a fresh parameter; and the determining unit 904 is configured to generate the first target key based on a second target key and the fresh parameter.

The second target key may be a shared key between the first node and the second node, and includes a master key, a session key, a pre-shared key (PSK), and the like. In addition, the first target key may be generated by using a key derivation algorithm (KDF) based on the second target key and the fresh parameter. For example, a new key DK derived by using a secret value Key may be expressed as: DK=KDF (Key, fresh), where fresh is a fresh parameter and is a parameter used for an update, and may include a counter value (counter), a serial number (number), a random value (rand), a frame number (frame number), and the like.

In still another possible implementation, the first target key is a master key of the apparatus 90.

In still another possible implementation, the first key negotiation parameter includes a fresh parameter; and the determining unit 904 is configured to generate the first target key based on a second target key, the fresh parameter, and an algorithm identifier, where the algorithm identifier is used to mark an algorithm used for determining an encryption key or an integrity protection key.

In still another possible implementation, the first target key is an integrity protection key or an encryption key of the apparatus 90.

In still another possible implementation, at least one of the first key update request and the first response message is encrypted by using the encryption key determined based on the second target key, and/or integrity protection is performed on at least one of the first key update request and the first response message by using the integrity protection key determined based on the second target key.

It may be understood that a conventional key update method is to update a key when an old key expires. Because the second target key has expired, encryption and integrity protection are not performed in a process of determining a new key. However, the apparatus 90 provided in this embodiment of this application may determine the first target key before the key expires. Therefore, the first key update request and the first response message may be encrypted by using a key determined based on the second target key, thereby improving data security.

In still another possible implementation, the sending unit 901 is configured to send the first key update request to the second node by using a first communication frame, where a second frame number of the first communication frame is less than a third frame number carried in a key update request used during a last key update, the third frame number is used to indicate a start time point of a last updated key, and the first frame number is greater than the second frame number and less than the third frame number.

When security protection is performed on a communication frame in a communication process, a used encryption method may be to perform encryption based on a frame number and a last updated key. Therefore, the first target key is determined before a frame number repeats to a frame number of the last updated key, so that a data frame is encrypted by using the first target key. In this way, data frames with a same frame number can be encrypted twice by using different keys, thereby improving data security. In an alternative solution, the first key update request includes a MAC serial number (MAC SN) instead of the first frame number, the MAC SN is indicated by using M bits, the M bits are some of the F bits, and M is less than F. Alternatively, the third frame number carried in the key update request used during the last key update may also be replaced with a MAC SN, that is, a MAC SN indicated by some of a plurality of bits used to indicate the third frame number. In this alternative solution, a value relationship among the first frame number, the second frame number, and the third frame number remains unchanged. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

In still another possible implementation, the communication frame includes at least one of a signaling plane uplink frame, a signaling plane downlink frame, a user plane uplink frame, or a user plane downlink frame.

In still another possible implementation, if the verification on the second identity information fails, the sending unit 901 and the receiving unit 902 sever a communication connection to the second node or send update failure information to the second node by using the sending unit 901.

It may be learned that if the verification on the second identity authentication information fails, it indicates that an identity of the second node is untrusted. Therefore, the foregoing apparatus 90 may sever the communication connection to the second node or send the update failure information to the second node, so that an access request is re-initialized to a node that needs to perform a key update, thereby ensuring data security in a key update process.

In still another possible implementation, the verification unit 903 is further configured to: perform integrity verification on the first response message; and if the integrity verification succeeds, continue to perform the step of performing verification on the second identity authentication information by using the first shared key; and if the integrity verification fails, the sending unit 901 and the receiving unit 902 sever a communication connection to the second node or send update failure information to the second node or send update failure information to the second node by using the sending unit 901.

Before performing verification on identity information, the apparatus 90 may first perform integrity verification on the first response message, to determine that information in the first response message is not tampered with. If the integrity verification fails, it indicates that data in the first response information has been tampered with, and a key cannot be updated. Therefore, the apparatus 90 severs the communication connection to the second node or sends the update failure information to the second node, so that the apparatus 90 re-accesses a node that needs to perform a key update, thereby ensuring data security in a key update process.

It should be noted that for implementation of each unit, refer to the corresponding descriptions in any embodiment shown in FIG. 5, FIG. 6A and FIG. 6B, FIG. 7A and FIG. 7B, or FIG. 8A and FIG. 8B. The apparatus 90 is the first node in any embodiment shown in FIG. 5, FIG. 6A and FIG. 6B, FIG. 7A and FIG. 7B, or FIG. 8A and FIG. 8B.

Figure 10:
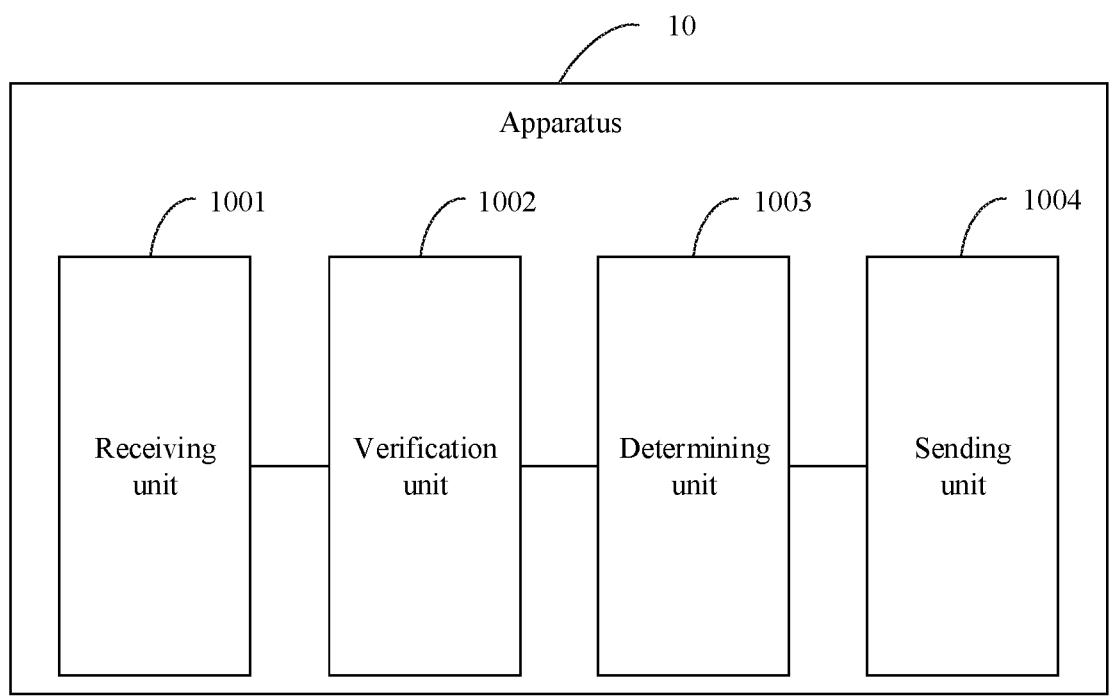
FIG. 10 is a schematic structural diagram of still another node according to an embodiment of this application.

FIG. 10 is a schematic structural diagram of an apparatus 100 according to an embodiment of this application. The apparatus 100 may be an electronic device with a data receiving/sending capability, or may be a component, such as a chip or an integrated circuit, in an electronic device with a data receiving/sending capability. The apparatus 100 may include a receiving unit 1001, a verification unit 1002, a determining unit 1003, and a sending unit 1004. The units are described as follows:

The receiving unit 1001 is configured to receive a first key update request from a first node, where the first key update request includes a first key negotiation parameter and first identity authentication information.

The verification unit 1002 is configured to perform verification on the first identity authentication information by using a first shared key.

The determining unit 1003 is configured to: if the verification on the first identity authentication information succeeds, determine a first target key based on the first key negotiation parameter.

The sending unit 1004 is configured to send a first response message to the first node, where the first response message includes second identity authentication information, and the second identity authentication information is generated by using the first shared key.

Before an original session key expires, the foregoing apparatus 100 and the first node generate identity authentication information based on the first shared key. After receiving a message from the other node, one node first determines an identity of the other node by using the identity authentication information, and updates the key based on a key negotiation parameter only after identity authentication succeeds, to obtain the first target key. In this case, even if an eavesdropper has cracked the original session key, the eavesdropper cannot forge identity information, thereby avoiding a man-in-the-middle attack and improving data security in a key update process.

It should be noted herein that division of the foregoing plurality of units is merely logical division based on functions, and is not intended to limit a specific structure of the apparatus 100. In specific implementation, some function modules may be subdivided into more fine function modules, and some function modules may be combined into one function module. However, regardless of whether the function modules are subdivided or combined, general procedures performed by the apparatus 100 in a key update process are the same. For example, the foregoing plurality of units may be simplified as a communications unit and a processing unit. The communications unit is configured to implement functions of the receiving unit 1001 and the sending unit 1004, and the processing unit is configured to implement functions of one or more of the verification unit 1002 and the determining unit 1003. Usually, each unit corresponds to respective program code (or a program instruction). When the program code corresponding to the unit is run on a processor, the unit executes a corresponding procedure to implement a corresponding function.

In a possible implementation, the first key update request is used to indicate at least one of a first update time point and a validity period of the first target key.

In a conventional key update process, a key update time point is predefined in a protocol and cannot be flexibly selected. However, in the key update method in this application, the first node may customize an update time point of the first target key and/or the validity period of the first target key, and indicate the update time point and/or the validity period to the apparatus 100, so that the first target key can be enabled as required.

In still another possible implementation, the first key update request includes a first frame number, and the first key update request indicates the first update time point by using the first frame number. The first frame number is indicated by using a plurality of bits, for example, F bits. Alternatively, the first key update request includes a media access control serial number (MAC SN), the MAC SN is indicated by using M bits, the M bits are some of the F bits, and M is less than F. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

For example, the first frame number carried in the first key update request is 2345, and the first frame number may indicate that the first target key is applied after a communication frame starting from the frame number 2345.

In still another possible implementation, the first target key is applied within the validity period of the first target key starting from the first update time point.

In still another possible implementation, the first key negotiation parameter includes a first key negotiation algorithm parameter, and the first response message includes a second key negotiation algorithm parameter; and the determining unit 1003 is configured to generate the first target key based on the first key negotiation algorithm parameter and the second key negotiation algorithm parameter.

In still another possible implementation, the first key negotiation parameter includes a fresh parameter; and the determining unit 1003 is configured to generate the first target key based on a second target key and the fresh parameter.

The second target key may be a shared key between the first node and the second node, and includes a master key, a session key, a pre-shared key (PSK), and the like. In addition, the first target key may be generated by using a key derivation algorithm (KDF) based on the second target key and the fresh parameter. For example, a new key DK derived by using a secret value Key may be expressed as: DK=KDF (Key, fresh), where fresh is a fresh parameter and is a parameter used for an update, and may include a counter value (counter), a serial number (number), a random value (rand), a frame number (frame number), and the like.

In still another possible implementation, the first target key is a master key of the apparatus 100.

In still another possible implementation, the first key negotiation parameter includes a fresh parameter; and the determining unit 1003 is configured to generate the first target key based on a second target key, the fresh parameter, and an algorithm identifier, where the algorithm identifier is used to identify an algorithm used for determining an encryption key or an integrity protection key.

In still another possible implementation, the first target key is an integrity protection key or an encryption key of the apparatus 100.

In still another possible implementation, at least one of the first key update request and the first response message is encrypted by using the encryption key determined based on the second target key, and/or integrity protection is performed on at least one of the first key update request and the first response message by using the integrity protection key determined based on the second target key.

It may be understood that a conventional key update method is to update a key when an old key expires. Because the second target key has expired, encryption and integrity protection are not performed in a process of determining a new key. However, in this embodiment of this application, the apparatus 100 may determine the first target key before the key expires. Therefore, the first key update request and the first response message may be encrypted by using a key determined based on the second target key, thereby improving data security.

In still another possible implementation, the sending unit 1004 is further configured to: if the verification on the first identity information fails, the apparatus 100 severs a communication connection to the first node or send update failure indication information to the first node.

It may be learned that if the verification on the first identity authentication information fails, it indicates that an identity of the second node is untrusted. Therefore, the apparatus 100 may sever the connection to the first node or send the update failure indication information to the first node, to stop the current key process, thereby ensuring data security of the apparatus 100 in a key update process.

In still another possible implementation, the verification unit 1002 is further configured to: perform integrity verification on the first response message; and if the integrity verification succeeds, continue to perform the step of performing verification on the second identity authentication information by using the first shared key; and the sending unit 1004 is further configured to: if the integrity verification fails, the apparatus 100 severs a communication connection to the first node or sends update failure indication information to the first node.

Before performing verification on identity information, the foregoing apparatus 100 first performs integrity verification on the first key update request, to determine that information in the first key update request is not tampered with. If the integrity verification fails, it indicates that data in the first key update request has been tampered with, and a key cannot be updated. Therefore, the foregoing apparatus 100 may sever the connection to the first node or send the update failure indication information to the first node, thereby ensuring data security in a key update process.

It should be noted that for implementation of each unit, refer to the corresponding descriptions in any embodiment shown in FIG. 5, FIG. 6A and FIG. 6B, FIG. 7A and FIG. 7B, or FIG. 8A and FIG. 8B. The apparatus 100 is the second node in any embodiment shown in FIG. 5, FIG. 6A and FIG. 6B, FIG. 7A and FIG. 7B, or FIG. 8A and FIG. 8B.

Figure 11:
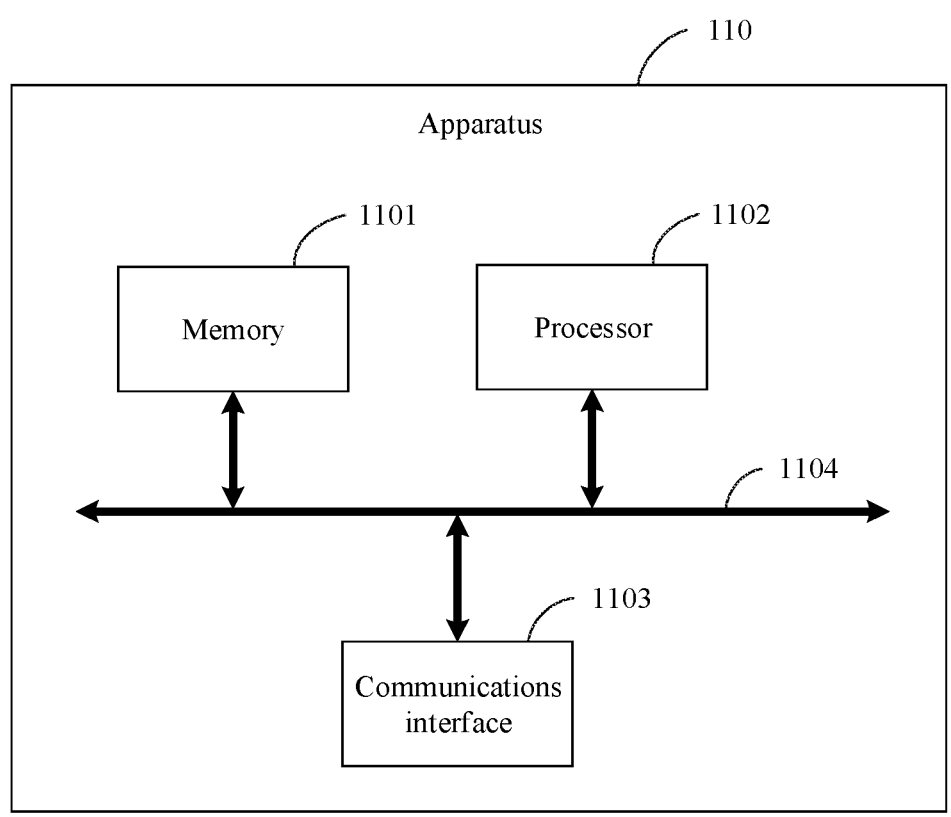
FIG. 11 is a schematic structural diagram of still another node according to an embodiment of this application.

FIG. 11 is a schematic structural diagram of an apparatus 110 according to an embodiment of this application. The apparatus 110 may be an electronic device with a data receiving/sending capability, or may be a component, such as a chip or an integrated circuit, in an electronic device with a data receiving/sending capability. The apparatus 110 may include a memory 1101, a processor 1102, and a communications interface 1103. Further, optionally, a bus 1104 may be further included. The memory 1101, the processor 1102, and the communications interface 1103 are connected through the bus 1104.

The memory 1101 is configured to provide storage space, and the storage space may store data such as an operating system and a computer program. The memory 1101 includes but is not limited to a random access memory (RAM), a read-only memory (ROM), an erasable programmable read only memory (EPROM), or a compact disc read-only memory (CD-ROM).

The processor 1102 is a module that performs an arithmetic operation and a logical operation, and may be one or a combination of processing modules such as a central processing unit (CPU), a graphics processing unit (GPU), or a microprocessor unit (MPU).

The communications interface 1103 is configured to receive data sent by an external device and/or send data to the external device, and may be a wired link interface such as an Ethernet cable, or may be a wireless link interface (Wi-Fi, Bluetooth, or the like). Optionally, the communications interface may further include a transmitter (for example, a radio frequency transmitter), a receiver, or the like coupled to the interface.

The processor 1102 in the apparatus 110 is configured to read computer program code stored in the memory 1101, to perform the following operations:

sending a first key update request to a second node through the communications interface 1103, where the first key update request includes a first key negotiation parameter and first identity authentication information, and the first identity authentication information is generated by using a first shared key;

receiving a first response message from the second node through the communications interface 1103, where the first response message includes second identity authentication information;

performing verification on the second identity authentication information by using the first shared key; and if the verification on the second identity authentication information succeeds, determining a first target key based on the first key negotiation parameter.

In a key update process, the foregoing apparatus 110 and the second node generate identity authentication information based on the first shared key. After receiving a message from the other node, one node first determines an identity of the other node by using the identity authentication information, and updates the key based on a key negotiation parameter only after identity authentication succeeds, to obtain the first target key. In this case, even if an eavesdropper has cracked an original session key, the eavesdropper cannot forge identity information, thereby avoiding a man-in-the-middle attack and improving data security in a key update process.

In a possible implementation, the first key update request is used to indicate at least one of a first update time point and a validity period of the first target key.

In a conventional key update process, a key update time point is predefined in a protocol and cannot be flexibly selected. However, the apparatus 110 provided in this application may customize an update time point of the first target key and/or the validity period of the first target key, and indicate the update time point and/or the validity period to the second node, so that the first target key can be enabled as required.

In still another possible implementation, the first key update request includes a first frame number, and the first key update request indicates the first update time point by using the first frame number. The first frame number is indicated by using a plurality of bits, for example, F bits. Alternatively, the first key update request includes a media access control serial number (MAC SN), the MAC SN is indicated by using M bits, the M bits are some of the F bits, and M is less than F. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

For example, the first frame number carried in the first key update request is 2345, and the first frame number may indicate that the first target key is applied after a communication frame starting from the frame number 2345.

In still another possible implementation, the first target key is applied within the validity period of the first target key starting from the first update time point.

In a conventional key update process, a key update time point is configured. Therefore, a new key is updated when an old key expires. Because the old key has expired, an encryption process needs to be suspended during a key update, and the encryption process is resumed after the key update is completed. However, the suspension of the encryption process and the resuming of the encryption process affect key update efficiency, and the suspension of the encryption process affects security. However, in the apparatus 110 provided in this application, during the key update, the encryption process does not need to be suspended because the old key has not expired, thereby improving key update efficiency and improving data security.

In still another possible implementation, the first key negotiation parameter includes a first key negotiation algorithm parameter, and the first response message further includes a second key negotiation algorithm parameter; and in the operation of determining a first target key based on the first key negotiation parameter, the processor 1102 is specifically configured to generate the first target key based on the first key negotiation algorithm parameter and the second key negotiation algorithm parameter.

In still another possible implementation, the first key negotiation parameter includes a fresh parameter; and in the operation of determining a first target key based on the first key negotiation parameter, the processor 1102 is specifically configured to:

generate the first target key based on a second target key and the fresh parameter.

The second target key may be a shared key between the first node and the second node, and includes a master key, a session key, a pre-shared key (PSK), and the like. In addition, the first target key may be generated by using a key derivation algorithm based on the second target key and the fresh parameter. For example, a new key DK derived by using a secret value Key may be expressed as: DK=KDF (Key, fresh), where fresh is a fresh parameter and is a parameter used for an update, and may include a counter value (counter), a serial number (number), a random value (rand), a frame number (frame number), and the like.

In still another possible implementation, the first target key is a master key of the apparatus 110.

In still another possible implementation, the first key negotiation parameter includes a fresh parameter; and in the operation of determining a first target key based on the first key negotiation parameter, the processor 1102 is specifically configured to:

generate the first target key based on a second target key, the fresh parameter, and an algorithm identifier, where the algorithm identifier is used to mark an algorithm used for determining an encryption key or an integrity protection key.

In still another possible implementation, the first target key is an integrity protection key or an encryption key of the apparatus 110.

In still another possible implementation, at least one of the first key update request and the first response message is encrypted by using the encryption key determined based on the second target key, and/or integrity protection is performed on at least one of the first key update request and the first response message by using the integrity protection key determined based on the second target key.

It may be understood that a conventional key update method is to update a key when an old key expires. Because the second target key has expired, encryption and integrity protection are not performed in a process of determining a new key. However, in this embodiment of this application, the apparatus 110 may determine the first target key before the key expires. Therefore, the first key update request and the first response message may be encrypted by using a key determined based on the second target key, thereby improving data security.

In still another possible implementation, the communications interface 1103 sends the first key update request to the second node by using a first communication frame, where a second frame number of the first communication frame is less than a third frame number carried in a key update request used during a last key update, the third frame number is used to indicate a start time point of a last updated key, and the first frame number is greater than the second frame number and less than the third frame number.

When security protection is performed on a communication frame in a communication process, a used encryption method may be to perform encryption based on a frame number and a last updated key. Therefore, the first target key is determined before a frame number repeats to a frame number of the last updated key, so that a data frame is encrypted by using the first target key. In this way, data frames with a same frame number can be encrypted twice by using different keys, thereby improving data security.

In an alternative solution, the first key update request includes a MAC serial number (MAC SN) instead of the first frame number, the MAC SN is indicated by using M bits, the M bits are some of the F bits, and M is less than F. Alternatively, the third frame number carried in the key update request used during the last key update may also be replaced with a MAC SN, that is, a MAC SN indicated by some of a plurality of bits used to indicate the third frame number. In this alternative solution, a value relationship among the first frame number, the second frame number, and the third frame number remains unchanged. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

In still another possible implementation, the communication frame includes at least one of a signaling plane uplink frame, a signaling plane downlink frame, a user plane uplink frame, or a user plane downlink frame.

In still another possible implementation, the processor 1102 is further configured to:

if the verification on the second identity information fails, indicate the communications interface 1103 to sever a communication connection to the second node or send update failure information to the second node through the communications interface 1103.

It may be learned that if the verification on the second identity authentication information fails, it indicates that an identity of the second node is untrusted. Therefore, the foregoing apparatus 110 may sever the communication connection to the second node or send the update failure information to the second node, so that an access request is re-initialized to a node that needs to perform a key update, thereby ensuring data security in a key update process.

In still another possible implementation, after receiving the first response message from the second node, the processor 1102 is further configured to: perform integrity verification on the first response message; and if the integrity verification succeeds, continue to perform the step of performing verification on the second identity authentication information by using the first shared key; and the processor 1102 is further configured to: if the integrity verification fails, indicate the communications interface 1103 to sever a communication connection to the second node or send update failure information to the second node through the communications interface 1103.

It may be learned that integrity verification may be performed to determine whether information is tampered with. Therefore, before performing verification on identity information, the foregoing apparatus 110 first performs integrity verification on the first response message, to determine that information in the first response message is not tampered with. If the integrity verification fails, it indicates that data in the first response information has been tampered with, and a key cannot be updated. Therefore, the apparatus 110 severs the communication connection to the second node or sends the update failure information to the second node, so that the apparatus 110 re-accesses a node that needs to perform a key update, thereby ensuring data security in a key update process.

It should be noted that for implementation of each unit, refer to the corresponding descriptions in any embodiment shown in FIG. 5, FIG. 6A and FIG. 6B, FIG. 7A and FIG. 7B, or FIG. 8A and FIG. 8B. The node 10 is the first node in any embodiment shown in FIG. 5, FIG. 6A and FIG. 6B, FIG. 7A and FIG. 7B, or FIG. 8A and FIG. 8B.

Figure 12:
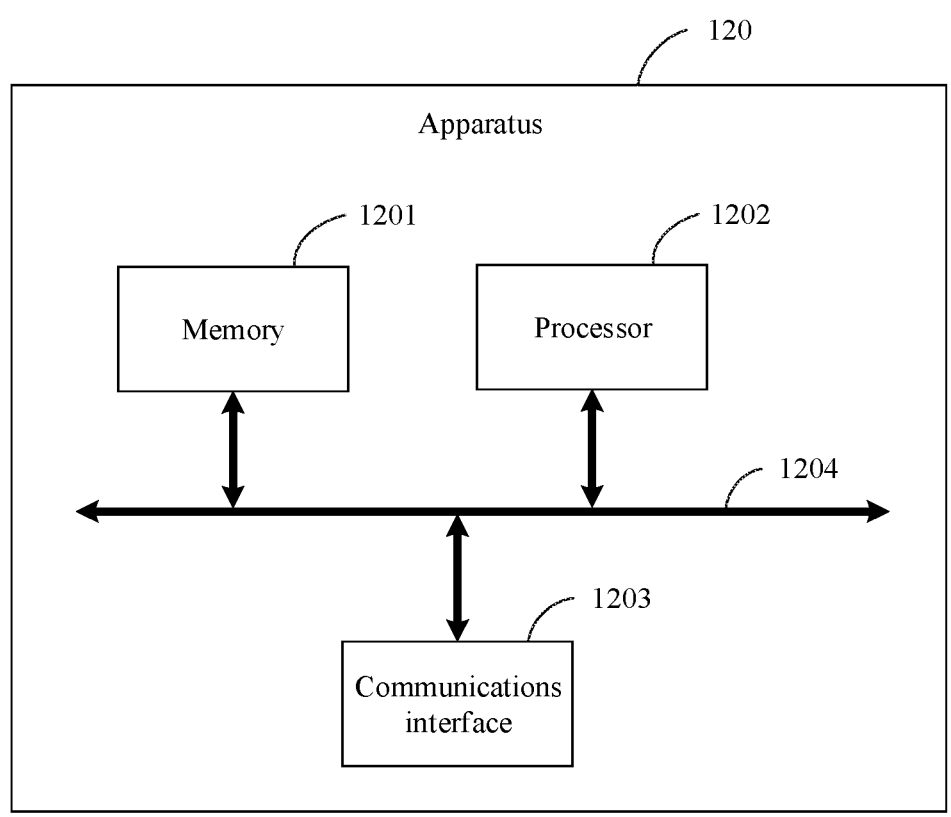
FIG. 12 is a schematic structural diagram of still another node according to an embodiment of this application.

FIG. 12 is a schematic structural diagram of an apparatus 120 according to an embodiment of this application. The apparatus 120 may be an electronic device with a data receiving/sending capability, or may be a component, such as a chip or an integrated circuit, in an electronic device with a data receiving/sending capability. The apparatus 120 may include a memory 1201, a processor 1202, and a communications interface 1203. Further, optionally, a bus 1204 may be further included. The memory 1201, the processor 1202, and the communications interface 1203 are connected through the bus 1204.

The memory 1201 is configured to provide storage space, and the storage space may store data such as an operating system and a computer program. The memory 1201 includes but is not limited to a random access memory (RAM), a read-only memory (ROM), an erasable programmable read only memory (EPROM), or a compact disc read-only memory (CD-ROM).

The processor 1202 is a module that performs an arithmetic operation and a logical operation, and may be one or a combination of processing modules such as a central processing unit (CPU), a graphics processing unit (GPU), or a microprocessor unit (MPU).

The communications interface 1203 is configured to receive data sent by an external device and/or send data to the external device, and may be a wired link interface such as an Ethernet cable, or may be a wireless link interface (Wi-Fi, Bluetooth, or the like). Optionally, the communications interface may further include a transmitter (for example, a radio frequency transmitter), a receiver, or the like coupled to the interface.

The processor 1202 in the device 120 is configured to read computer program code stored in the memory 1201, to perform the following operations:

sending a first key update request to a second node through the communications interface 1203, where the first key update request includes a first key negotiation parameter and first identity authentication information, and the first identity authentication information is generated by using a first shared key;

receiving a first response message from the second node through the communications interface 1203, where the first response message includes second identity authentication information;

performing verification on the second identity authentication information by using the first shared key; and if the verification on the second identity authentication information succeeds, determining a first target key based on the first key negotiation parameter.

Before an original session key expires, the foregoing apparatus 120 and the first node generate identity authentication information based on the first shared key. After receiving a message from the other node, one node first determines an identity of the other node by using the identity authentication information, and updates the key based on a key negotiation parameter only after identity authentication succeeds, to obtain the first target key. In this case, even if an eavesdropper has cracked the original session key, the eavesdropper cannot forge identity information, thereby avoiding a man-in-the-middle attack and improving data security in a key update process.

In a possible implementation, the first key update request is used to indicate at least one of a first update time point and a validity period of the first target key.

In a conventional key update process, a key update time point is predefined in a protocol and cannot be flexibly selected. However, in this application, the first node may customize an update time point of the first target key and/or the validity period of the first target key, and indicate the update time point and/or the validity period to the apparatus 120, so that the first target key can be enabled as required.

In still another possible implementation, the first key update request includes a first frame number, and the first key update request indicates the first update time point by using the first frame number. The first frame number is indicated by using a plurality of bits, for example, F bits. Alternatively, the first key update request includes a media access control serial number (MAC SN), the MAC SN is indicated by using M bits, the M bits are some of the F bits, and M is less than F. Specifically, the plurality of bits used to indicate the first frame number include two parts: a high-order part and a low-order part. The low-order part is the M bits used to indicate the MAC SN. The high-order part is indicated by using N bits. Optionally, the N bits are a plurality of bits used to indicate a hyper frame number. In this alternative manner, as little information as possible may be carried in a key update request, thereby reducing signaling consumption and improving communication efficiency.

For example, the first frame number carried in the first key update request is 2345, and the first frame number may indicate that the first target key is applied after a communication frame starting from the frame number 2345.

In still another possible implementation, the first target key is applied within the validity period of the first target key starting from the first update time point.

In a conventional key update process, a key update time point is configured. Therefore, a new key is updated when an old key expires. Because the old key has expired, an encryption process needs to be suspended during a key update, and the encryption process is resumed after the key update is completed. However, the suspension of the encryption process and the resuming of the encryption process affect key update efficiency, and the suspension of the encryption process affects security. However, in the apparatus 120 provided in this application, during the key update, the encryption process does not need to be suspended because the old key has not expired, thereby improving key update efficiency and improving data security.

In still another possible implementation, the first key negotiation parameter includes a first key negotiation algorithm parameter, and the first response message further includes a second key negotiation algorithm parameter; and in the operation of determining a first target key based on the first key negotiation parameter, the processor 1202 is specifically configured to:

generate the first target key based on the first key negotiation algorithm parameter and the second key negotiation algorithm parameter.

In still another possible implementation, the first key negotiation parameter includes a fresh parameter; and in the operation of determining a first target key based on the first key negotiation parameter, the processor 1202 is specifically configured to:

generate the first target key based on a second target key and the fresh parameter.

The second target key may be a shared key between the first node and the second node, and includes a master key, a session key, a pre-shared key (PSK), and the like. In addition, the first target key may be generated by using a key derivation algorithm (KDF) based on the second target key and the fresh parameter. For example, a new key DK derived by using a secret value Key may be expressed as: DK=KDF (Key, fresh), where fresh is a fresh parameter and is a parameter used for an update, and may include a counter value (counter), a serial number (number), a random value (rand), a frame number (frame number), and the like.

In still another possible implementation, the first target key is a master key of the apparatus 120.

In still another possible implementation, the first key negotiation parameter includes a fresh parameter; and in the operation of determining a first target key based on the first key negotiation parameter, the processor 1202 is specifically configured to:

generate the first target key based on a second target key, the fresh parameter, and an algorithm identifier, where the algorithm identifier is used to mark an algorithm used for determining an encryption key or an integrity protection key.

In still another possible implementation, the first target key is an integrity protection key or an encryption key of the apparatus 120.

In still another possible implementation, at least one of the first key update request and the first response message is encrypted by using the encryption key determined based on the second target key, and/or integrity protection is performed on at least one of the first key update request and the first response message by using the integrity protection key determined based on the second target key.

It may be understood that a conventional key update method is to update a key when an old key expires. Because the second target key has expired, encryption and integrity protection are not performed in a process of determining a new key. However, in this embodiment of this application, the first target key may be determined before the key expires. Therefore, the first key update request and the first response message may be encrypted by using a key determined based on the second target key, thereby improving data security.

In still another possible implementation, the processor 1202 is further configured to: if the verification on the first identity information fails, indicate the communications interface 1203 to sever a communication connection to the first node or send update failure indication information to the first node through the communications interface 1203.

It may be learned that if the verification on the first identity authentication information fails, the apparatus 120 may sever the connection to the first node or send the update failure indication information to the first node, to stop the current key process, thereby ensuring data security of the node in a key update process.

In still another possible implementation, after receiving the first key update request from the first node, the processor 1202 is further configured to: perform integrity verification on the first key update request; and if the integrity verification succeeds, continue to perform the step of performing verification on the first identity authentication information by using the first shared key; and the processor 1202 is further configured to: if the integrity verification fails, indicate the communications interface 1203 to sever a connection to the first node or send update failure indication information to the first node through the communications interface 1203.

Before performing verification on identity information, the foregoing apparatus 120 first performs integrity verification on the first key update request, to determine that information in the first key update request is not tampered with. If the integrity verification fails, it indicates that data in the first key update request has been tampered with, and a key cannot be updated. Therefore, the foregoing apparatus 120 may sever the connection to the first node or send the update failure indication information to the first node, thereby ensuring data security in a key update process.

It should be noted that for implementation of each unit, refer to the corresponding descriptions in any embodiment shown in FIG. 5, FIG. 6A and FIG. 6B, FIG. 7A and FIG. 7B, or FIG. 8A and FIG. 8B. The apparatus 120 is the first node in any embodiment shown in FIG. 5, FIG. 6A and FIG. 6B, FIG. 7A and FIG. 7B, or FIG. 8A and FIG. 8B.

An embodiment of this application further provides a computer readable storage medium. The computer readable storage medium stores a computer program. When the computer program is run on one or more processors, the method in any one embodiment shown in FIG. 5, FIG. 6A and FIG. 6B, FIG. 7A and FIG. 7B, or FIG. 8A and FIG. 8B is performed.

An embodiment of this application further provides a chip system. The chip system includes at least one processor, a memory, and an interface circuit. The interface circuit is configured to provide an information input/output for the at least one processor, the at least one memory stores a computer program, and when the computer program is run on one or more processors, the key update method in any embodiment shown in FIG. 5, FIG. 6A and FIG. 6B, FIG. 7A and FIG. 7B, or FIG. 8A and FIG. 8B is performed.

An embodiment of this application further provides a smart cockpit product. The smart cockpit product includes a first node (for example, an automobile cockpit domain controller (CDC)), and the first node is the first node in any embodiment shown in FIG. 5, FIG. 6A and FIG. 6B, FIG. 7A and FIG. 7B, or FIG. 8A and FIG. 8B. Further, the vehicle further includes a second node (for example, at least one of modules such as a camera, a screen, a microphone, a sounder, a radar, an electronic key, and a keyless entry and startup system controller), and the second node is the second node in any embodiment shown in FIG. 5, FIG. 6A and FIG. 6B, FIG. 7A and FIG. 7B, or FIG. 8A and FIG. 8B.

An embodiment of this application further provides a vehicle. The vehicle includes a first node (for example, an automobile cockpit domain controller (CDC)). Further, the vehicle further includes a second node (for example, at least one of modules such as a camera, a screen, a microphone, a sounder, a radar, an electronic key, and a keyless entry or startup system controller). The first node is the first node in any embodiment shown in FIG. 5, FIG. 6A and FIG. 6B, FIG. 7A and FIG. 7B, or FIG. 8A and FIG. 8B, and the second node is the second node in any embodiment shown in FIG. 5, FIG. 6A and FIG. 6B, FIG. 7A and FIG. 7B, or FIG. 8A and FIG. 8B. An embodiment of this application further provides a computer program product. When the computer program product is run on one or more processors, the key update method in any embodiment shown in FIG. 5, FIG. 6A and FIG. 6B, FIG. 7A and FIG. 7B, or FIG. 8A and FIG. 8B may be performed.

In view of the above, according to the key update method provided in the embodiments of this application, before a key is updated, nodes of two communication parties need to generate identity authentication information based on the first shared key. After receiving a message from the other node, one node first determines an identity of the other node by using the identity authentication information, and determines the first target key based on a key negotiation parameter after identity authentication succeeds. In this case, even if an eavesdropper has cracked an original session key, the eavesdropper cannot forge identity information, thereby avoiding a man-in-the-middle attack and improving data security in a data update process.

It should be noted that, for brief description, the foregoing method embodiments are represented as a series of action combinations. However, a person skilled in the art should appreciate that this application is not limited to the described order of the actions, because according to this application, some steps may be performed in another order or simultaneously. It should be further appreciated by a person skilled in the art that the embodiments described in this specification all belong to example embodiments, and the involved actions and modules are not necessarily required by this application.

A sequence of the steps of the method according to the embodiments of this application may be adjusted, combined, or removed based on an actual requirement.

The modules in the apparatus according to the embodiments of this application may be combined, divided, and deleted based on an actual requirement.

A person of ordinary skill in the art may understand that all or some of the steps of the methods according to the embodiments may be implemented by a program instructing related hardware. The program may be stored in a computer-readable storage medium. The storage medium may include a flash memory, a read-only memory (ROM), a random access memory (RAM), a magnetic disk, an optical disc, or the like.

What is disclosed above is merely example embodiments of this application. A person of ordinary skill in the art may understand that all or some of procedures that implement the foregoing embodiments and equivalent modifications made in accordance with the claims of this application shall fall within the scope of this application.

What is claimed is:

1. A key update method, comprising:
   sending a first key update request to a second node, wherein the first key update request comprises a first key negotiation parameter and first identity authentication information, and the first identity authentication information is generated by using a first shared key;
   receiving a first response message from the second node, wherein the first response message comprises second identity authentication information;
   performing verification on the second identity authentication information by using the first shared key; and
   in response to the verification on the second identity authentication information succeeding, determining a first target key based on the first key negotiation parameter, wherein the first key negotiation parameter comprises a fresh parameter, and the determining of the first target key based on the first key negotiation parameter comprises:
   generating the first target key based on a second target key and the fresh parameter.

2. The method according to claim 1, wherein the first key update request indicates at least one of a first update time point or a validity period of the first target key.

3. The method according to claim 2, wherein the first key update request comprises a first frame number or a first media access control (MAC) serial number, and the first frame number or the first MAC serial number indicates the first update time point.

4. The method according to claim 2, wherein the first target key is applied within the validity period of the first target key starting from the first update time point.

5. The method according to claim 1, wherein the first shared key is a master key.

6. The method according to claim 1, wherein the first shared key is a session key, and the session key is generated by a key derivation algorithm (KDF) according to a master key.

7. The method according to claim 6, wherein the first key negotiation parameter comprises a counter value, and the session key is generated according to the master key and the counter value.

8. The method according to claim 1, wherein the first key negotiation parameter comprises a fresh parameter; and the first target key is determined further based on:
   an algorithm identifier, wherein the algorithm identifier identifies an algorithm used for determining an encryption key or an integrity protection key.

9. The method according to claim 1, wherein at least one of the first key update request or the first response message is encrypted by using an encryption key determined based on a second target key, or integrity protection is performed on at least one of the first key update request or the first response message by using an integrity protection key determined based on the second target key.

10. The method according to claim 1, wherein the first key update request comprises a first frame number, and the first frame number indicates an update time point of the first target key; the sending a first key update request to a second node comprises:
    sending the first key update request to the second node by using a first communication frame, wherein a second frame number of the first communication frame is less than a third frame number carried in a key update request used during a last key update, the third frame number indicates a start time point of the last updated key, and the first frame number is greater than the second frame number and less than the third frame number.

11. The method according to claim 10, wherein the first communication frame comprises at least one of a signaling plane uplink frame, a signaling plane downlink frame, a user plane uplink frame, or a user plane downlink frame.

12. A key update method, wherein the method comprises:
    receiving a first key update request from a first node, wherein the first key update request comprises a first key negotiation parameter and first identity authentication information;
    performing verification on the first identity authentication information by using a first shared key; and
    in response to the verification on the first identity authentication information succeeding, performing the following operations:

determining a first target key based on the first key negotiation parameter, wherein the first key negotiation parameter comprises a fresh parameter, and the determining of the first target key based on the first key negotiation parameter comprises:

generating the first target key based on a second target key and the fresh parameter; and sending a first response message to the first node, wherein the first response message comprises second identity authentication information, and the second identity authentication information is generated by using the first shared key.

13. The method according to claim 12, wherein the first key update request indicates at least one of a first update time point or a validity period of the first target key.

14. The method according to claim 13, wherein the first key update request comprises a first frame number or a first media access control (MAC) serial number, and the first frame number or the first MAC serial number indicates the first update time point.

15. The method according to claim 13, wherein the first target key is applied within the validity period of the first target key starting from the first update time point.

16. An apparatus, comprising:

one or more processors, and a non-transitory storage medium in communication with the one or more processors, wherein the non-transitory storage medium stores program instructions that, when executed by the one or more processors, cause the apparatus to:

send a first key update request to a second node, wherein the first key update request comprises a first key negotiation parameter and first identity authentication information, and the first identity authentication information is generated by using a first shared key;

receive a first response message from the second node, wherein the first response message comprises second identity authentication information; perform verification on the second identity authentication information by using the first shared key; and in response to the verification on the second identity authentication information succeeding, determine a first target key based on the first key negotiation parameter, wherein the first key negotiation parameter comprises a fresh parameter, and the determining of the first target key based on the first key negotiation parameter comprises:

generating the first target key based on a second target key and the fresh parameter.

17. The apparatus according to claim 16, wherein the first key update request indicates at least one of a first update time point or a validity period of the first target key.

18. The apparatus according to claim 17, wherein the first key update request comprises a first frame number or a first media access control (MAC) serial number, and the first frame number or the first MAC serial number indicates the first update time point.

19. The apparatus according to claim 17, wherein the first target key is applied within the validity period of the first target key starting from the first update time point.

20. An apparatus, comprising:

one or more processors, and a non-transitory storage medium in communication with the one or more processors, wherein the non-transitory storage medium stores program instructions that, when executed by the one or more processors, cause the apparatus to:

receive a first key update request from a first node, wherein the first key update request comprises a first key negotiation parameter and first identity authentication information;

perform verification on the first identity authentication information by using a first shared key; and in response to the verification on the first identity authentication information succeeding, perform the following operations:

determine a first target key based on the first key negotiation parameter, wherein the first key negotiation parameter comprises a fresh parameter, and the determining of the first target key based on the first key negotiation parameter comprises:

generating the first target key based on a second target key and the fresh parameter; and send a first response message to the first node, wherein the first response message comprises second identity authentication information, and the second identity authentication information is generated by using the first shared key.

\* \* \* \* \*